US006301524B1

(12) United States Patent
Takenaka

(10) Patent No.: US 6,301,524 B1
(45) Date of Patent: Oct. 9, 2001

(54) GAIT GENERATION SYSTEM OF LEGGED MOBILE ROBOT

(75) Inventor: Toru Takenaka, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/095,438

(22) Filed: Jun. 10, 1998

(30) Foreign Application Priority Data

Jul. 25, 1996 (JP) .................................................. 8-214261

(51) Int. Cl.[7] .................................................. G06F 19/00
(52) U.S. Cl. ........................ 700/245; 318/568.12
(58) Field of Search .................... 700/245, 250; 318/568.12

(56) References Cited

U.S. PATENT DOCUMENTS

| 5,325,031 | * | 6/1994 | Tilden ........................... 318/568.11 |
| 5,357,433 | * | 10/1994 | Takenaka et al. ................ 701/23 |
| 5,402,050 | * | 3/1995 | Ozawa ........................... 318/568.12 |
| 5,428,563 | | 6/1995 | Takenaka ....................... 708/845 |
| 5,432,417 | | 7/1995 | Takenaka et al. .............. 318/568.12 |
| 5,594,644 | | 1/1997 | Hasegawa et al. ............. 701/93 |
| 5,642,467 | * | 6/1997 | Stover et al. .................. 700/250 |
| 5,807,011 | * | 9/1998 | Hong et al. .................... 403/62 |
| 5,808,433 | * | 9/1998 | Tagami et al. ................. 318/568.12 |
| 5,842,533 | * | 12/1998 | Takeuchi ....................... 180/8.1 |
| 5,872,893 | * | 2/1999 | Takenaka et al. .............. 700/245 |

FOREIGN PATENT DOCUMENTS

| 5-62363 | 9/1993 | (JP) . |
| 5-285868 | 11/1993 | (JP) . |
| 5-305585 | 11/1993 | (JP) . |
| 5-318339 | 12/1993 | (JP) . |
| 5-324115 | 12/1993 | (JP) . |

OTHER PUBLICATIONS

Stitt, et al., Distal learning applied to biped robots, May 1994, pp. 137–142.*
Communication—Search Report of Jan. 27, 2000.
English translation of Abstract of JP 5–285868.
English translation of Abstract of JP 5–62363.
English translation of Abstract of JP 5–305585.
English translation of Abstract of JP 5–318339.
English translation of Abstract of JP 5–324115.

* cited by examiner

Primary Examiner—Paul P. Gordon
Assistant Examiner—Zoila Cabrera
(74) Attorney, Agent, or Firm—Lyon & Lyon LLP

(57) ABSTRACT

In a gait generation system for a legged mobile robot, in particular a legged mobile robot having a body and a plurality of legs links each connected to the body through a joint, it is configured such that gaits comprising motion parameters and floor reaction force parameters are varied freely on a real-time basis during walking. In order to effect this, various standard gaits have been prepared on an off-line computer and an approximated value such as a weighted average thereof is calculated in response to a demand for gait, and gaits are generated. Moreover, the gaits are corrected using an inverted pendulum model such that positions and the velocities are continuous at the boundary of the gaits. With the arrangement, it becomes possible to generate gaits having the floor reaction force freely on a real-time basis to effect a stride or turning angle as desired. It also becomes possible to make the displacements and velocities of various portions of the robot continuous at the boundary of the gaits. In addition, it becomes possible to control the legged mobile robot based on the gaits thus generated on a real-time basis.

31 Claims, 38 Drawing Sheets

STANDARD GAIT NO. 0

STANDARD GAIT NO. 2

DEMAND GAIT (3RD GAIT)

$$x(k) = xmix(k) + Rmix(x(k), c) * \Delta c + Rmix(x(k), e) * \Delta e$$
$$+ Rmix(x(k), x0) * \Delta x0 + Rmix(x(k), v0) * \Delta v0$$

1

GAIT GENERATION SYSTEM OF LEGGED MOBILE ROBOT

TECHNICAL FIELD TO WHICH THE INVENTION RELATES TO

The present invention relates to a gait generation system of a legged mobile robot, and more particularly to a system for generating or determining a gait freely on a real-time basis.

BACKGROUND ART OF THE INVENTION

In a conventional gait generation of a legged mobile robot, as taught in Japanese Laid-Open Patent Application No. Hei 5 (1993)—285,868, various gaits in time-series data including that for walking straight or that for turning are designed using an offline computer. The data are then loaded to a memory of a microcomputer mounted on the robot which outputs the data successively to be processed during walking.

Moreover, Japanese Laid-Open Patent Application No. Sho 62 (1987)—97,006 (Japanese Patent Publication No. Hei 5 (1993)—62,363) proposes to prepare similar locomotion pattern time-series data beforehand using an offline computer and to load the data to the memory of the on-board microcomputer which outputs the data successively during walking, and to interpolate the adjacent time-series data to shorten the time interval (i.e., increase the sampling rate).

Since, however, the gait data have been prepared beforehand, the prior-art techniques fail to generate a gait freely on a real-time basis during walking such that the robot may, for example, change its stride or the angle of turning as desired.

A first object of the present invention is to solve the drawbacks of the prior art and to provide a gait generation system of a legged mobile robot which generates, freely on a real-time basis, a gait taking onto account the floor reaction force such that a desired stride or a desired angle of turning, etc is realized.

A second object of the present invention is to solve the drawbacks of the prior art and to provide a gait generation system of a legged mobile robot which generates a gait freely on a real-time basis such that a displacement and a (displacement) velocity of a robot portion are continuous at the boundary of the gaits thus generated.

A third object of the present invention is to solve a drawback of the prior art and to provide a gait generation system of a legged mobile robot which controls the locomotion of the robot based on a gait generated on a real time basis.

DISCLOSURE OF THE INVENTION

In order to achieve the first and second objects, the present invention provides a system for generating a gait of a legged mobile robot having at least a body and a plurality of leg links each connected to the body through a joint, comprising standard gait storing means for storing, in memory, a plurality of standard gaits, for at least one walking step, each comprising a set of parameters including a parameter relating to a floor reaction force, gait demanding means for making a demand for gait, and gait generating means for generating an approximated gait which satisfies the demand for gait by selecting one or a plurality of the standard gaits in response to the demand for gait, and by conducting approximation based on the selected standard gait or gaits.

It is configured such that said gait generating means generates the approximated gait by calculating a weighted average of the selected gaits.

It is configured such that said gait generating means generates the approximated gait by using a parameter sensitivity of the selected gait or gaits.

It is configured such that said gait generating means generates the approximated gait by calculating a weighted average of the selected gaits and by using a parameter sensitivity of the selected gait or gaits.

It is configured such that said gait generating means includes storing means for determining an amount of change in one parameter relative to a unit amount of change in another parameter in at least one of the standard gaits, as the parameter sensitivity of the selected gait and for storing the parameter sensitivity in memory, and generates the approximated gait by using the stored parameter sensitivity.

It is configured such that said gait means incudes describing means for describing a relationship of perturbation of one parameter relative to the parameter relating to the floor reaction force in the standard gaits, and corrects the approximated gait based on the described relationship of perturbation to generate gaits which satisfy the demand for gait in such a manner that at least displacements and velocities in the generated gaits are continuous at a boundary of the gaits.

It is configured such that the perturbation of the one parameter is a perturbation of a horizontal body position.

It is configured such the relationship is described by a linear model.

It is configured such that the relationship is described by an inverted pendulum model.

It is configured such that the relationship is described by time-series tabulated data.

It is configured such that said gait generating means generates the approximated gait without considering the parameter if it is under a predetermined condition.

It is configured such that said gait generating means includes joint angle command calculating means for calculating a joint angle command of the robot based on the generated gait, and joint controlling means for controlling the joint of the robot such that it traces the calculated joint angle command.

It is configured such that said joint angle command calculating means includes detecting means for detecting a state of the robot, and correcting means for correcting a position and a posture of the robot in response to the detected state, and calculates the joint angle command such that the corrected position and the orientation are effected.

DETAILED DESCRIPTION OF THE PREFERRED EMBODIMENTS

The gait generation system of a legged mobile robot according to the present invention will be explained with reference to the accompanied drawings. A biped robot is taken as an example of a legged mobile robot.

Figure 1:
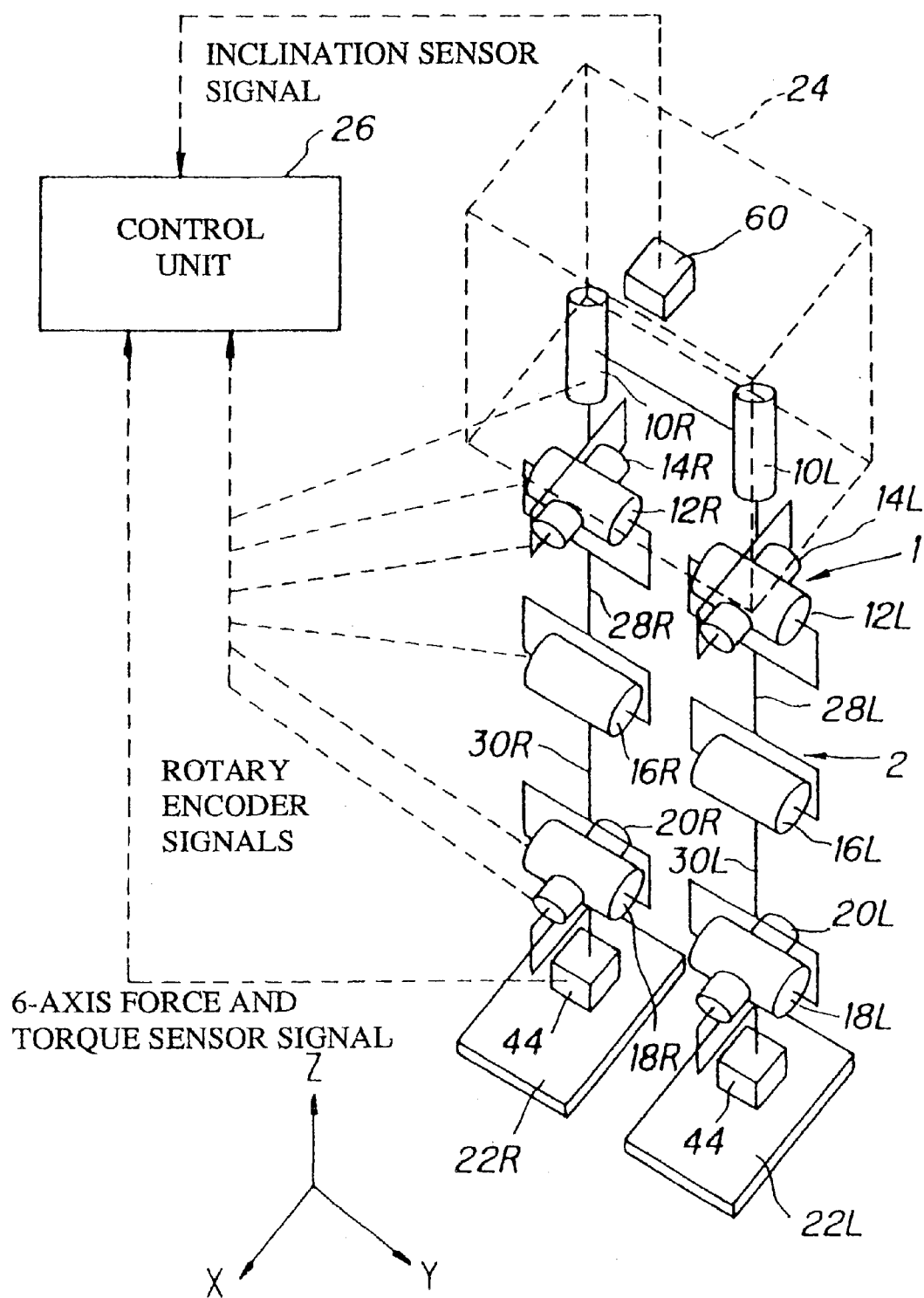
FIG. 1 is a schematic view showing an overall configuration of a gait generation system of a legged mobile robot according to the present invention.

FIG. 1 is a schematic view showing an overall configuration of the system including a biped robot 1 according to the present invention.

As illustrated in the figure, the robot 1 has a pair of laterally spaced leg links 2 each composed of six joints. In a simple representation, each of the joints is represented by an electric motor which actuates the joint. The joints include, arranged successively downward, a pair of joints 10R, 10L (the right-hand joint is indicated by R and the left-hand joint by L) for rotating legs with respect to hips, a pair of joints 14R, 14L for rolling movement with respect to hips about an X-axis within a frontal plane, a pair of joints 12R, 12L for pitching movement with respect to hips about a Y-axis within a sagittal plane, a pair of knee joints 16R, 16L for pitching movement with respect to knees, a pair of joints 18R, 18L for pitching movement with respect to ankles, and a pair of joints 20R 20L for rolling movement with respect to ankles.

The robot 1 is provided with feet 22R, 22L and has a body (trunk) 24 as its uppermost portion which houses therein a control unit 26 comprising microcomputers which will be described later with reference to FIG. 2. The joints 10R(L), 12R(L), 14R(L) make up hip joints, and the joints 18R(L), 20R(L) make up ankle joints. The hip joints and knee joints are connected to each other by thigh links 28R, 28L, and the knee joints and ankle joints are connected to each other by crus or shank links 30R, 30L.

With the above structure, each of the leg links 2 is given six degrees of freedom. When the 6 *2=12 joints are driven to suitable angles while the robot 1 is walking, a desired motion is imparted to the entire leg structure to cause the two-legged walking robot 1 to walk arbitrarily in a three-dimensional environment. (In the specification, "*" represents multiplication.)

It should be noted that, throughout the description, the position and velocity of the body 24 are used to represent those of a representative position such as the position of the center of gravity of the body 24 and (displacement) velocity thereof.

As shown in FIG. 1, a known six-axis force and torque sensor 44 is disposed below the ankle joints for measuring three directional components Fx, Fy, Fz of force and three directional components Mx, My, Mz of torque or moment thereby to detect whether the foot 22R(L) has landed or not, or if a load or force is acting on the robot through the foot assembly when it contacts the floor. The body 24 has an inclination sensor 60 for detecting tipping or inclination in the frontal plane with respect to a Z-axis (the direction of gravity) and its angular velocity (rate), and also a tilt in the sagittal plane with respect to the Z-axis and its angular velocity. The electric motors of the respective joints are coupled with respective rotary encoders for detecting angular displacements of the electric motors.

Although not shown in FIG. 1, the robot 1 is configured to have a joystick 62 at an appropriate position thereof, through which an operator can input a demand for the gait to change to another gait such as making the robot, when walking straight, to turn.

Figure 2:
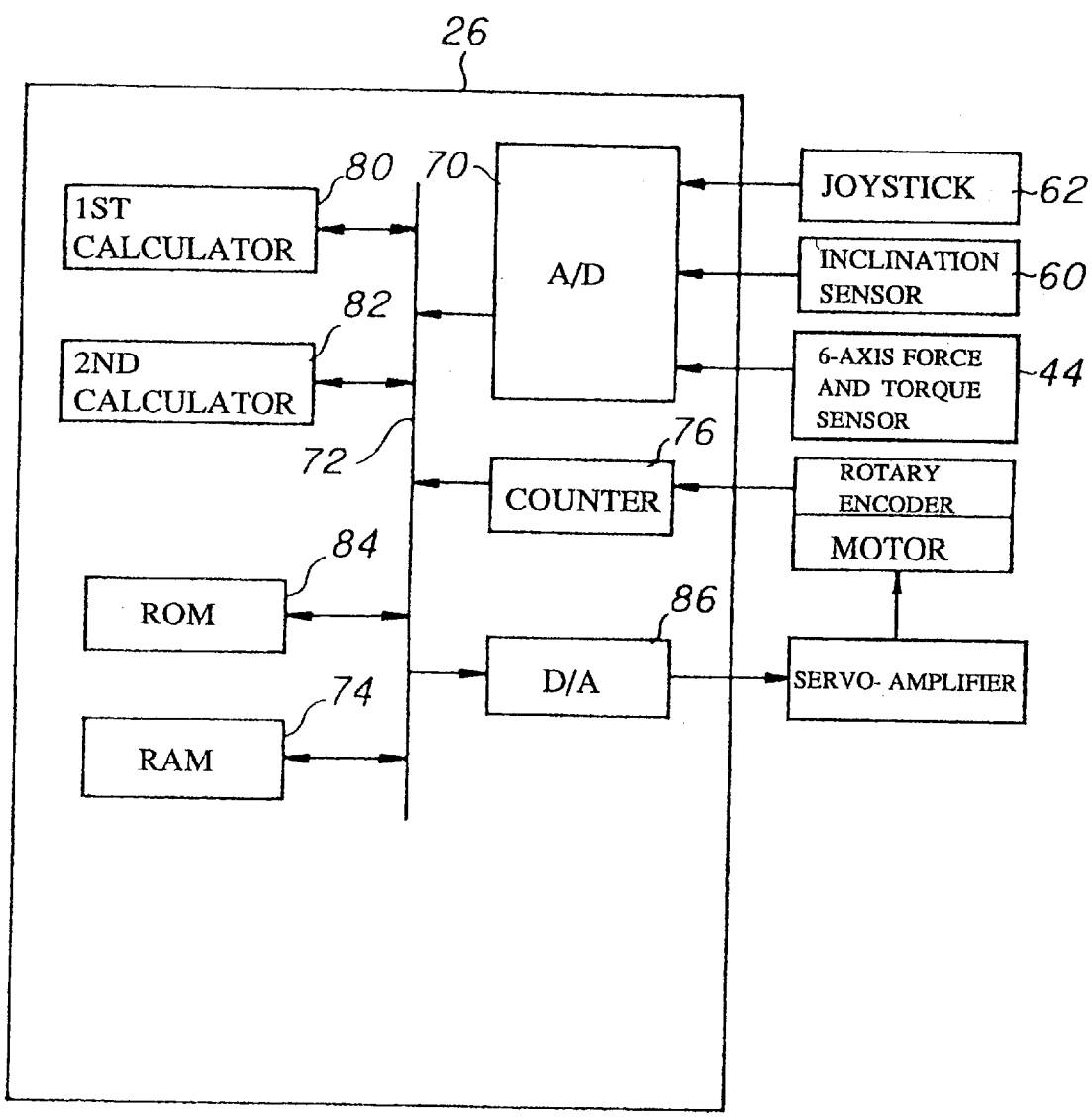
FIG. 2 is a block diagram showing details of a control unit of a biped robot illustrated in FIG. 1.

FIG. 2 is a block diagram which shows the details of the control unit 26, which is comprised of microcomputers. Outputs from the inclination sensor 60, etc., are converted by an A/D converter 70 into digital signals, which are transmitted through a bus 72 to a RAM 74. Output signals from the rotary encoders that are disposed adjacent to the respective electric motors are transmitted through a counter 76 to the RAM 74.

The control unit 26 includes first and second calculators 80, 82 comprising CPUs. The first calculator 80 generates a gait freely on a real-time basis during walking using standard gaits prepared beforehand and stored in a ROM 84, calculates desired joint angles based on the generated gait, and outputs to the RAM 74. The second calculator 82 reads the desired joint angles and detected values from the RAM 74, and outputs manipulated variables through a D/A converter 86 and servo-amplifiers to the electric motors provided at the respective joints.

Figure 3:
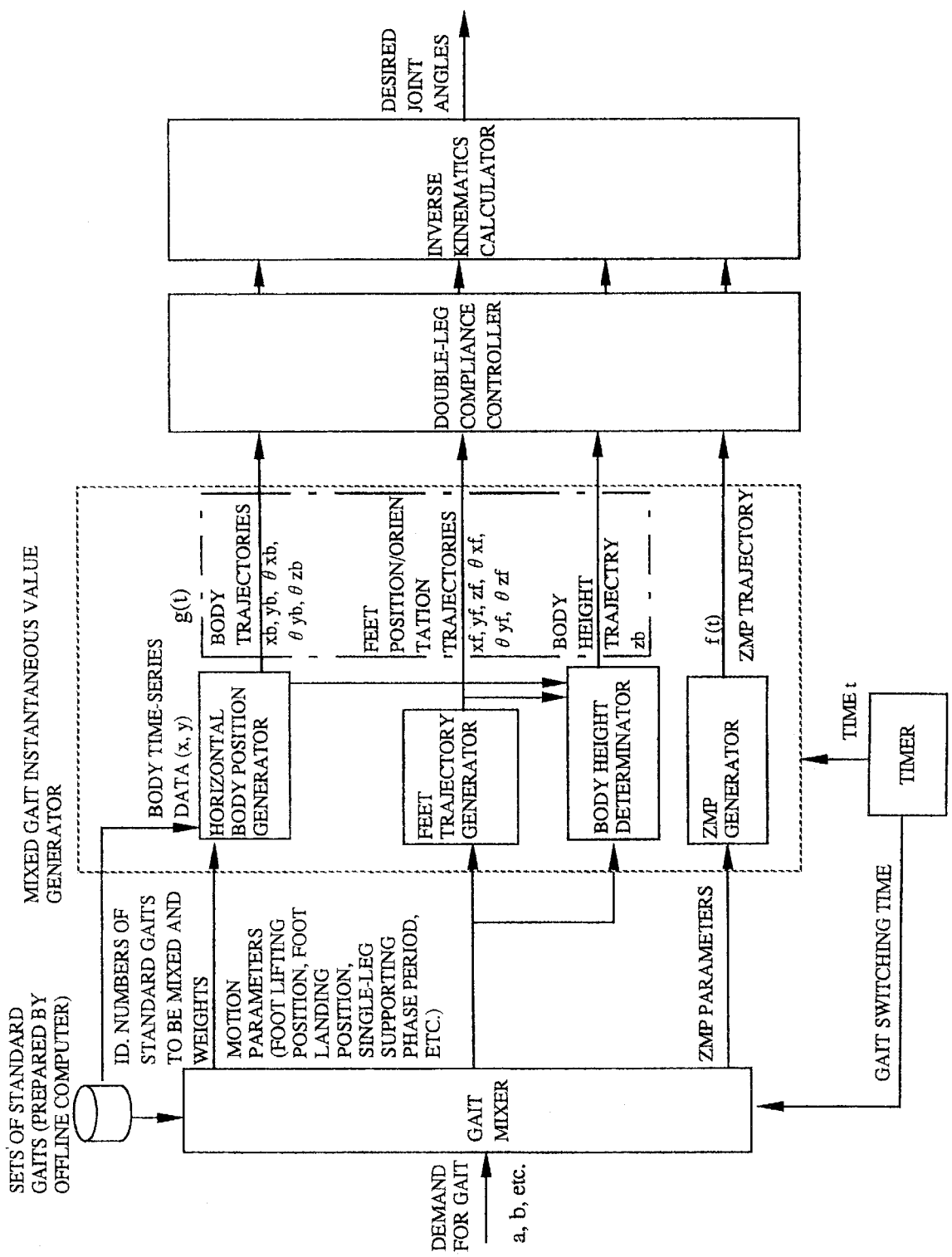
FIG. 3 is a block diagram showing the operation of the gait generation system of a legged mobile robot according to the present invention.
Figure 4:
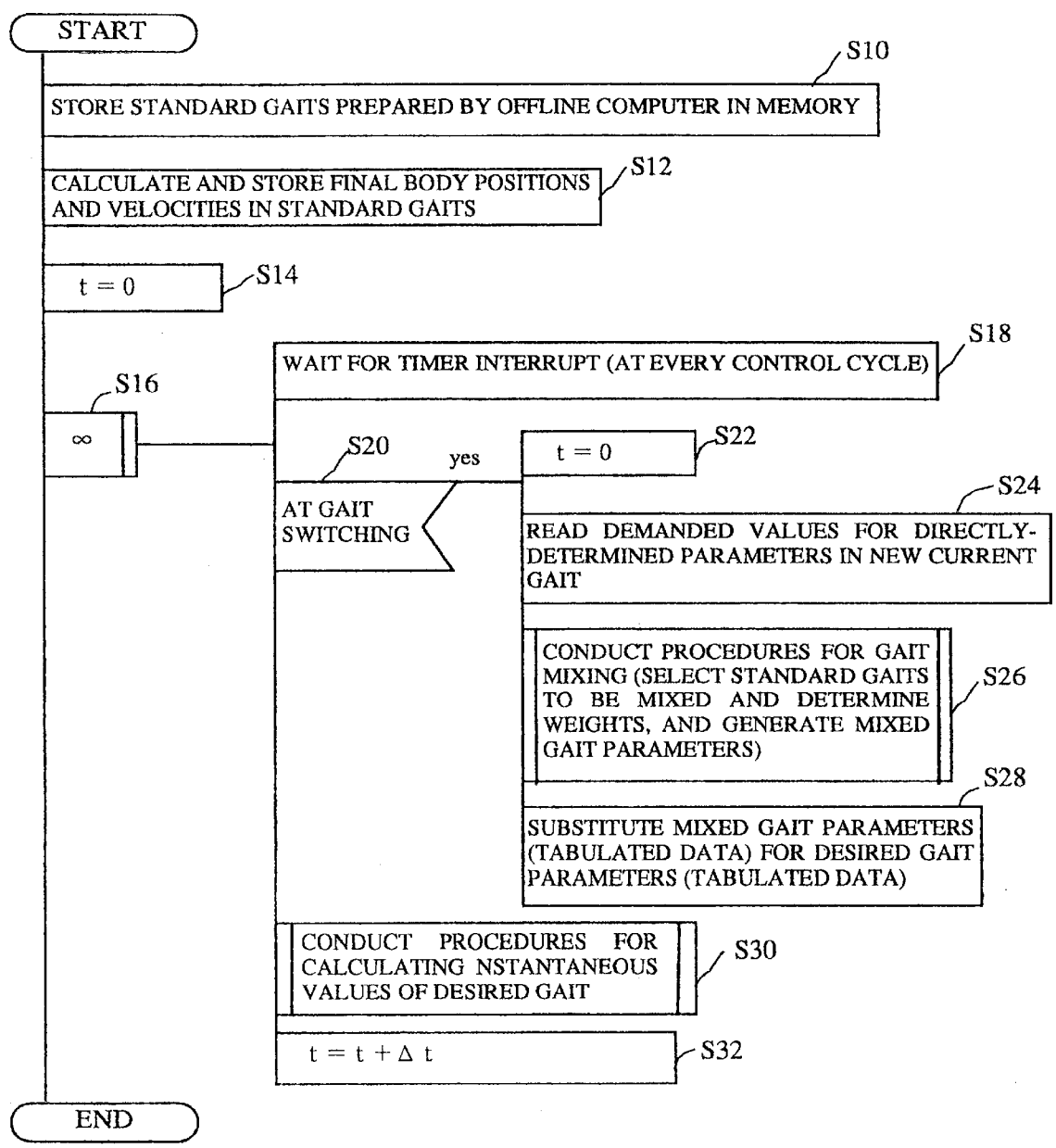
FIG. 4 is a main flow chart showing the operation of the gait generation system of a legged mobile robot according to the present invention.
Figure 5:
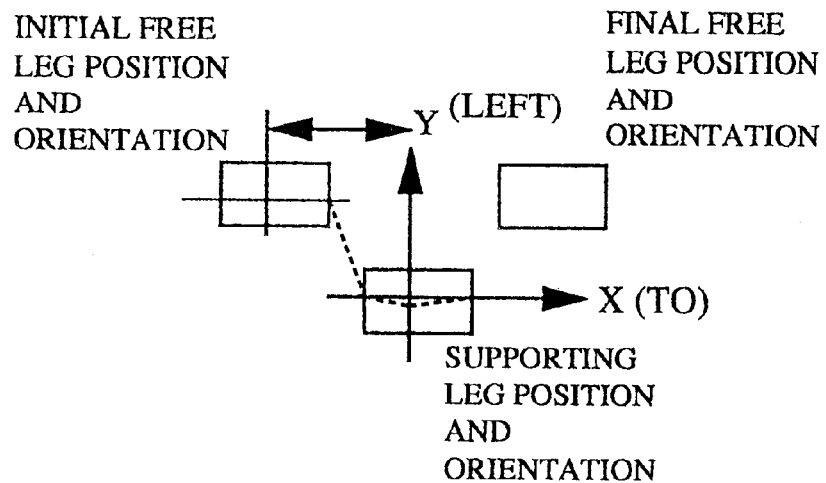
FIG. 5 is an explanatory view showing the free leg position and orientation in standard gait No. 0 from among the standard gaits used in the gait generation shown in FIGS. 3 and 4.
Figure 6:
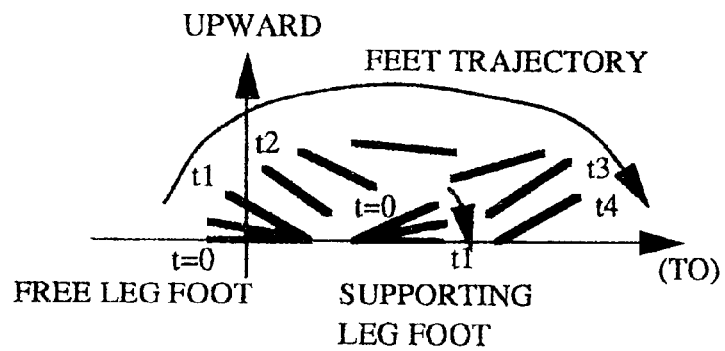
FIG. 6 is an explanatory side view showing the feet trajectory in standard gait No. 0 illustrated in FIG. 5.

FIG. 3 is a block diagram which shows the operation of the system according to the present invention in a functional manner, while FIG. 4 is a flow chart (called a "structured flow chart") showing the procedures of gait mixing or gait generation illustrated in the block diagram. In the specification, the gait generation is sometimes referred to as "gait mixing".

Explaining first the gait to be generated by the system, the present invention aims to provide a system which generates a gait on a real-time basis as mentioned above. More specifically, the present invention aims to generate a gait which is necessary for conducting the robot posture stability control utilizing the double-leg compliance control proposed earlier by the applicant in Japanese Laid-Open Patent Application No. Hei 5 (1993)—305,585 based on which U.S. Pat. No. 5,432,417 issued that is incorporated herein by this reference.

To facilitate understanding, the posture stability control proposed earlier will briefly be explained. In the control, the error between a desired value and the detected value of the floor reaction force (ZMP) is first determined, and either or both of the legs are moved to decrease the error, thereby effecting posture stability. When the robot is about to tip over, the desired floor reaction force is intentionally deviated or shifted so as to deviate or shift the actual floor reaction force, thereby restoring robot posture stability.

In a legged mobile robot, thus, it is impossible to ensure stable walking or locomotion unless the relationships among the desired motion trajectories and the desired floor reaction force pattern satisfy the dynamic equilibrium condition. To satisfy the dynamic equilibrium condition means, to be more specific, that the central point of the desired floor reaction force (the point of action on the floor at which the secondary moment of the desired floor reaction force becomes zero) is equal to the ZMP (Zero Moment Point; the point on the floor at which the moment of the resultant force of the inertial force due to motion and gravity is zero except for its vertical component). If they do not accord with each other, when the compliance control is operative, the robot loses dynamic equilibrium between the resultant force and the floor reaction force and will tip.

In the compliance control proposed earlier, this is deliberately utilized to restore stability when the robot is about to tip or turn over. As was understood from the above, the legged mobile robot should have, as desired values in the control of locomotion, not only the desired motion pattern, but also the desired floor reaction force pattern satisfying the dynamic equilibrium condition relative to the desired motion pattern.

The desired floor reaction force is generally described by a point of action and by a force and moment acting thereat. Since the point of action can be set at any point, the desired floor reaction force has numerous descriptions. However, if the desired floor reaction force is described by taking the aforesaid central point of the desired floor reaction force as the point of the action, the moment, acting at the point, of the resultant force is zero except for its vertical component.

As stated above, since the trajectory of the central point of the desired floor reaction force (which satisfies the dynamic equilibrium condition relative to the desired motion trajectories) is equal to the ZMP, the desired ZMP trajectory can be used in lieu of the desired floor reaction force central point trajectory.

Therefore, the above can be rewritten as; "the legged mobile robot should have, as desired values in the control of locomotion, not only the desired motion patterns or trajectories, but also the desired ZMP trajectory (desired floor reaction force pattern)". Based on the above, the desired gait is defined in this specification as follows.

a) The desired gait is, in a broad sense, a set of the desired motion trajectories and the desired floor reaction force pattern over a period of a walking step or steps.

b) The desired gait is, in a narrower sense, a set of the desired motion trajectories and the ZMP trajectory for a period of a single walking step.

c) A series of walking is comprised of a series of gaits.

Hereinafter, for a more rapid understanding, the desired gait is used to represent that gait defined in the narrower sense, unless it is mentioned to the contrary. Specifically, the desired gait is used to mean a gait for a period beginning from the initial state of a double-leg supporting phase to the final state of a single-leg supporting phase that follows. Here, needless to say, the double-leg supporting phase means a period during which the robot 1 supports its weight with two leg links 2, whereas the single-leg supporting phase means a period during which the robot supports its weight with one of the two leg links 2. The leg (link) which does not support the robot weight during the single-leg supporting phase is called the free leg, while the other the supporting leg.

The object of the present invention is to generate the desired gait defined above freely and on a real-time basis. If such a gait can be generated freely on a real-time basis, it becomes possible, for example, for an operator to manipulate the robot 1 by remote control. Moreover, in manipulating the robot automatically, it becomes possible not only to control the robot to walk in accordance with a predetermined sequence, but also to guide the robot to walk along a path or to effect high precision positioning.

Here, the conditions which the desired gait should satisfy will be explained.

The conditions which the desired gait should satisfy will generally be classified into the following five conditions.

Condition 1) The desired gait must satisfy the dynamic equilibrium condition. In other words, the ZMP trajectory calculated dynamically in response to the desired motion trajectories of the robot 1 should accord with the desired ZMP trajectory.

Condition 2) When a demand(s) such as a change in stride or in the angle of turning is made by a locomotion planner or path planner (neither shown) of the robot 1 or by an operator through the joystick 62, the desired gait should satisfy such a demand(s).

Condition 3) The desired gait should satisfy conditions of constraint in kinematics such as that the robot foot must not dig or scrape the floor on which it walks, the joint angle must be within the movable range, and the joint angular velocity must not exceed the permissible range.

Condition 4) The desired gait should also satisfy conditions of constraint in dynamics such as the ZMP having to remain within the foot sole floor-contact area during the single-leg supporting phase, and that the joint torque must not exceed the possible maximum power of the joint actuators.

Condition 5) The desired gait should satisfy conditions of boundary. As a matter of course, condition 1 results in the condition of boundary that the position and velocity of robot portions such as the body must be continuous in the gait boundary. (If not, infinite force would occur or the ZMP would move far from the foot sole floor-contact area).

More specifically, the final state of n-th gait should correspond to the initial state of n+1-th gait, especially in the body position, orientation and velocity relative to the feet position and orientation. More specifically, if the initial state of n+1-th gait is already determined, it suffices if the final state of n-th gait is accorded with the n+1-th gait initial state.

If not determined, it suffices if the final state of n+1-th gait is within a range that ensures continuous walking without losing posture stability. However, as will be discussed later, it is quite difficult to determine the final state range which ensures continuous walking without losing posture stability.

Generally speaking, the desired gait is generated by a gait generation algorithm including parameter values or time-series tabulated data, like the standard gaits explained later. (In other words, to determine the gait means to determine the parameter values or time-series tabulated data appropriately.)

Various gaits can be generated by changing the parameter values or time-series tabulated data. However, if the parameters or time-series tabulated data are determined without paying careful attention, it is uncertain whether the generated gait can satisfy all of the conditions mentioned above.

In particular, when generating the body trajectories satisfying condition 1) based on the ZMP trajectory by a gait generation algorithm, even when the ranges, suitable for continuous walking, of the body position and velocity at the gait end or final state are known, it is difficult to determine the parameters relating to the ZMP trajectory such that both the body position and velocity will fall within the range at the gait end.

The reasons of the difficulty are as follows.

Reason 1) The robot body tends to move farther from the ZMP, once initially moved away from the ZMP. This will be explained using an inverted pendulum model which approximates the behavior of the robot body.

If the inverted pendulum's supporting point deviates from the projection point of the center of the gravity of the pendulum projected to the floor, the deviation tends to increase, and the pendulum turns over. Even when the pendulum is turning over, the resultant force of the inertial force and gravity of the inverted pendulum is acting on the supporting point (in other words, the ZMP is kept equal to the supporting point, and the resultant force is kept balanced with the floor reaction force acting through the supporting point. The dynamic equilibrium condition merely describes an instantaneous relationship between the inertial force and gravity and the floor reaction force of a moving object.

It is a frequent misconception that continuous robot walking can be ensured if the dynamic equilibrium condition is satisfied. However, satisfaction of the dynamic equilibrium condition will not ensure that the robot does not lose a stable posture during walking. Just as the center of gravity of the inverted pendulum tends to move farther, if moved from the position immediately above the supporting point, the center of gravity of the robot tends, once moved from the position immediately above the ZMP, to move farther therefrom.

Reason 2) The single-leg supporting phase requires that the ZMP must be within the supporting leg foot sole floor-contact area. Due to rigid conditions of constraint such as this, it is difficult to determine the body acceleration and deceleration patterns. If the body patterns are determined mainly taking body position into account, the velocity would tend to be out of range at the gait end, and vice versa. An analogy when driving a vehicle, is to stop the vehicle at a predetermined stopping position at a designated time, while limiting braking force to within a narrow preset range.

Thus, it has hitherto been difficult to generate or determine the desired gait parameters or tabulated data, on a real-time basis, which will satisfy all of the possible gait conditions. The aforesaid prior art techniques described in the references hence could not effect free robot walking.

Based on the above, the system according to the present invention will be explained with reference to FIG. 3. The figure, a block diagram, shows the system in a functional manner so as to facilitate understanding of the operation of the system illustrated in FIG. 4.

In the system illustrated, the gait(s) is generated in a mixed gait instantaneous value generator on the basis of a set or group of standard gaits (which have been generated in an offline computer and stored in the ROM 84) in such a manner that the generated gait satisfies a demand for gait (such as to change gaits) made on a real-time basis during walking.

The standard gaits have been prepared by an offline computer by selecting gaits, through trial-and errors, which ensure a long continuous period of walking up to the final step, without causing the robot body trajectory to diverge, and have been stored in the ROM 84. The standard gaits which ensure a long continuous period of walking are typically comprised of a series of gaits having a gait to start walking from a standing position, a gait for accelerating the walking speed, a gait for constant speed walking, a gait for decelerating the walking speed, and a gait to stop walking.

The gait is described by gait parameters. The gait parameters are comprised of motion parameters and the ZMP parameter (more generally floor reaction force parameter). The "floor reaction force parameter" is used in this specification to mean a parameter relating to the floor reaction force pattern with respect to time.

Figure 7:
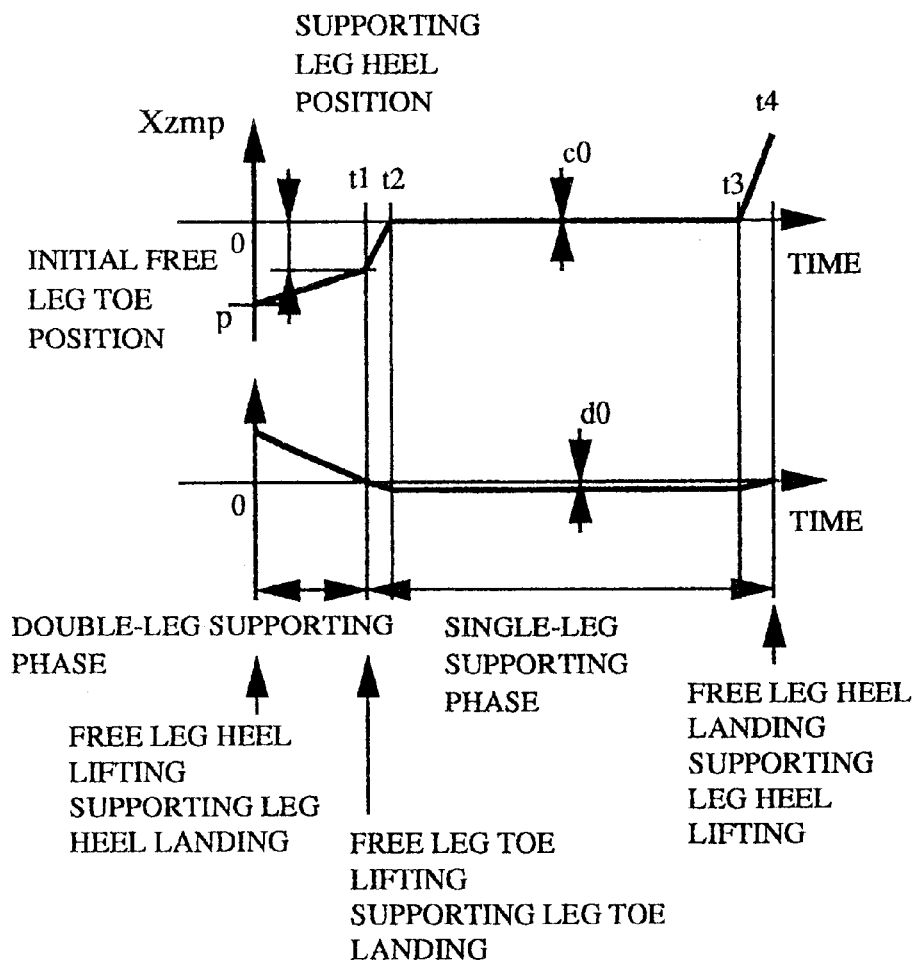
FIG. 7 is a time chart showing the trajectory of the ZMP (in the X-coordinate or direction) in standard gait No. 0 illustrated in FIG. 5.
Figure 8:
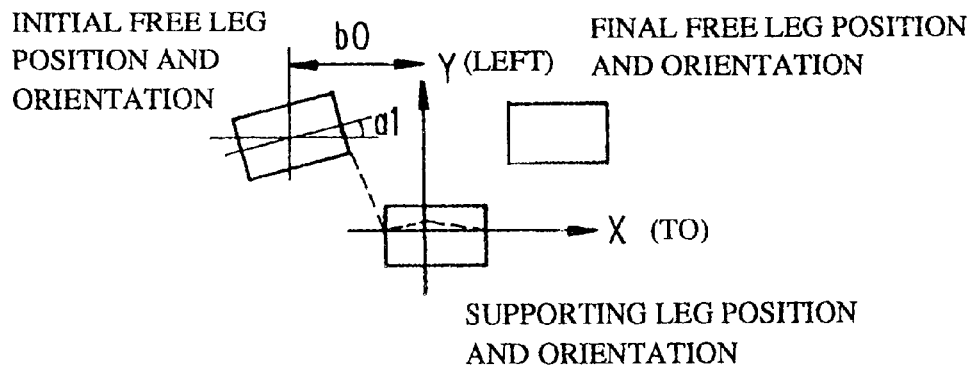
FIG. 8 is an explanatory view showing the free leg position and orientation in standard gait No. 1 from among the standard gaits used in the gait generation shown in FIGS. 3 and 4.
Figure 9:
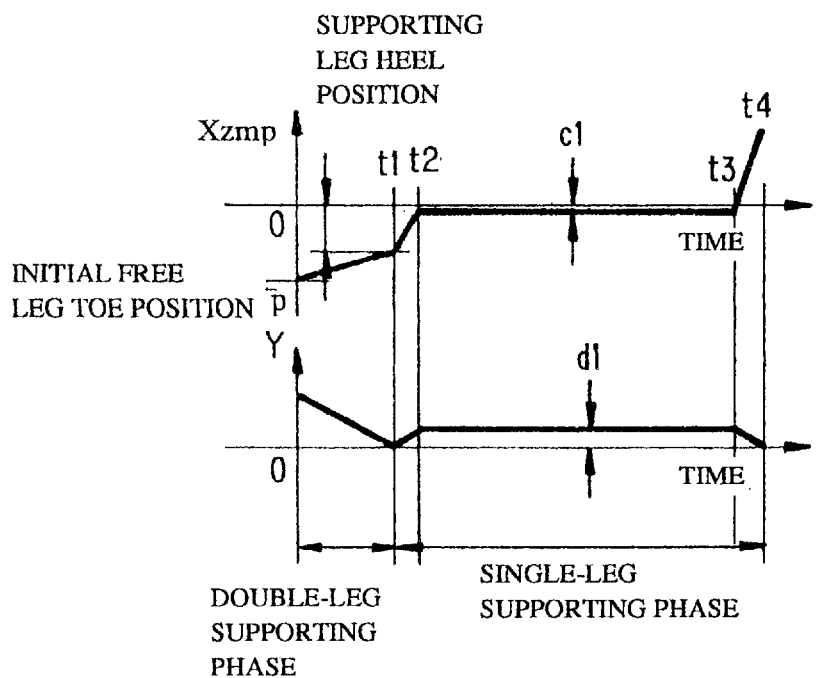
FIG. 9 is a time chart showing the trajectory of the ZMP (in the X-coordinate or direction) in standard gait No. 1 illustrated in FIG. 8.
Figure 10:
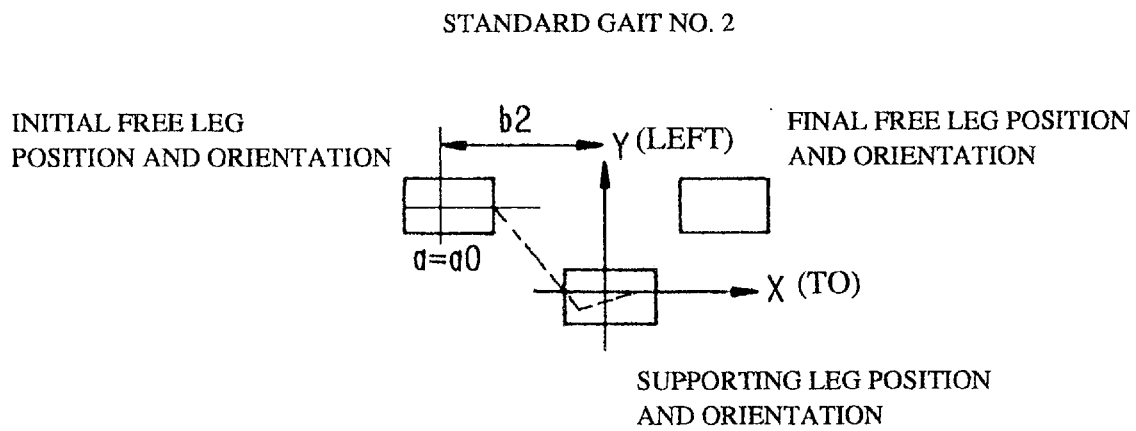
FIG. 10 is an explanatory view showing the free leg position and orientation in standard gait No. 2 from among the standard gaits used in the gait generation shown in FIGS. 3 and 4.
Figure 11:
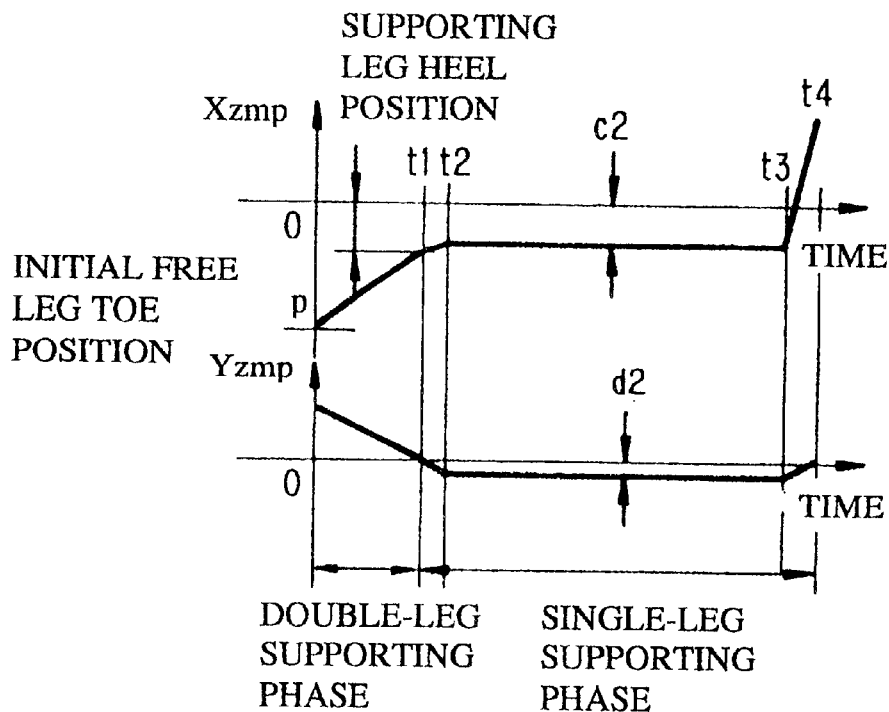
FIG. 11 is a time chart showing the trajectory of the ZMP (in the X-coordinate or direction) in standard gait No. 2 illustrated in FIG. 10.

The ZMP trajectory has a zig-zag pattern, and the ZMP parameter is described in the coordinate of X, Y and Z (directions) by the positions of the braking points and passing times as is shown in FIG. 7. (The ZMP is referred to only in the X-coordinate.) In the mixed gait instantaneous value generator, instantaneous values of ZMP (trajectory), i.e., values at current (current time) control cycle are calculated in a ZMP generator based on the ZMP parameters.

The motion parameters are comprised of feet (trajectory) parameters and the body (trajectory) parameters.

The feet trajectory parameters are comprised of initial free leg (foot lifting) position and orientation, final free leg (foot landing) position and orientation, and the periods or times of the double-leg supporting phase and the single-leg supporting phase, etc. Based on these, instantaneous values of the positions (xf, yf, zf) and orientations (θxf, θyf, θzf) of both feet are determined by a feet trajectory generator in accordance with the technique proposed earlier by the applicant in Japanese Laid-Open Patent Applications Hei 5 (1993)—318, 339 and Hei 5 (1993)—324,115 based on which U.S. Pat. Nos. 5,594,644 and 5,428,563, respectively, issued that are incorporated herein by this reference. Here, the word "orientation" means inclination or direction in space.

The body trajectory parameters include parameters defining the body orientation (the direction or inclination of the body 24 in space), the body height (a value in the Z-direction), initial body position (displacement) and velocity, etc.

Based on the parameters determining the body position and orientation, instantaneous values of the horizontal position (xb, yb) and orientation (θxb, θyb, θzb) of the body are generated in a horizontal body position generator in accordance with time functions or the technique proposed earlier by the applicant in Japanese Laid-Open Patent Application Hei 5 (1993)—324,115. The body position is, as mentioned earlier, the position of the representative point such as the center of mass of the body 24. The height of body zb is determined in a body height determinator using an appropriate technique such as that described in a patent application filed by the applicant on the same date as the present invention.

Since the legged mobile robot 1 has 12 joints as illustrated in FIG. 1, joint angles are deterministically calculated by an inverse kinematic solution from the obtained feet positions and orientations and the body position and orientation. More specifically, the current desired robot posture is solely determined. (More precisely, the desired feet positions and orientations are subject to correction in a double-leg compliance controller and based on the corrected values (if corrected), the desired joint angles are calculated.)

The gaits are deterministically described by the gait parameters. In this embodiment, however, in order to reduce the volume of calculation, standard gait body trajectories have been prepared in advance by an offline computer as time-series tabulated data to be stored in memory, whereby data corresponding to the control cycle is successively output. When the capacity of the ROM 84 is relatively small, it is alternatively possible to approximate the standard gait body trajectories using a polynomial and coefficients of the polynomial are stored in memory as a kind of gait parameter, although this does lead to a small approximation error.

Hereafter, the standard gaits are further explained. The standard gaits are described in this specification as time functions. Each standard gait is described by a set g(t) and f(t) defined as follows.

g(t): functions describing the motion of the robot. (Specifically, the functions represent the positions and orientations of the robot components at time t, more specifically, the motion of the robot is described by the positions and orientations of the robot body and feet as shown in FIG. 3);

f(t): functions describing ZMP trajectory. Specifically, the functions represent, as mentioned above, the positions (x, y, z) of the ZMP at time t.

The gait functions are described by symbols in view of the parameters. To be more specific, g(t) and f(t) are functions which are defined by the gait parameters. Although it is preferable that all the parameters are represented, so as to clearly indicate gaits, since the number of parameters is large, only those parameters necessary for the following explanation are described here.

g(t: a, b, c, d, x(k), y(k)): functions describing robot motion trajectories;

f(t: a, b, c, d): functions describing the ZMP trajectory (functions describing the floor reaction force).

where:

a: initial free leg foot orientation (indicative of the turning angle of the robot)

b: initial free leg foot positions in the to-and-fro direction (walking stride)

c: the X-coordinate of ZMP in the single-leg supporting phase d: the Y-coordinate of ZMP in the single-leg supporting phase x(k): the X-coordinate of body positions in time-series y(k): the Y-coordinate of body positions in time-series.

In the representation, the time-series data is treated as a kind of parameter. Inherently, without a time-series table describing the body position, the gait is solely or deterministically determined when the parameters of the initial body position and velocity are given. The body position time-series data is thus redundant. However, in order to shorten the gait generation time on a real-time basis, the body position time-series data table is treated here as a kind of parameter describing gaits.

In this embodiment, the initial body position and velocity parameters are different for different gaits. Since, however, the initial body position and velocity can be calculated when the body position time-series data are described explicitly, no further explanation is made here.

In the embodiment, the standard gaits such as that for beginning walking from standing position are prepared using an offline computer as mentioned above. The following three gaits are examples.

standard gait No. 0
 g(t: a0, b0, c0, d0, x0(k), y0(k))
 f(t: a0, b0, c0, d0)
standard gait No. 1
 g(t: a1, b0, c1, d1, x1(k), y1(k))
 f(t: a1, b0, c1, d1)
standard gait No. 2
 g(t: a0, b2, c2, d2, x2(k), y2(k))
 f(t: a0, b2, c2, d2)

FIGS. 5 to 11 illustrate the initial free leg foot positions and orientations, and the final free leg foot positions and orientations, etc. In order to describe the gaits, the coordinate system is set with a reference point on the supporting leg foot sole floor-contact surface as the origin, and the to-and-fro direction of the supporting leg foot as the X-direction and the left-to-right direction as the Y-direction.

Figure 12:
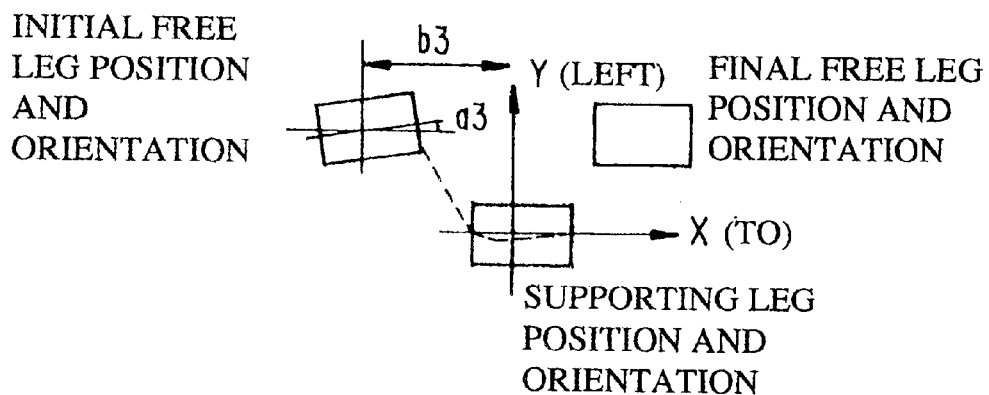
FIG. 12 is an explanatory view showing the free leg position and orientation of a demanded gait demanded in the gait generation shown in FIGS. 3 and 4.
Figure 13:
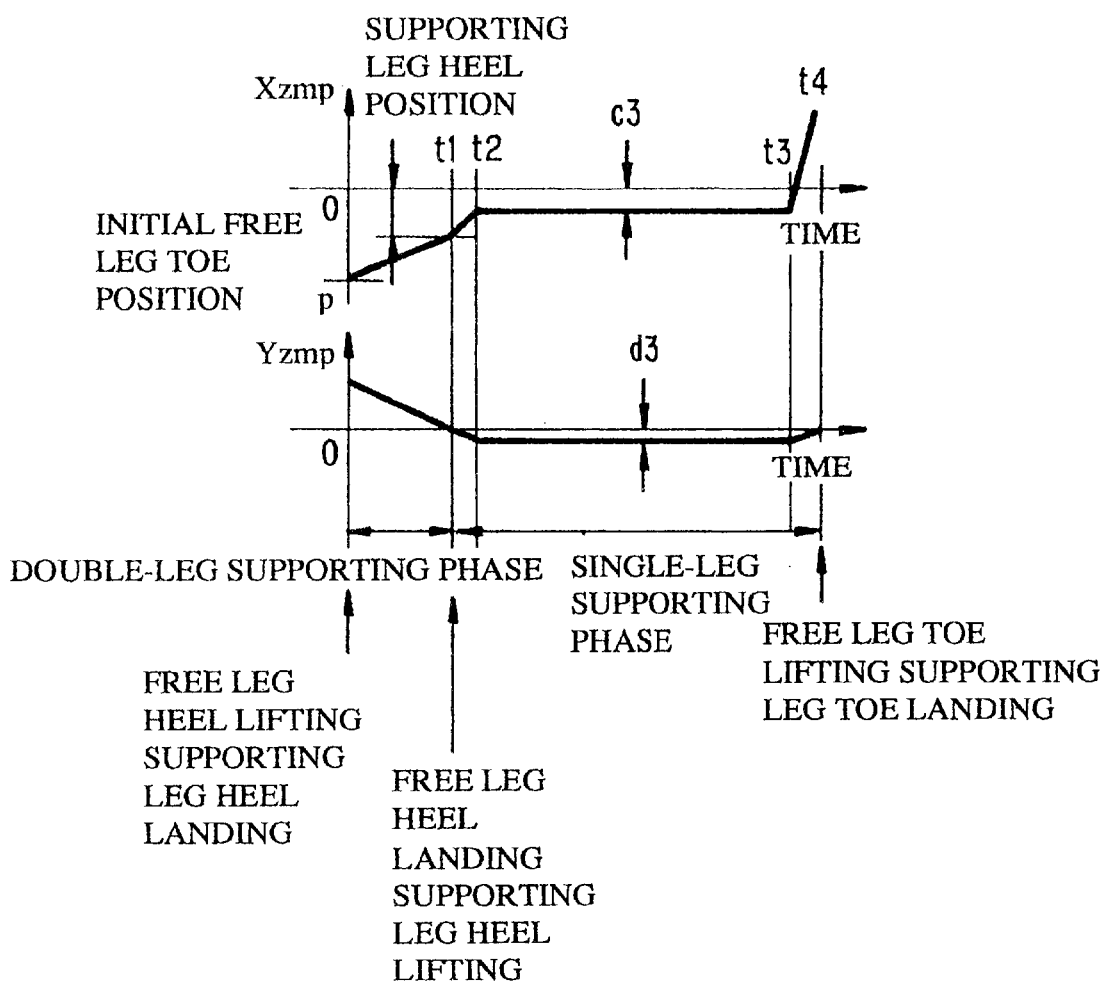
FIG. 13 is a time chart showing the trajectory of the ZMP (in the X-coordinate or direction) in the demanded gait illustrated in FIG. 12.

Before entering into the explanation of the flow chart of FIG. 4, assume that the demand for gait is given as shown in FIGS. 12 and 13 and taking as an example the generation of the demanded gait (the aforesaid approximated gait, referred to hereinafter as "3rd gait") for satisfying the demand using the standard gaits, the operation of the system is explained. The demanded gait should have been given initial free leg orientation a3 and to-and-fro position b3.

Apparently, the parameter a is a3 and b is b3 in the 3rd gait. The problem is how to determine the other parameters c, d and the tabulated values x(k), y(k) so as to satisfy the demand.

The 3rd gait is therefore described as follows;
 g(t: a3, b3, c3, d3, x3(k), y3(k))
 f(t: a3, b3, c3, d3).

Then the parameters c3, d3 and the time-series tabulated data x3(k) and y3(k) are determined.

Here, the terms are defined. The parameters a, b include values input as a request (same as the aforesaid demand for gait) from outside of the system (such as by an operator via the joystick 62) or through another system (such as from the double-leg compliance controller in the block diagram of FIG. 3). The parameter whose value is demanded directly to be a determined value is called "directly-determined parameter".

In order to simplify the explanation, it is described in this embodiment that only the initial free leg foot orientation and to-and-fro position (stride) can be changed at discretion. Moreover, the following 1) and 2) can be input as the demand for gait, as mentioned above. In addition, 3) can also be input which will be mentioned in the fourth embodiment of the present invention.

1) instructions from an operator (e.g., instructions on turning angle or turning angular velocity, or locomotion speed)

2) demand from other system such as a path guidance system, if any (e.g., final free leg foot position and orientation)

3) boundary conditions of gaits between the current gait and the preceding or next gait (e.g., initial body position and orientation, initial free leg foot position and orientation).

On the other hand, parameters such as c, d, or the tabulated data x(k), y(k) are called dependent parameters (or tabulated data), which are determined based on the directly-determined parameter such that they satisfy the gait conditions. Since it is quite difficult to directly determine the time-series tabulated data, the time-series tabulated data is rarely a directly-determined parameter.

The aforesaid standard gaits No. 1 or No. 2 (other than the standard gait No. 0) are based on the standard gait No. 0 and only one of the directly-determined parameters, (i.e, a or b) differs from that of standard gait No. 0). The basic gait among the selected standard gaits, (i.e., standard gait No. 0) is called the base gait.

The determination of the demanded gait parameters (the demanded gait parameters are referred to sometimes as "mixed parameters" in this specification) will be explained. The dependent parameters c3, d3 and the dependent tabulated data x3(k), y3(k) vary in response to the directly-determined parameters a, b so as to satisfy the conditions of gait. Moreover, it is supposed that they vary continuously in response to the change in the parameters a, b. The values are therefore continuous functions of the parameters a, b. This means that the following principle of approximation can be utilized or applied. In other words, the demanded gait parameters can be calculated by approximation method.

To be more specific, if function p is a continuous function, it can be approximated using the following expression.

$$P(a0+\Delta a, b0+\Delta b)=P(a0, b0)+\delta P/\delta a|(a=a0, b=b0)*\Delta a+\delta P/\delta b|(a=a0, b=b0)*\Delta b \quad \text{Approximation 1}$$

here, $\delta P/\delta a|(a=a0, b=b0)$ is a partial differential of P relative to a at $a=a0, b=b0$;

$\delta P/\delta b|(a=a0, b=b0)$ is a partial differential of P relative to b at $a=a0, b=b0$.

Moreover, since $\delta P/\delta a|(a=a0, b=b0)=(P(a0+\Delta a1, b0)-P(a0, b0))/\Delta a1$ $\delta P/\delta b|(a=a0, b=b0)=(P(a0, b0+\Delta b2)-P(a0, b0))/\Delta b2$ Approximation 1 can be rewritten as follows.

$$P(a0+\Delta a, b0+\Delta b)=P(a0, b0)+\{P(a0+\Delta a1, b0)-P(a0, b0)\}/\Delta a1*\Delta a+\{P(a0, b0+\Delta b2)-P(a0, b0))\}/\Delta b2*\Delta b \quad \text{Approximation 2.}$$

The first embodiment is a development of Approximation 2 and the second embodiment (explained later) is a development of Approximation 1.

Continuing the explanation of the demanded gait parameters, the 3rd gait parameters are calculated from the standard gaits by dividing internally or externally (i.e., interpolating) all the dependent parameters and time-series tabulated data using the following equations. This is because it can be considered that the dependent parameters are in proportion to the directly-determined parameters.

If a3 is between a1 and a2, it is calculated by internal division, and if a3 is not between a1 and a2, it is obtained by external division. When the difference in the parameter can be neglected in the sense of dynamics, the parameter may be the same as that in the base gait. If the time-series tabulated data is calculated in the first calculator 80 at one time, the load of calculation becomes great. Thus, the internal or external division should accordingly be conducted only for data in the current control cycle.

The followings are the aforesaid equations for mixing (referred to later as "Eqs. 1") using internal or external division.

$$c3=c0+(c1-c0)*(a3-a0)/(a1-a0)+(c2-c0)*(b3-b0)/(b2-b0)$$

$$d3=d0+(d1-d0)*(a3-a0)/(a1-a0)+(d2-d0)*(b3-b0)/(b2-b0)$$

$$x3(k)=x0(k)+(x1(k)-x0(k))*(a3-a0)/(a1-a0)+(x2(k)-x0(k))$$

$$*(b3-b0)/(b2-b0)$$

$$y3(k)=y0(k)+(y1(k)-y0(k))*(a3-a0)/(a1-a0)+(y2(k)-y0(k))$$

$$*(b3-b0)/(b2-b0)$$

These Eqs. 1 are weighted average calculations of the standard parameters and tabulated data. For example, the equation for obtaining c3 can be rewritten as follows.

$$c3=\{1-(a3-a0)/(a1-a0)-(b3-b0)/(b2-b0)\}*c0+(a3-a0)/(a1-a0)*c1$$

$$*(b3-b0)/(b2-b0)*c2.$$

Since the sum of the weighted coefficients of c0, c1, c2 is 1, c3 is a weighted average whose weights of c0, c1 and c2 are respectively;

$$\{1-(a3-a0)/(a1-a0)-(b3-b0)/(b2-b0)\}$$

$$(a3-a0)/(a1-a0)$$

$$(b3-b0)/(b2-b0).$$

If the final body position and orientation should be varied at discretion as a directly-determined parameter, it suffices if a weighted average of the base gait and some standard gait whose ZMP parameters are different from each other is calculated. Since the final state of the mixed gait is nearly equal to the weighted average of the final states of the standard gaits including the base gait to be mixed, it suffices if the weights of the weighted average are determined such that the final state of the mixed gait (including the to-and fro position and velocity of the body) are identical to the demanded value.

If the body position is determined from the time-series tabulated data, the mixed gait will entirely satisfy the demanded value with respect to the final state conditions. However, when the body position is determined sequentially by dynamics calculation such that the determined ZMP trajectory is satisfied, as will be described in the seventh embodiment, it deviates to a small extent.

In determining the weights, each final state of the standard gaits to be mixed should be known. If the final states of the standard gaits have been prepared as tabulated data and stored in memory, it becomes possible to reduce the calculation time.

In the manner explained above, the mixed gait parameters are determined, and instantaneous values of the demanded gait at each time are generated or determined in the same way as the gait generation algorithm of the standard gait prepared by an offline computer.

Based on the above, the operation of the system according to the invention will be explained with reference to a flow chart shown in FIG. 4. The program begins at S10 in which the standard gait data prepared by an external computer have been loaded to or stored in the ROM 84. The program proceeds to S12 in which final body positions and velocities in each standard gait are calculated and stored in the memory.

Since the body position has been prepared as a function x(k), y(k) as mentioned above, the body velocity should be calculated from the final value and the value preceding the final value in the tabulated data. More specifically, the final value in the tabulated data is immediately determined as the position, and the difference between this value and the value preceding the final value is calculated and is used to determine the velocity.

The program then proceeds to S14 in which the timer value t is reset to zero (in other words, the timer is started), to S18, via S16, in which a timer interrupt is waited for (the timer is different from that in S14). The procedures shown in the flow chart of FIG. 4 are executed once per predetermined period such as 20 msec, i.e., the control cycle is 20 msec.

The program then proceeds to S20 in which it is determined whether the gait is at the time of switching (the end of a single walking step), or more specifically whether it is the time for switching the walking step. When the result is affirmative, the program proceeds to S22 in which the timer is reset to zero, to S24 in which the demanded value for gait, specifically the demanded value of the directly-determined parameters at the current gait (the new gait which begins from this time), i.e. the aforesaid a and b are read.

The program then proceeds to S26 in which procedures for gait mixing are conducted.

Figure 14:
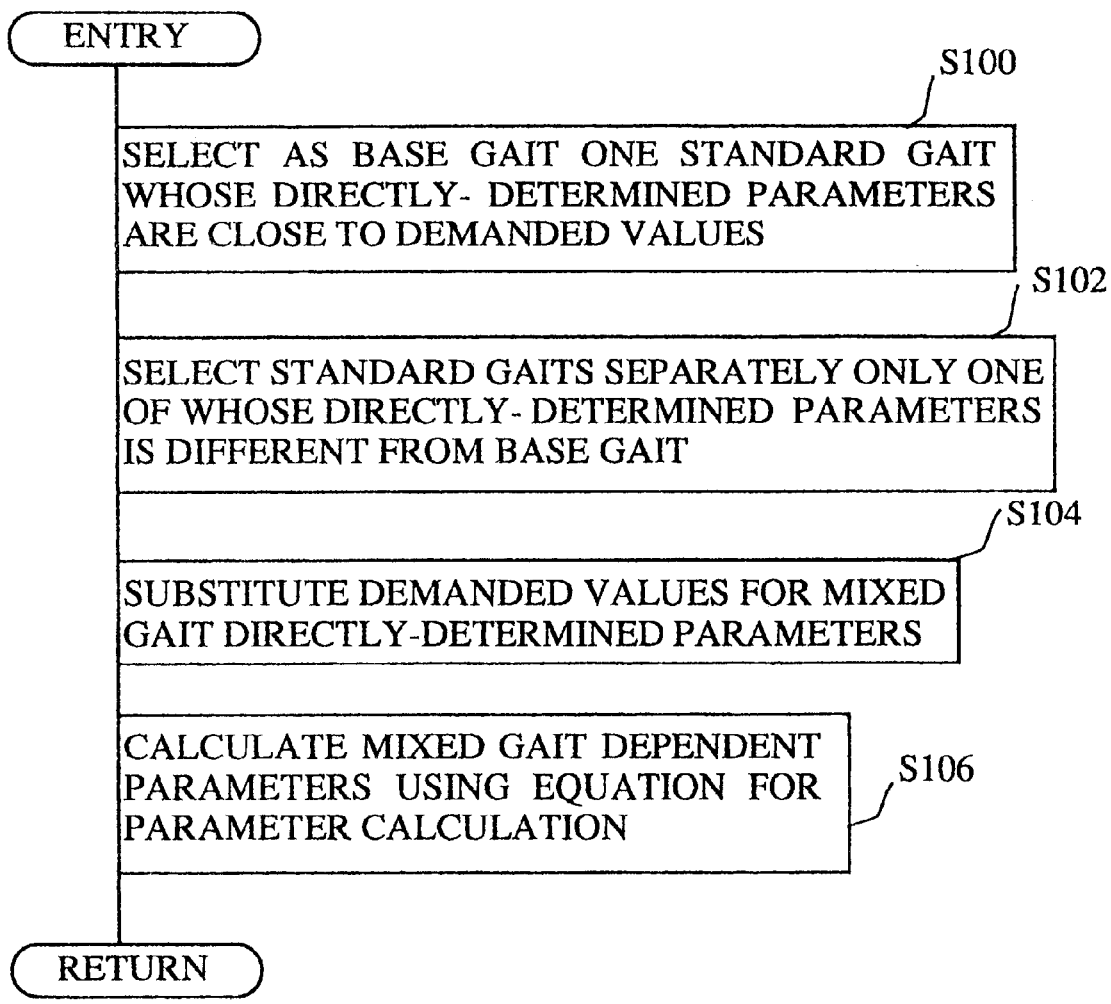
FIG. 14 is a flow chart showing the subroutine of gait mixing referred to in the flow chart of FIG. 4.

FIG. 14 is a flow chart showing the subroutine of the gait mixing procedures.

Figure 15:
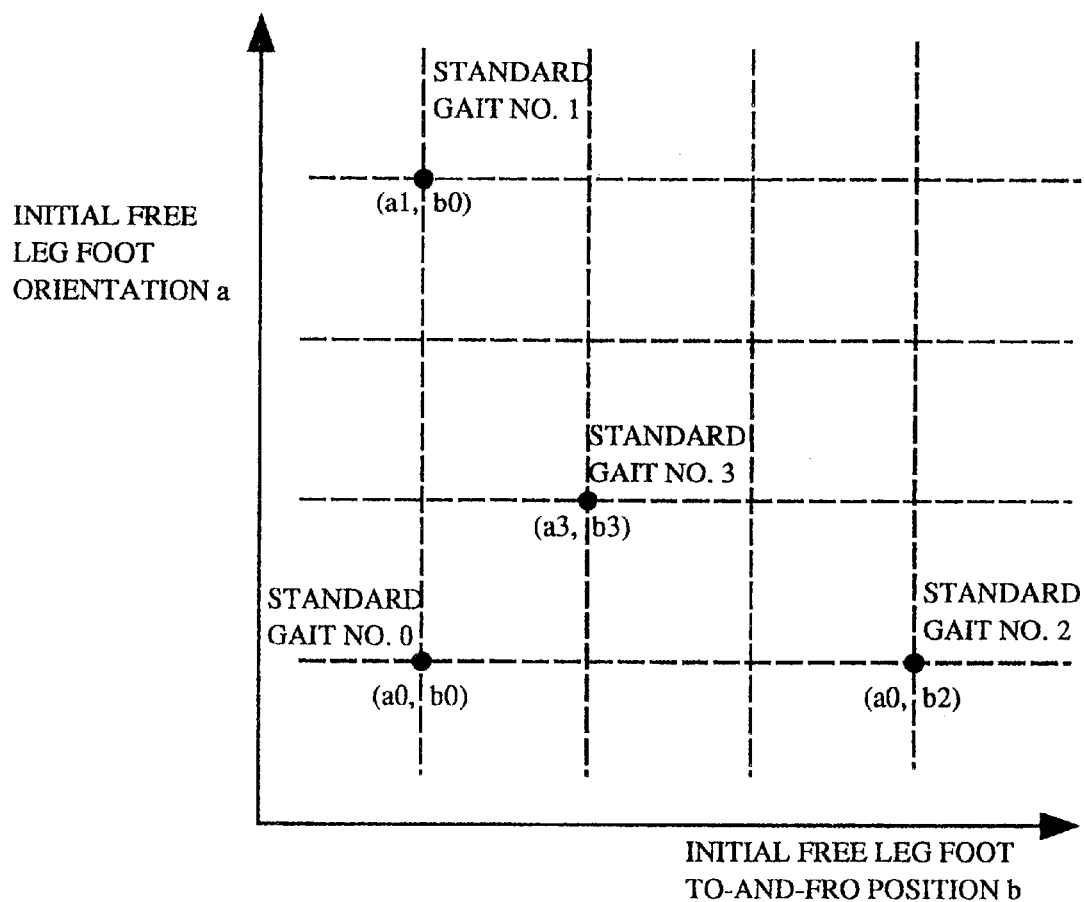
FIG. 15 is an explanatory view explaining the operation of the flow chart of FIG. 14.

The program begins at SI 00 in which one standard gait whose directly-determined parameters are close to the demanded value is selected as the base gait. Explaining this with reference to FIG. 15, since the standard gait whose directly-determined parameters a, b are close to the demanded value (3rd gait's) a3, b3, is standard gait No. 0, the standard gait No. 0 is selected as the base gait.

Figure 16:
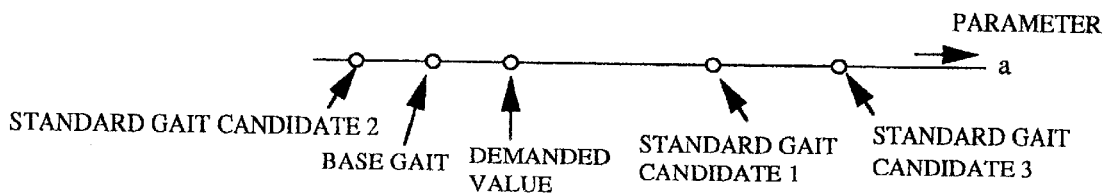
FIG. 16 is an explanatory view explaining, similarly to FIG. 15, the operation of the flow chart of FIG. 14.

The program then proceeds to S102 in which, noticing the abovementioned directly-determined parameters, standard gaits are separately selected which are different in one of the directly-determined parameters from that of the base gait. When there are plural candidates, the standard gait whose parameter is as close as possible to the noticed parameter should be selected. It is preferable to select the standard gait whose parameter sandwiches the demanded value with the base gait parameters. Specifically, when the situation is as shown in FIG. 16, standard gait No. 1 should preferably be selected with respect to the parameter a.

As will be explained in the fifth embodiment, when the mass of leg links 2 is sufficiently smaller than that of the body 24, the inertial force generated by the robot 1 will change little if the final free leg foot position and orientation in the directly-determined parameters vary slightly. In other words, the change of the parameters would not influence the other parameters in satisfying the dynamic equilibrium condition.

Accordingly, if the final free leg foot position and orientation parameters differ slightly from those of the base gait, this can easily be solved by changing the base gait parameter values as demanded. By doing so it becomes unnecessary to select standard gaits to be mixed, whose final free leg foot position and orientation parameters are only different from those of the base gait.

The program then proceeds to S104 in which the demanded values are substituted for the directly-determined parameters of the mixed gait, to S106 in which the dependent parameters of the mixed gait are calculated using the equations for parameter calculation (Eqs. 1).

Returning to the explanation of FIG. 4, the program then proceeds to S28 in which the mixed gait parameters (tabulated values) are substituted for the desired gait parameters (tabulated data), to S30 in which the instantaneous values (i.e., the values at the current control cycle) of the desired gait are calculated.

Figure 17:
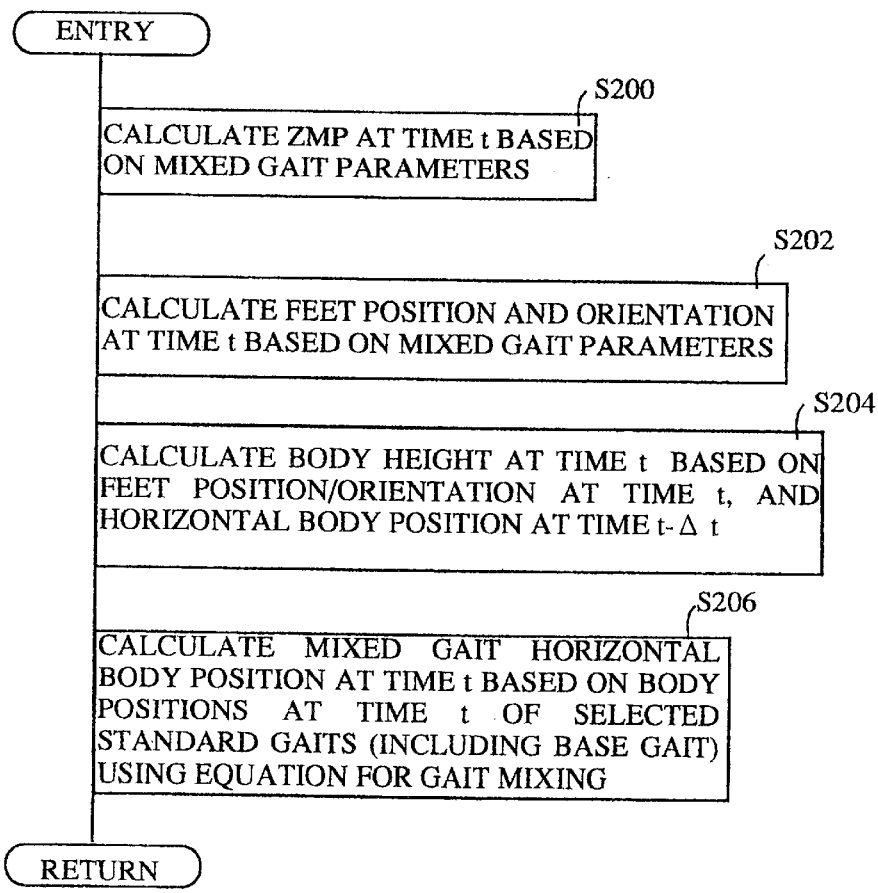
FIG. 17 is a flow chart showing the subroutine of the calculation of instantaneous values of the desired gait referred to in the flow chart of FIG. 4.

FIG. 17 is a flow chart showing the subroutine of the procedures.

Explaining this, the program starts at S200 in which the ZMP at time t is determined or calculated based on the mixed gait parameters, to S202 in which the feet position and orientation are determined or calculated based on the mixed gait parameters using the aforesaid technique proposed earlier.

The program proceeds to S204 in which the body height at time t is determined or calculated from the feet position and orientation at time t and the horizontal body position at time $t-\Delta t$. Since the details of this are described in another patent application filed at the same time as the present invention as mentioned above, and have no direct relationship with the gist of the present invention, explanation is omitted.

The program proceeds to S206 in which the horizontal body position of the mixed gait at time t is calculated based on the body position at time t of the selected standard gaits (including the base gait) in accordance with the aforesaid equations for mixing (Eqs. 1).

Returning to the explanation of FIG. 4, the program proceeds to S32 in which time t is updated by $\Delta t$ and returns to S18 to repeat the procedures mentioned above.

Based on the gait thus generated, the double-leg compliance control is conducted, if necessary, by the double-leg compliance controller and the desired joint angles are determined. The joints are then controlled to trace the desired joint angles.

The double-leg compliance control will be explained briefly with the reference to the flow chart of FIG. 18.

In the flow chart, the program starts at S300 in which a manipulated variable of the double-leg compliance control is calculated.

Figure 19:
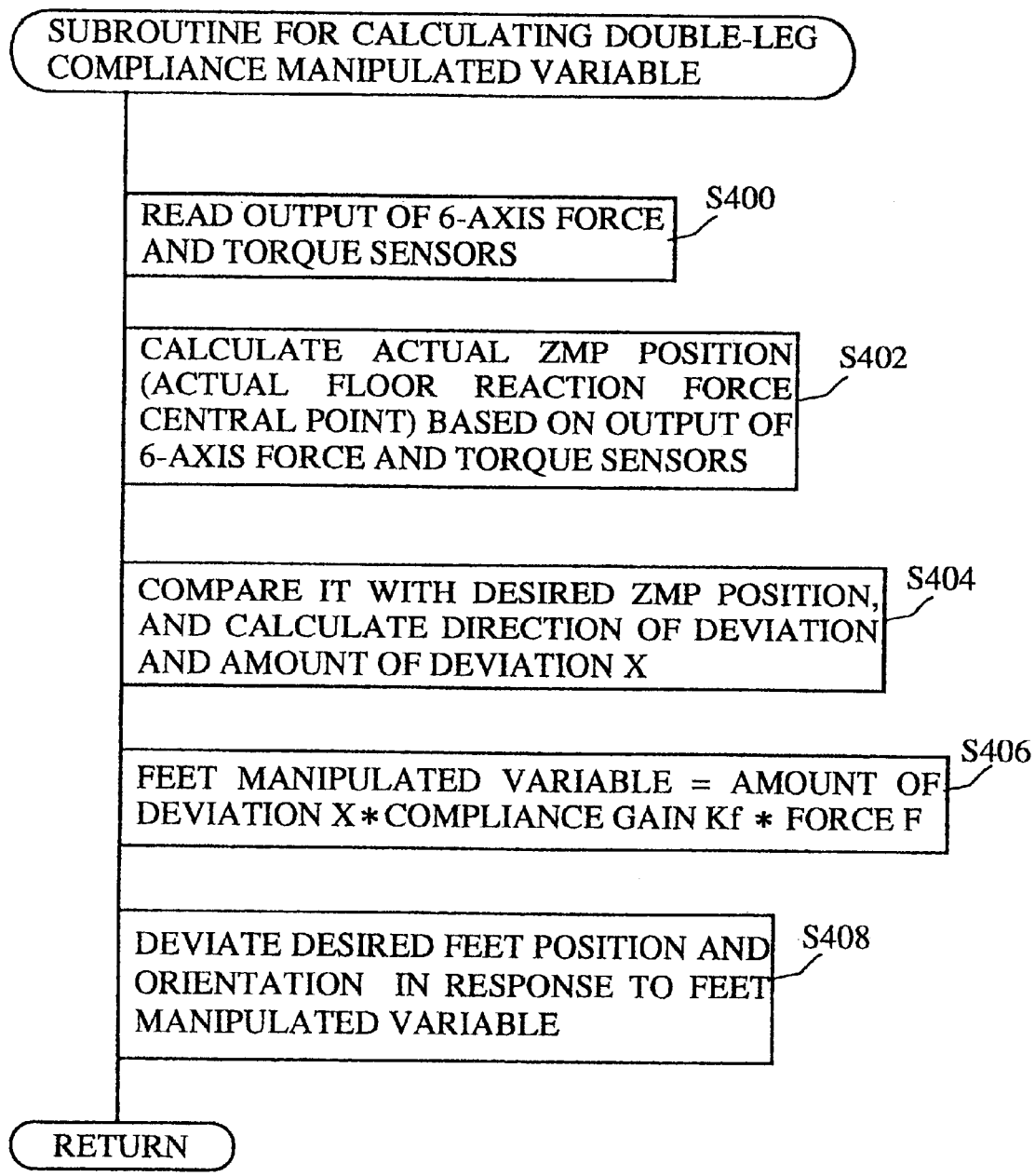
FIG. 19 is a flow chart showing the subroutine of calculating a manipulated variable of the double-leg compliance control illustrated in the flow chart of FIG. 18.

FIG. 19 is a flow chart showing the subroutine of the procedures. Explaining the flow chart, the program begins at S400 in which the output from the 6-axis force and torque sensor 44 is read, and proceeds to S402 in which the actual position of the ZMP (the actual floor reaction force central point) is determined, to S404 in which the determined value is compared with the desired ZMP position and the difference therebetween, i.e., the direction of difference and the amount of difference X are determined, to S406 in which the manipulated variable of the feet is determined in accordance with the equation illustrated there, to S408 in which the feet position and orientation are deviated or shifted by the determined manipulated variable. The actual ZMP position and the actual floor reaction force central point are equal to each other, hence they are treated as the same in this specification.

Figure 18:
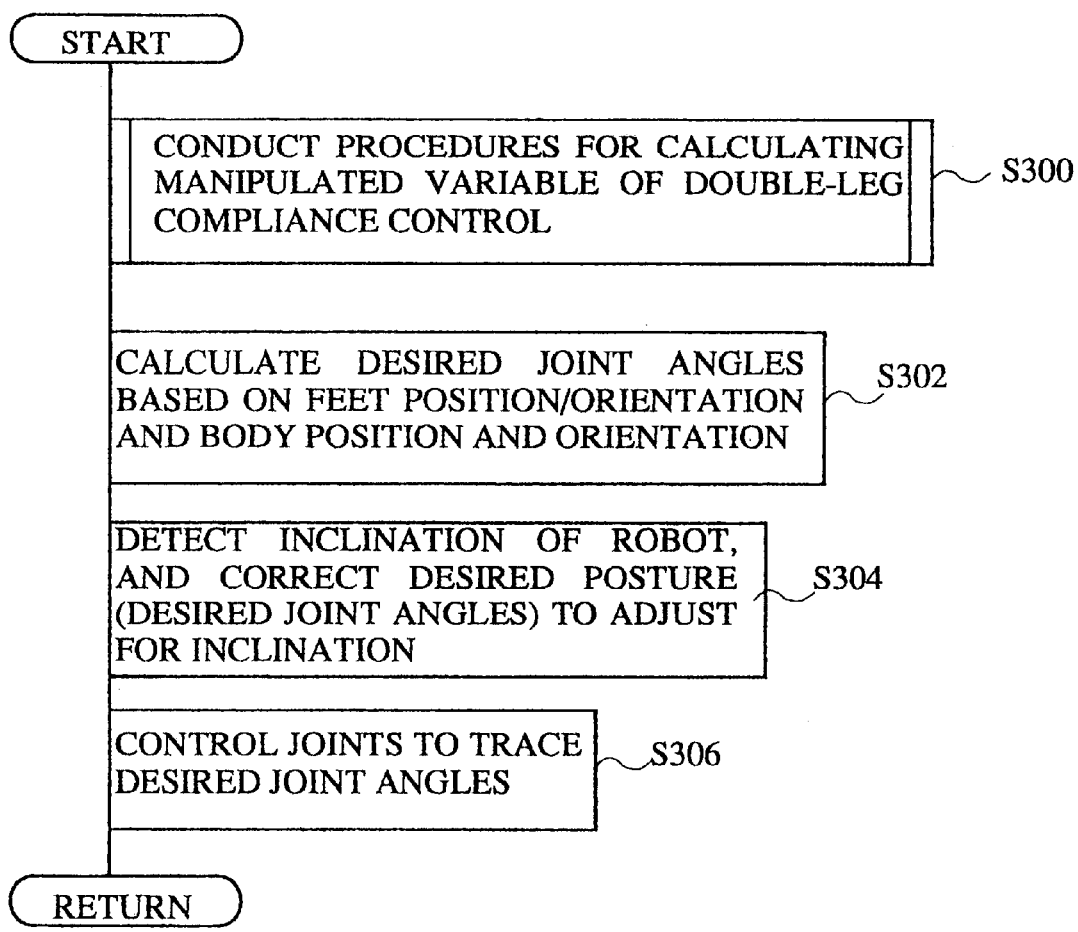
FIG. 18 is a flow chart showing a double-leg compliance control proposed earlier by the applicant which will be conducted based on the gait generated in the gait generation shown in FIGS. 3 and 4.

Returning to the explanation of the flow chart of FIG. 18, the program proceeds to S302 in which desired angles of the 12 joints are calculated by a known inverse kinematic solution based on the feet positions and orientations (corrected feet positions and orientations if corrected in the compliance controller) and the body position and orientation. The program proceeds to S304 in which the desired posture is corrected so as to intentionally deviate or shift the floor reaction force central point, when the robot 1 is determined to be unstable from the output of the inclination sensor 44. The program proceeds to S306 in which all joints are driven to trace the desired joint angles. Specifically, this is conducted by the second calculator 82.

Having been configured in the foregoing manner, the system in the first embodiment can generate a gait freely on a real-time basis and can effect a desired stride or turn in a desired angle. Moreover, the system can make the legged mobile robot walk freely by driving the joint angles based on the gait generated on a real-time basis.

More specifically, the system can freely generate an approximate gait on a real-time basis which satisfies the aforesaid conditions of gait or the demand for gait by appropriately selecting some of gait as the base gait from among the stored standard gaits in response to the demand on the stride or turning angle, and by mixing (such as synthesizing, modification, etc.), i.e., by conducting approximation.

Moreover, with the arrangement, the system can freely generate a gait having an accurate stride or turning angle, and by combining and mixing the standard gaits, can generate at discretion an average gait therebetween.

Furthermore, the system can reduce the amount or volume of calculation. More particularly speaking, the amount of calculation on the first calculator 80 will be reduced by 90%, compared with a case in which the robot dynamics problem is solved on a real-time basis. Moreover, as the appropriate standard gaits are stored in advance and a gait is newly generated by mixing the standard gaits together, it becomes possible to reduce the amount or capacity of memory (the ROM 84). Furthermore, as the standard gaits can be prepared optimally, it becomes possible to generate easily, without trial and error, a new gait which satisfies the conditions 1) to 5) mentioned above.

Figure 20:
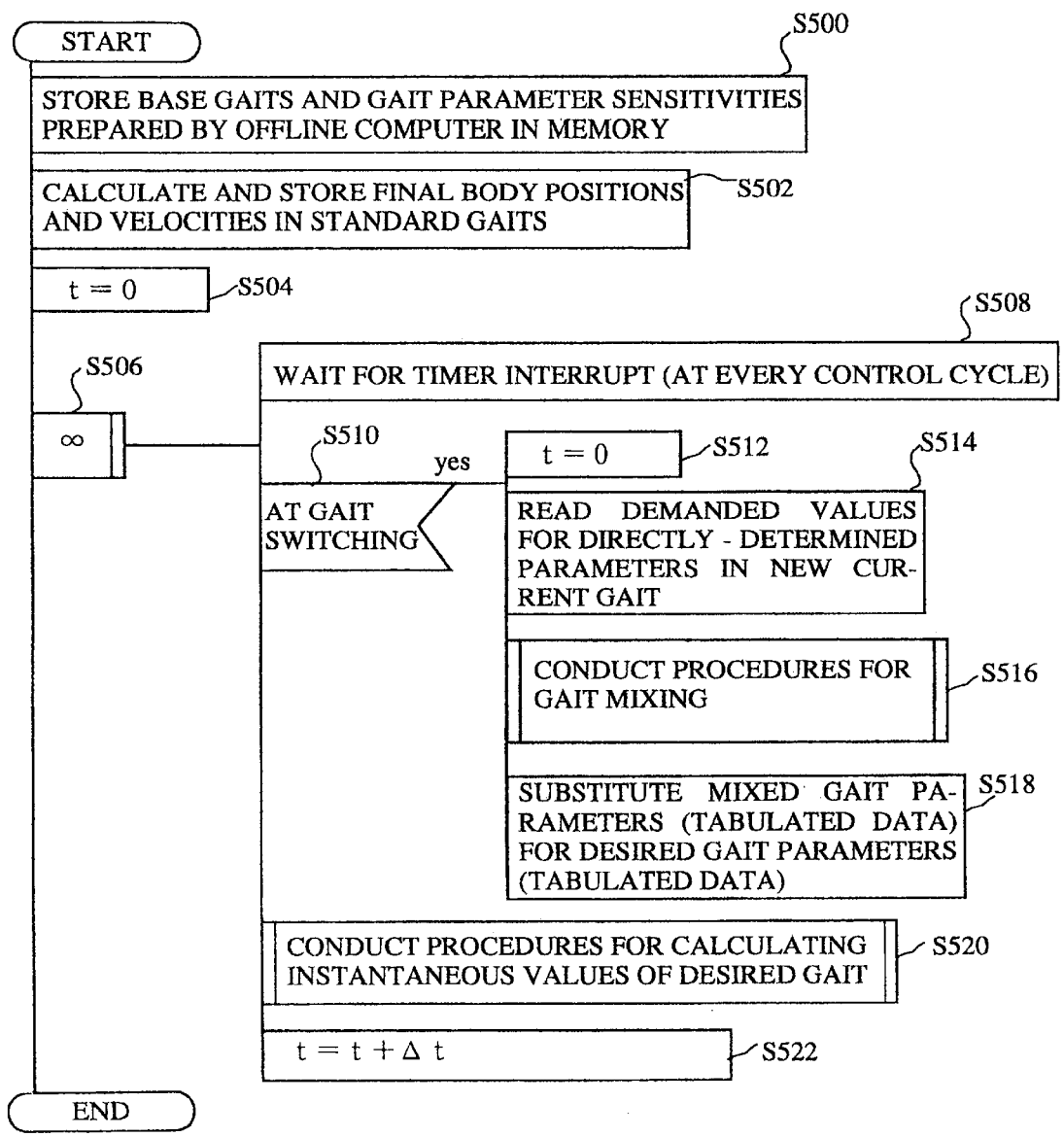
FIG. 20 is a main flow chart, similar to FIG. 4, but showing the operation of the system according to a second embodiment of the present invention.

FIG. 20 is a flow chart showing the operation of the system according to the second embodiment of the present invention.

In the second embodiment, in addition to the standard gaits, a sensitivity of a gait parameter is used. The "sensitivity" generally means the ratio of the response or change induced in the output to a stimulus or change in the input. In the second embodiment, an amount of change in one gait parameter per unit amount of change in the other gait parameter is determined or calculated. The amount of change in one gait parameter is referred to as "gait parameter sensitivity" and is used to determine the amount of change (or variation) of a parameter.

Described simply, gait parameter sensitivity refers to how much the dependent parameters should be changed or varied in order that the changed gait keeps desirable conditions if and when the directly-determined parameters (such as the initial free leg foot orientation a, the initial free leg foot to-and-for position b in the first embodiment) are changed by a small amount. Thus, the gait parameter sensitivity is defined as the amount of dependent parameter change per unit amount of the directly-determined parameters.

In the second embodiment, as a result, the number of standard gaits are reduced and only those suitable for the base gait are used. More specifically, the standard gaits comprising a series of continuous gaits having a gait to start walking from a standing position, a gait for accelerating the walking speed, a gait for constant speed walking, a gait for decelerating the walking speed, and a gait to stop walking, are similarly used. However, no other standard gaits whose parameters are slightly different from those of the series of successive gaits are prepared.

To be more specific, the sensitivity of a parameter q relative to a parameter p in a standard gait i is described as Di (q,p). In the tabulated data, the sensitivity of k-th datum x(k) relative to the parameter p is similarly described as Di (x(k), p).

The generation of the demanded gait in the second embodiment will be explained.

The relationships between the parameter c's sensitivity relative to the parameter a in standard gait No. 0 (referred to as D0(c, a)) and those in standard gait No. 1 will be shown as follows in accordance with the definitions, when (a1−a0) is sufficiently small.

$$D0\ (c, a)=(c1-c0)/(a1-a0)$$

$$D0\ (d, a)=(d1-d0)/(a1-a0)$$

$$D0\ (x(k), a)=(x1(k)-x0(k))/(a1-a0)$$

$$D0\ (y(k), a)=(y1(k)-y0(k))/(a1-a0)$$

Similarly, the relationships between the parameter c's sensitivity relative to the parameter b in standard gait No. 0 (referred to as D0(c,b)) and those in standard gait No. 2 will be shown as follows in accordance with the definitions, when (b2−b0) is sufficiently small.

$$D0\ (c, b)=(c2-c0)/(b2-b0)$$

$$D0\ (d, b)=(d2-d0)/(b1-b0)$$

$$D0\ (x(k), b)=(x2(k)-x0(k))/(b2-b0)$$

$$D0\ (y(k), b)=(y2(k)-y0(k))/(b2-b0)$$

The following will be obtained as equations for parameter determination (hereinafter referred to as "Eqs. 2"), by substituting these in the equations for mixing the parameters and tabulated data in the first embodiment.

$$c3=c0+D0(c, a)*(a3-a0)+D0(c, b)*(b3-b0)$$

$$d3=d0+D0(d, a)*(a3-a0)+D0(d, b)*(b3-b0)$$

$$x3(k)=x0(k)+DO(x(k), a)*(a3-a0)+D0(x(k), b)*(b3-b0)$$

$$y3(k)=y0(k)+DO(y(k), a)*(a3-a0)+D0(y(k), b)*(b3-b0)$$

Based on the above, the operation of the second embodiment will be explained with reference to FIG. 20. The program begins at S500 in which the base gaits and gait parameter sensitivities prepared by an offline computer have been stored in memory and then proceeds to S502 and to S514 to conduct the same procedures as those of the first embodiment, then to S516 in which the procedures for gait mixing are conducted.

Figure 21:
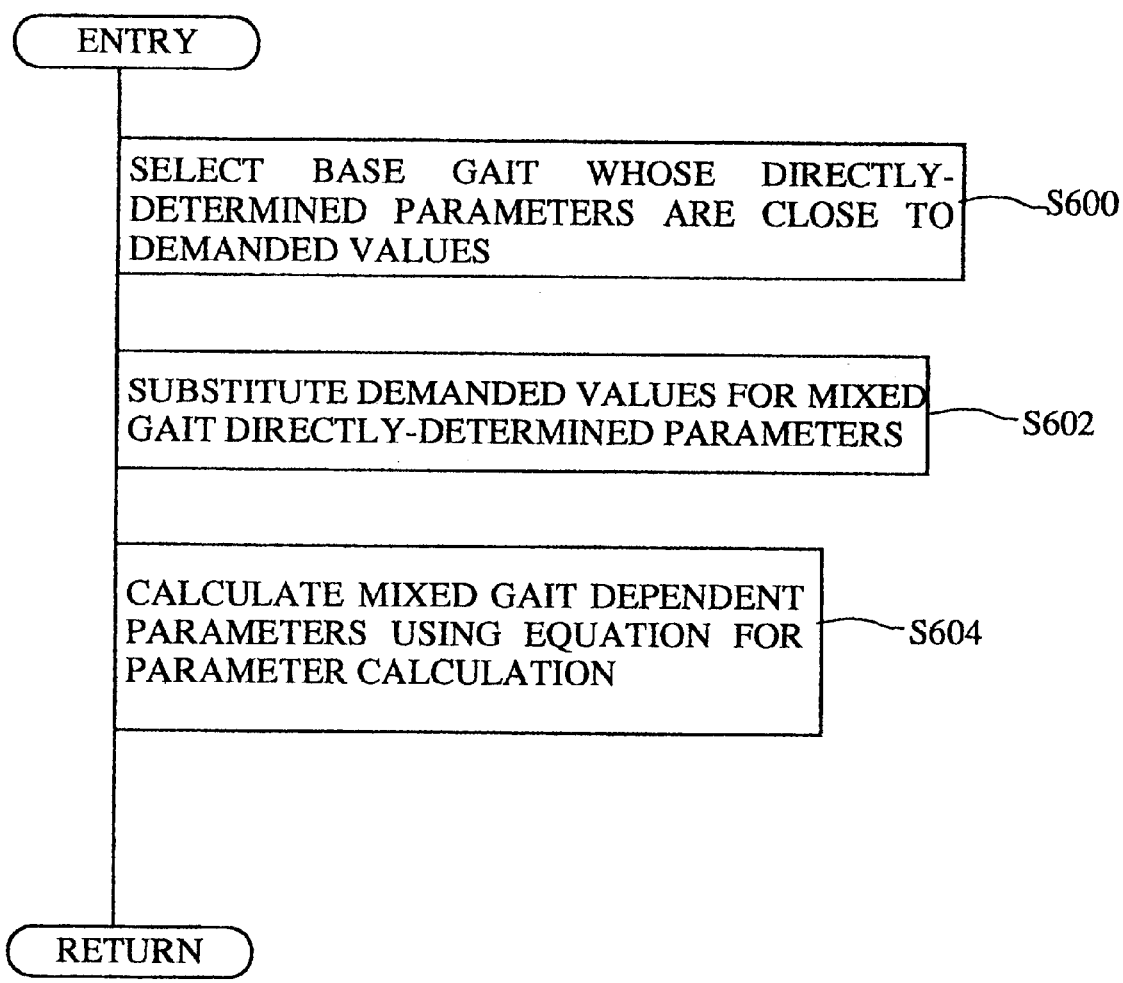
FIG. 21 is a flow chart showing the subroutine of gait mixing referred to in the flow chart of FIG. 20.

FIG. 21 is a flow chart for showing the subroutine of the procedures. The program begins at S600 in which the base gait whose directly-determined parameters are close to the demanded values is selected, and proceeds to S602 in which the demanded values are substituted for the directly-determined parameters of the mixed gait, to S604 in which the dependent parameters are calculated in accordance with Eqs. 2. The tabulated data of the horizontal body position may be calculated at one time. However, since the volume of calculation thereof is great, each value necessary for the current control cycle may be calculated in the subroutine of the instantaneous value calculation explained later.

Returning to the explanation of FIG. 20, the program proceeds to S520, via S518, in which the instantaneous values of the desired gait are calculated.

Figure 22:
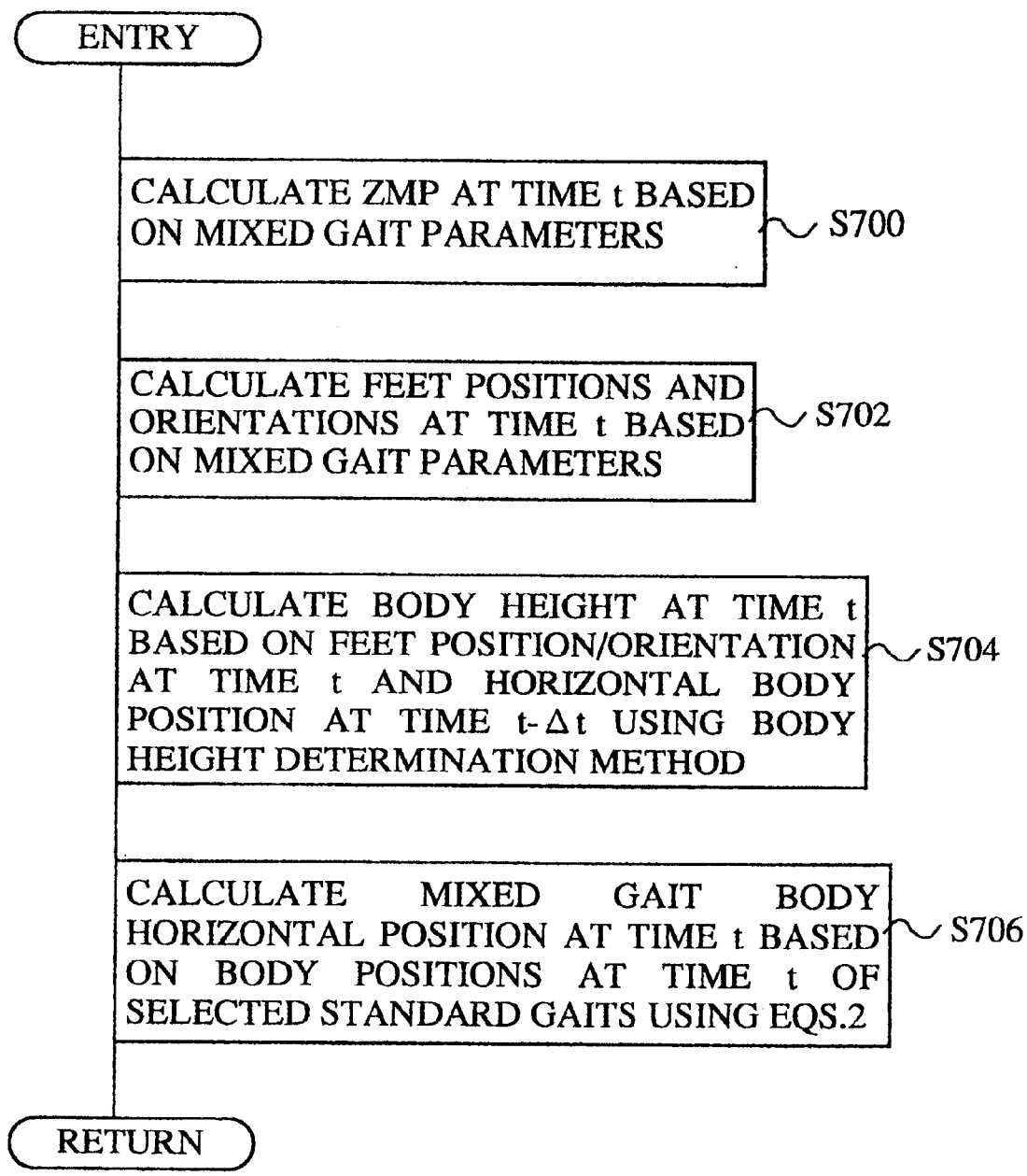
FIG. 22 is a flow chart showing the subroutine of the calculation of instantaneous values of the desired gait referred to in the flow chart of FIG. 20.

FIG. 22 is a flow chart showing the subroutine of the procedures. The program begins at S700 and then proceeds to S702 and to S706 in which the positions and orientations of the feet and body are calculated. In S706, the horizontal body position is calculated in accordance with the equations relating to x, y in Eqs. 2. Returning to the explanation of FIG. 20, the program returns, via S522, to S508 to repeat the procedures.

Having been configured in the foregoing manner, the system in the second embodiment has the same advantages as those of the first embodiment.

However, the superiority of the second embodiment over the first embodiment depends on the combination of the standard gaits or the nature or characters of the standard gaits being stored in memory. For example, naming all space generated by the combinations of the directly-determined parameters as a parameter space, the first embodiment may be configured such that the directly-determined parameters are discretized for a certain interval in such a manner that lattice-like discrete spaces are prepared in the parameter space, and desired standard gaits are prepared for all the combination of the directly-determined parameters in the discrete spaces. To be more specific, the first embodiment may be configured such that the parameters other than the directly-determined parameters, i.e., the dependent parameters, are adjusted so that the gaits become desirable gaits.

If the first embodiment is provided with the standard gaits prepared in the above-mentioned manner, most of standard gaits can satisfy the condition to be the base gait. (The standard gait whose directly-determined parameters are entirely same as those of the other existing standard gait, except for any one parameter, can satisfy the conditions as the base gait.) If the first embodiment is modified as above, no parameter sensitivity is needed for generating gaits freely.

It should be noted in the second embodiment that, when the parameter sensitivities are almost equal for various gaits, the parameter sensitivities need not be prepared for each gait, but one may be prepared that is common for all the gaits. With the arrangement, the capacity of the memory (the ROM 84) can be reduced to a great extent compared to that in the first embodiment.

For example, if D0(c, a), D1(c, a), D2(c, a) . . . Dn(c, a) are almost the same, the average value D(c, a) thereof can instead be used in all the equations for parameter determination.

Figure 23:
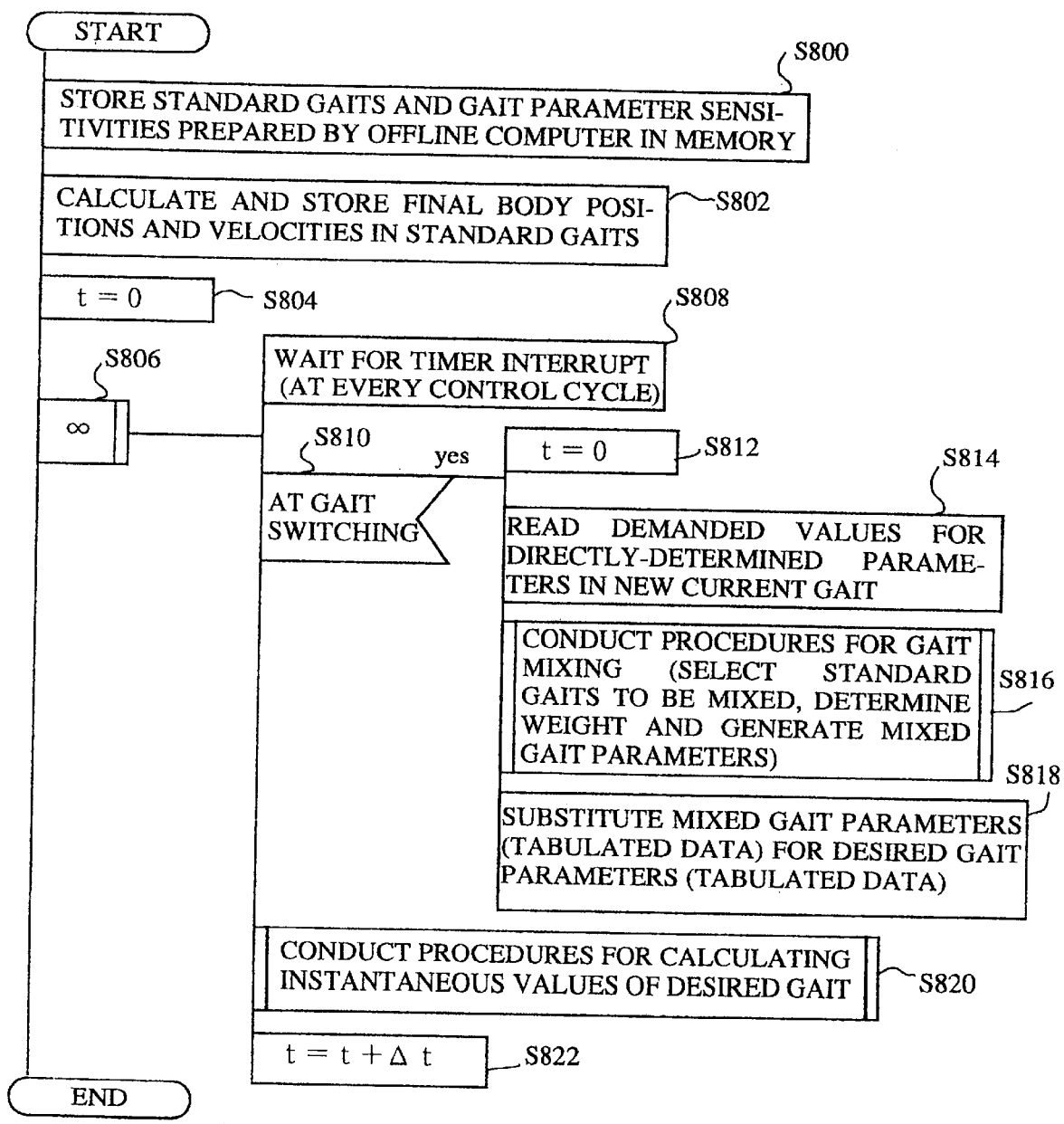
FIG. 23 is a main flow chart, similar to FIG. 4, but showing the operation of the system according to a third embodiment of the present invention.

FIG. 23 is a flow chart showing the operation of the system according to the third embodiment of the present invention.

In the third embodiment, both the standard gaits used in the first embodiment and the parameter sensitivities in the second embodiment are used.

The generation of a demanded gait in the third embodiment is now explained.

In the third embodiment, when calculating the dependent parameter values, the influence of the directly-determined parameters are determined partially by using the method of the first embodiment, while the rest of the influence is determined using the method of the second embodiment. More precisely, gait mixing as well as an addition of perturbation due to the gait parameter sensitivity are used.

To be more specific, if using the first embodiment for the influence of the directly-determined parameter a and the second embodiment for that of the parameter b, the equations for parameter determination will be rewritten as follows.

$$c3=c0+(c1-c0)*(a3-a0)/(a1-a0)+D0(c, b)*(b3-b0)$$

$$d3=d0+(d1-d0)*(a3-a0)/(a3-a)+D0(d, b)*(b3-b0)$$

$$x3(k)=x0(k)+(x1(k)-x0(k))*(a3-a0)/(a1-a0)+D0(x(k), b)*(b3-b0)$$

$$y3(k)=y0(k)+(y1(k)-y0(k))*(a3-a0)/(a1-a0)+D0(y(k), b)*(b3-b0)$$

Figure 24:
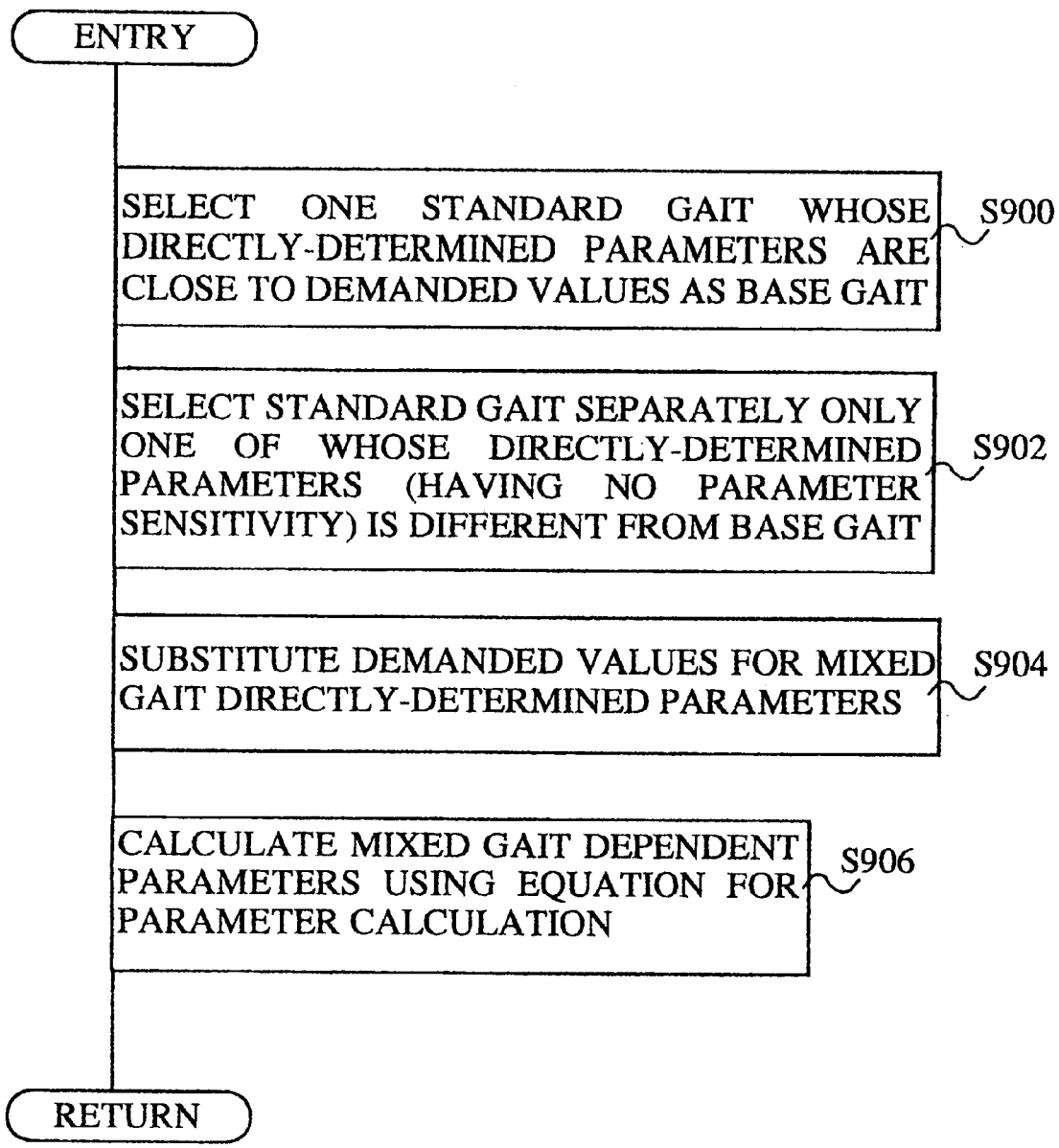
FIG. 24 is a flow chart showing the subroutine of gait mixing referred to in the flow chart of FIG. 23.
Figure 25:
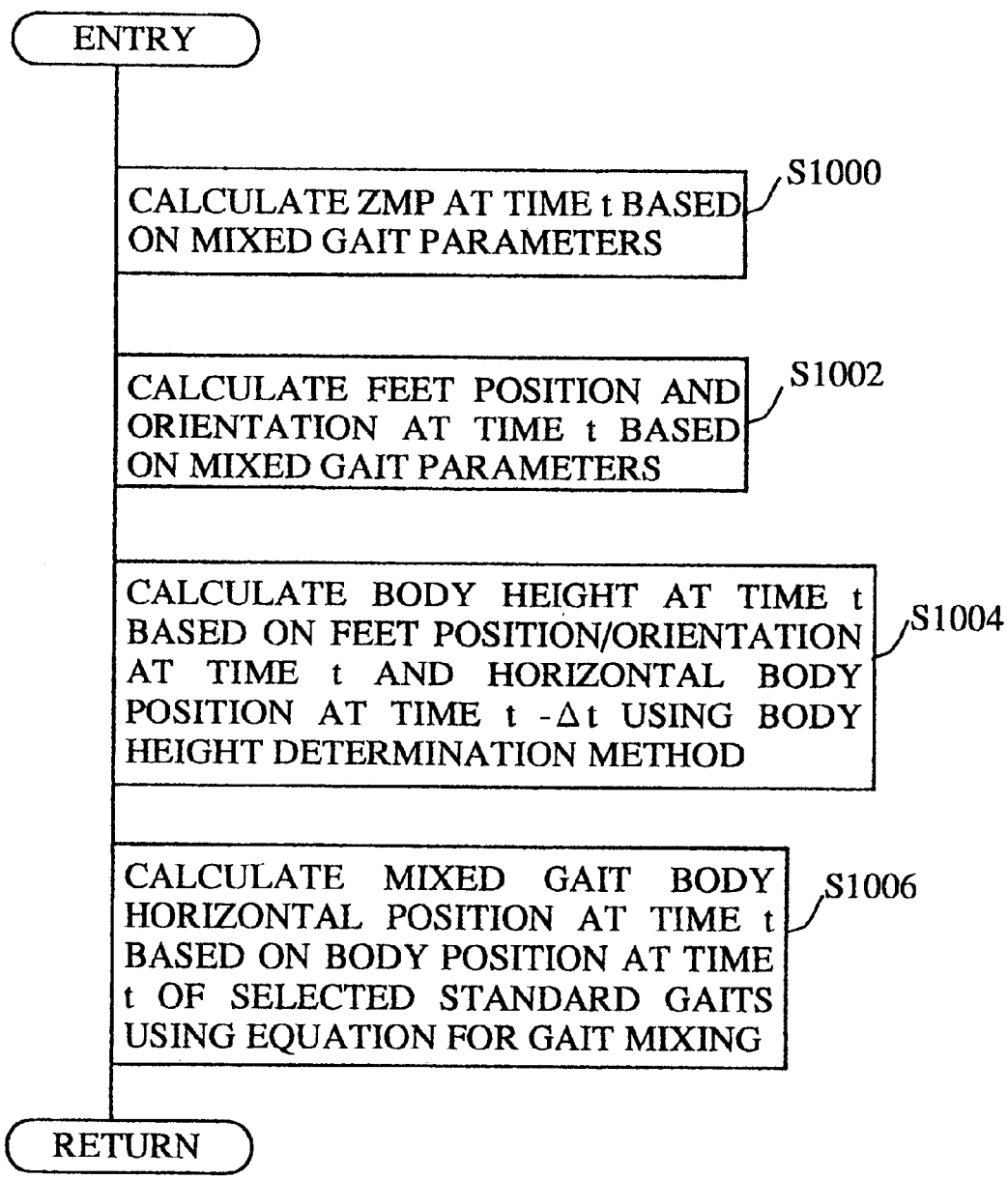
FIG. 25 is a flow chart showing the subroutine of the calculation of instantaneous values of the desired gait referred to in the flow chart of FIG. 23.

Explaining the operation with reference to FIG. 23, the program begins at S800 in which the standard gaits and gait parameter sensitivities prepared by an offline computer and stored in memory are read, and proceeds to S802 and on in which the same procedures as the first embodiment are taken, to S900 and onward, via S816, as described in a flow chart of FIG. 24 in which the gait mixing is conducted. Then, the program proceeds from S820 in the flow chart of FIG. 23 to S1000 and onward in a flow chart of FIG. 25 in which the instantaneous values are calculated.

Having been configured in the foregoing manner, the system in the third embodiment has the same advantages of the foregoing embodiments.

Figure 26:
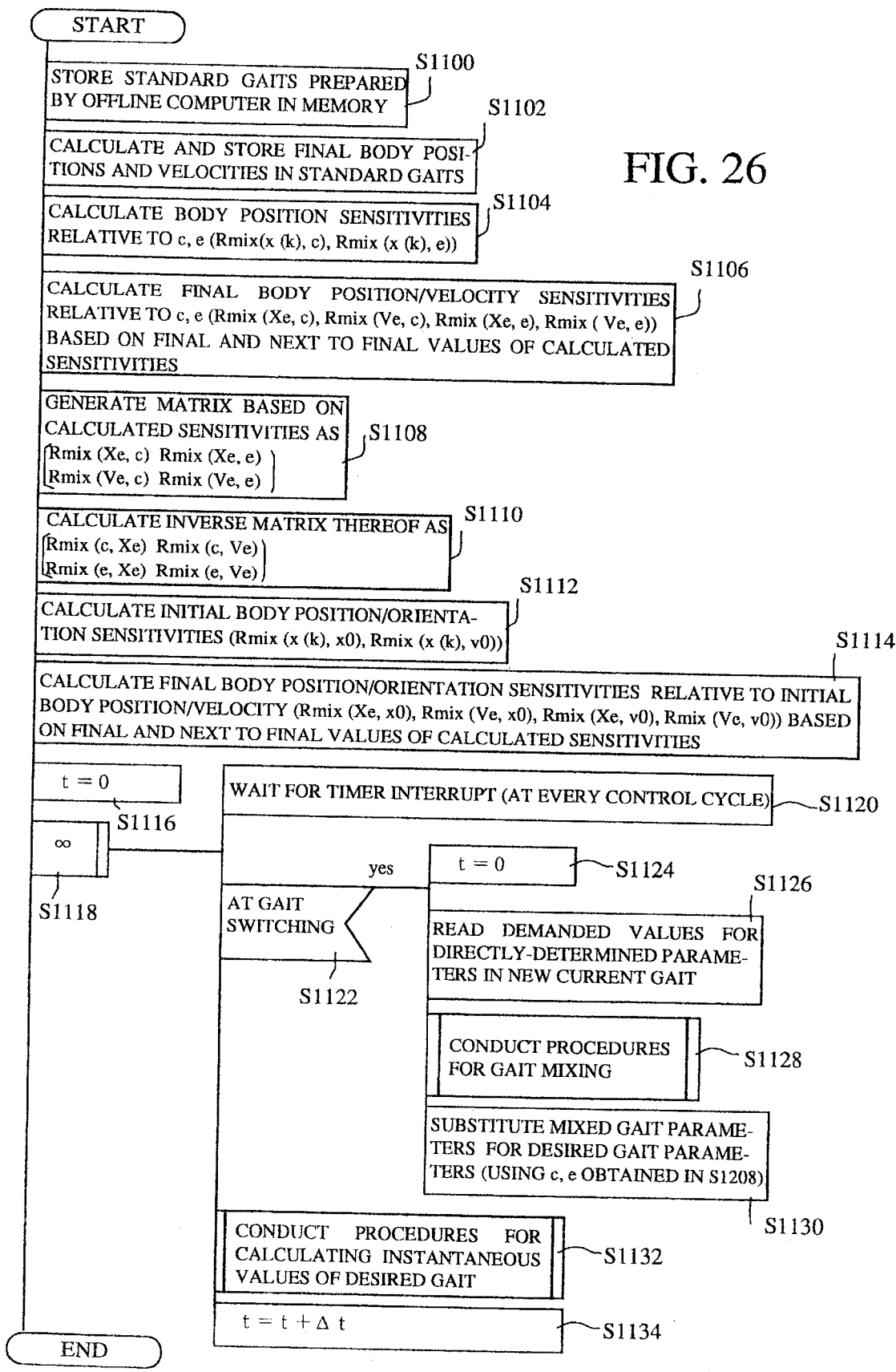
FIG. 26 is a main flow chart, similar to FIG. 4, but showing the operation of the system according to a fourth embodiment of the present invention.

FIG. 26 is a flow chart showing the operation of the system according to the fourth embodiment of the present invention.

Figure 27:
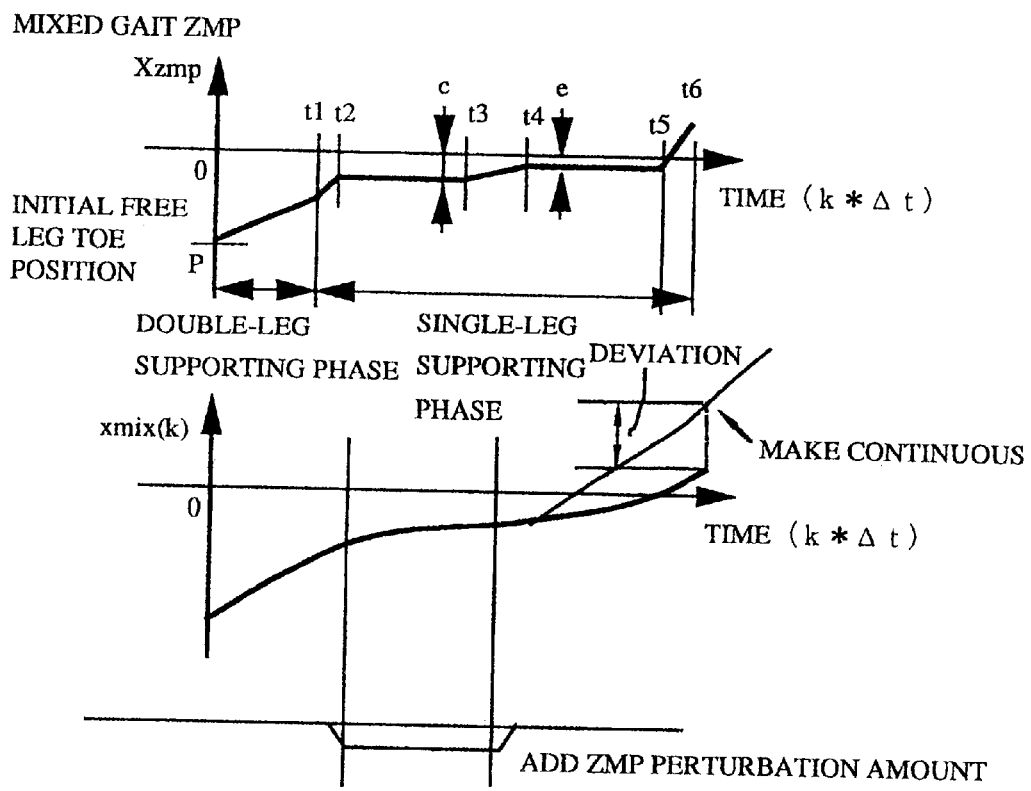
FIG. 27 is a time chart showing the gait such as a body position generated in the fourth embodiment of the present invention.

As illustrated in FIG. 27, the body positions and orientation in the mixed gaits (demanded gait) obtained from the standard gaits tend to be slightly discontinuous with each other at the gait boundary. The final body position and velocity of one mixed gait should therefore be accorded with the initial body position and velocity of the next mixed gait. In view of this, the fourth embodiment is configured such that the boundary conditions of the body position and orientation can freely be determined. In other words, the initial and final body positions and velocities are deemed as the directly-determined parameters, enabling the body position and velocity to be continuous at the gait boundary.

Summarizing this method, the mixed gait is first generated in which all the directly-determined parameters (except for those of the initial and final body positions and velocities) are as desired, using any method from the first to third embodiments. Then, the ZMP parameters are corrected in order that the initial and final body positions and velocities are as desired.

Since the former of these procedures are the same as those of foregoing embodiments, explanation is omitted. The explanation will only be made on the latter of these procedures for correcting the ZMP parameters such that the initial and final body positions and velocities become as desired.

In the gait generation described in the foregoing embodiments, assume that the gait parameters (except for the initial body position and velocity, the final body position and velocity and the ZMP parameters) are fixed.

Under the assumption, when the initial body position and velocity and the ZMP parameters are determined, a gait satisfying the dynamic equilibrium condition is deterministically obtained. As a result, the final body position and velocity are deterministically obtained. On the other hand, giving the final body position and velocity and the ZMP pattern will deterministically yield the initial body position and velocity. This means that, in order to freely determine the initial body position and velocity and the final body position and velocity, the ZMP pattern should be adjusted in response thereto. Saying this in reverse, if the ZMP pattern has once been determined, the relationship between the combination of the initial body position and velocity and the combination of the final body position and velocity is one-to-one mapping.

In order to simplify the explanation, only the behavior of the body to-and-fro direction (i.e., the X-direction) will be discussed. Since the quantities of state are two parameters, i.e., the position and velocity, the ZMP pattern should have two or more parameters in order that the gait conditions thereof can freely be determined.

Figure 28:
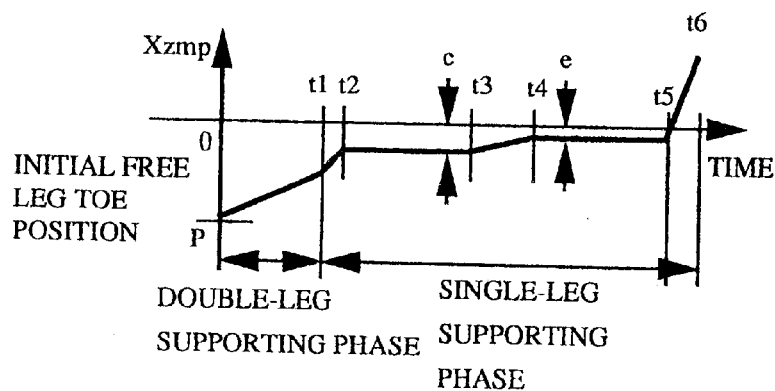
FIG. 28 is a time chart showing the trajectory of the ZMP (in the X-coordinate or direction) for explaining how to accord the conditions of boundary with each other referred to in the flow chart of FIG. 26.

Here, the ZMP patterns and its parameters are defined as shown in FIG. 28 such that the boundary body position and velocity can be changed greatly if the ZMP parameters are changed by a small amount.

The ZMP pattern illustrated in the figure is more complicated than those in the foregoing embodiments. The reason is that, if a similar ZMP pattern to any in the foregoing embodiments is used, in addition to the parameter c, another parameter in time t2 (which does not influence the foot trajectory) must also be varied. However, even if the parameter in time t2 is varied greatly, the boundary body position and velocity will only be corrected by a small amount.

In the fourth embodiment, the ZMP parameter can be determined using any method in the first or second embodiments. In the fourth embodiment, accordingly, using the third embodiment method, a correction amount for the ZMP parameters and corrected body trajectories are determined in the manner explained below. The correction amount for the ZMP parameters is a correction amount to be added to the mixed gait ZMP parameter in order that the boundary body conditions of the mixed gait become desired values.

Explaining the operation of the system according to the fourth embodiment with reference to FIG. 26, the program begins at S1100 in which the standard gaits prepared on an offline computer have been stored in memory similarly to the foregoing embodiments, and proceeds to S1102 in which the final body positions and velocities of the various standard gaits are determined and stored in memory, to S1104 in which the following procedures are taken.

Figure 29:
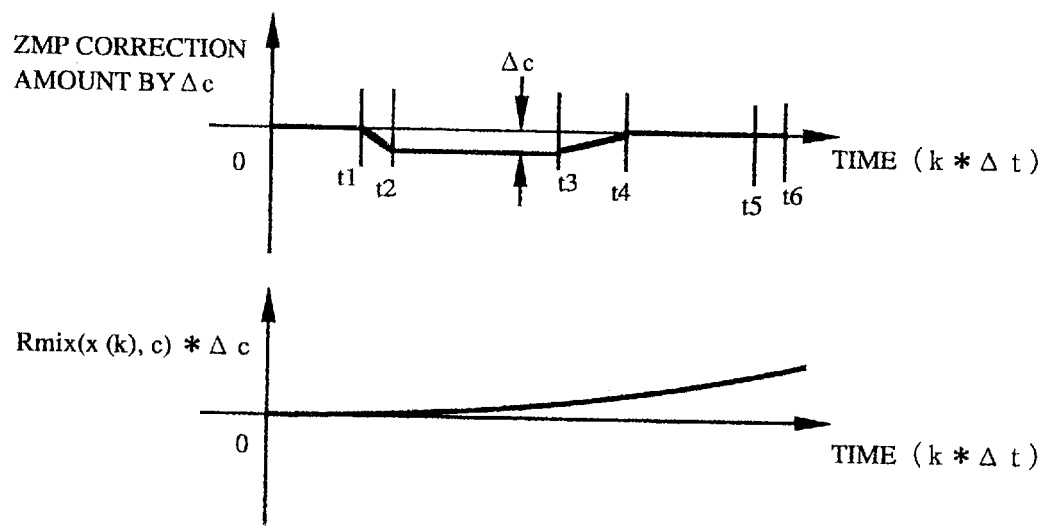
FIG. 29 is a time chart showing the trajectory of the ZMP (in the X-coordinate or direction) for explaining the operation illustrated in the flow chart of FIG. 26.

Specifically, as illustrated in FIG. 29, the ZMP parameter c in the mixed gait is slightly perturbed by an amount $\Delta c$ and in response thereto, a perturbation amount $\Delta x(k)$ of the body position time-series tabulated data to be perturbed is calculated so as to satisfy the dynamic equilibrium condition. The relationship between these quantities is defined as follows.

$$\text{Rmix } (x(k), c)=\Delta x(k)/\Delta c$$

Figure 30:
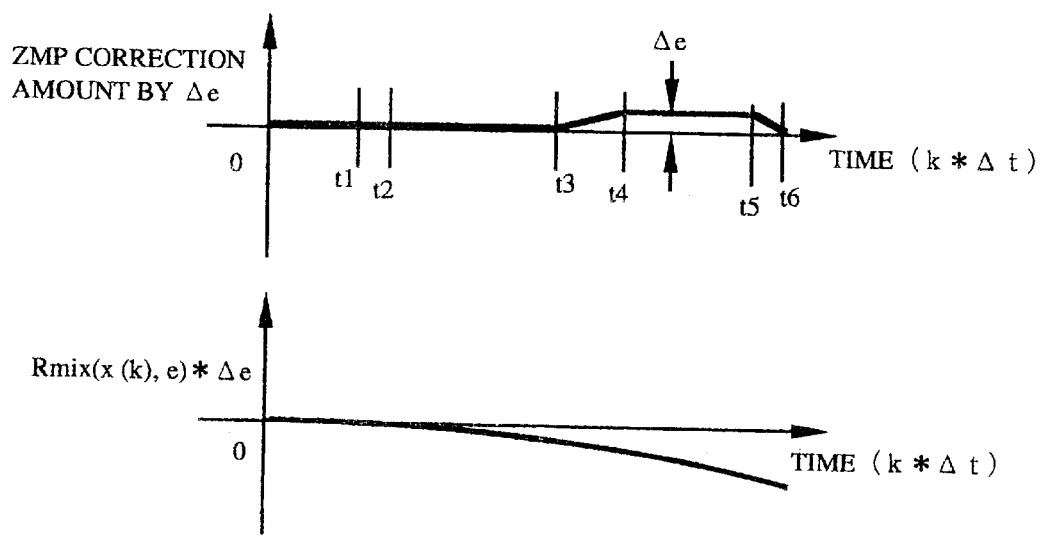
FIG. 30 is a time chart showing the trajectory of the ZMP (in the X-coordinate or direction) for similarly explaining the operation illustrated in the flow chart of FIG. 26.

Here, Rmix(x(k), c) (which corresponds to the aforesaid gait parameter sensitivity) is called a partial differential sensitivity of x(k) relative to c. Similarly, as illustrated in FIG. 30, Rmix (x(k), e) is determined relative to the ZMP parameter e.

In the second embodiment, when determining the sensitivity of x(k) relative to a certain parameter noticed, dependent parameters other than x(k) or the noticed parameter are adjusted for, while keeping the optimum of the gait as the conditions of constraint. On the contrary, in the fourth embodiment, all the parameters (other than the noticed parameter and x(k)) are made fixed and the sensitivities are determined, while ignoring the optimum of the gait. Figuratively speaking, the second embodiment determines total differential values deeming the gait optimum as the conditions of constraint, whereas the fourth embodiment determines partial differential values without paying attention to the gait optimum.

Returning to the explanation of FIG. 26, the program proceeds to S1106 in which based on the final values and on the values immediately preceding thereto of Rmix(x(k), c) and Rmix (x(k), e), a partial differential sensitivity Rmix (Xe, c) of the final body position and a partial differential sensitivity Rmix (Ve, c) relative to the mixed gait ZMP parameter c, a partial differential sensitivity Rmix (Xe, e) of final body position and a partial differential sensitivity Rmix (Ve, e) relative to the mixed gait ZMP parameter e are calculated as follows.

$$Rmix\ (Xe, c) = Rmix\ (x(ke), c)$$

$$Rmix\ (Ve, c) = \{Rmix(x(ke), c) - Rmix(x(ke-1), c)\}/\Delta t$$

$$Rmix\ (Xe, e) = Rmix\ (x(ke), e)$$

$$Rmix\ (Ve, e) = \{Rmix(x(ke), e) - Rmix(x(ke-1), e)\}/\Delta t$$

Here, ke: final number of tabulated data, $\Delta t$: sampling time, more precisely sampling interval in discrete-time series of tabulated data.

The program proceeds to S1108 in which a matrix of dimension 2*2 having Rmix(Xe, c) as the element of the 1st row 1st column, Rmix(Xe, e) as the element of the 1st row 2nd column, Rmix(Ve, c) as the element of the 2nd row 1st column, Rmix(Ve, e) as the element of the 2nd row 2nd column, is generated.

The program proceeds to S1110 in which the inverse matrix of the matrix just generated is calculated. In the inverse matrix, the element of the 1st row 1st column is a partial differential sensitivity of the parameter c relative to the final body position Xe (referred to as Rmix(c, Xe)), the element of the 2nd row 1st column is a partial differential sensitivity of the parameter e relative to the final body position Xe (referred to as Rmix(e, Xe)), the element of the 1st row 2nd column is a partial differential sensitivity of the parameter c relative to the final body velocity Ve (referred to as Rmix(e, Xe)), and the element of the 2nd row 2nd column is a partial differential sensitivity of the parameter e relative to the final body velocity Ve (referred to as Rmix (e, Ve)).

If these sensitivities change little in all of the mixed gaits, the average values thereof R(c, Xe), R(e, Xe), R(c, Ve), R(e, Ve) may instead be used for all the gaits.

Figure 31:
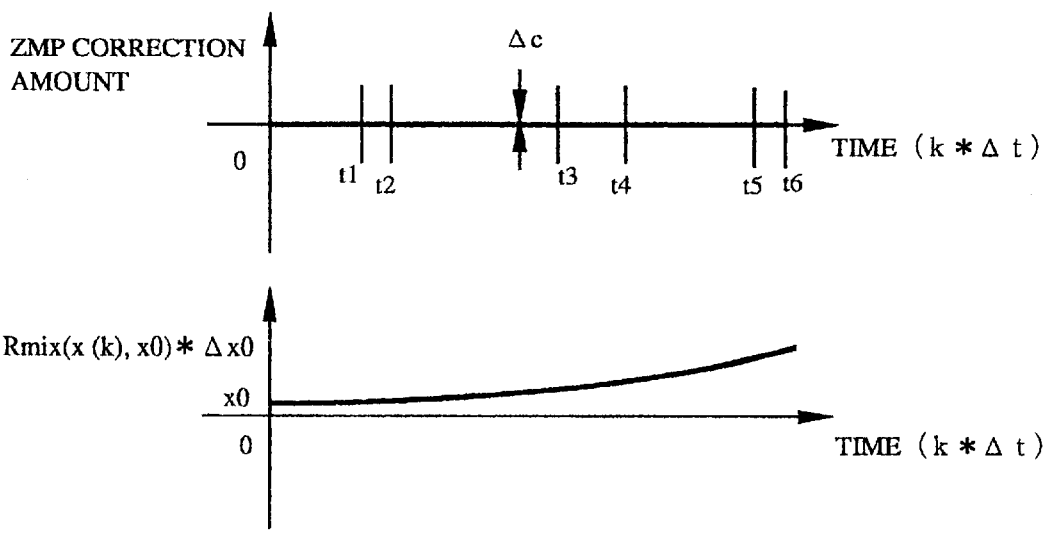
FIG. 31 is a time chart showing the trajectory of the ZMP (in the X-coordinate or direction) for similarly explaining the operation illustrated in the flow chart of FIG. 26.

The program proceeds to S1112 in which the initial body position in the mixed gait is shifted or perturbed by a small amount $\Delta x0$ as illustrated in FIG. 31, and a body position time-series tabulated data perturbation amount $\Delta x(k)$ is determined in response thereto so as to satisfy the dynamic equilibrium condition. The value is obviously as follows.

$$\Delta x(0) = x0$$

Rmix (x(k), x0) is determined as follows.

$$Rmix(x(k), x0) = \Delta x(k)/\Delta x0$$

Figure 32:
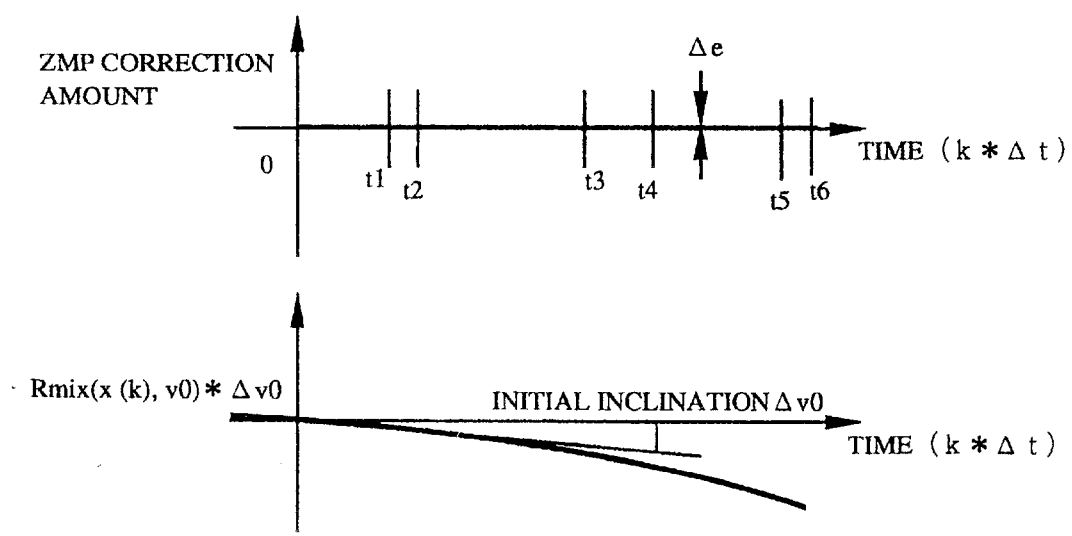
FIG. 32 is a time chart showing the trajectory of the ZMP (in the X-coordinate or direction) for similarly explaining the operation illustrated in the flow chart of FIG. 26.

Similarly, the initial body velocity is shifted or perturbed by a small amount $\Delta v0$, as illustrated in FIG. 32 and Rmix(x(k), v0) is determined in a similar manner.

The program then proceeds to S1114 in which based on the final values and on the values immediately preceding thereto of the determined sensitivities Rmix(x(k), x0) and Rmix (x(k), v0), a partial differential sensitivity of the final body position and a partial differential sensitivity relative to the initial body position in the mixed gait (referred to as Rmix (Xe, x0) and Rmix (Ve, x0)), a partial differential sensitivity of final body position and a partial differential sensitivity relative to the initial body velocity in the mixed gait (referred to as Rmix (Xe, v0) and Rmix (Ve, v0)) are calculated as follows.

$$Rmix\ (Xe, x0) = Rmix\ (x(ke), x0)$$

$$Rmix\ (Ve, x0) = \{Rmix(x(ke), x0) - Rmix(x(ke-1), x0)\}/\Delta t$$

$$Rmix\ (Xe, v0) = Rmix\ (x(ke), v0)$$

$$Rmix\ (Ve, v0) = \{Rmix(x(ke), v0) - Rmix(x(ke-1), v0)\}/\Delta t$$

Here, ke: final number of tabulated data, $\Delta t$: sampling time of tabulated data.

The program then proceeds to S1116 in which the timer is reset to zero and is started, to S1120, via S 1118, in which the timer interrupt is waited for, to S1122 in which it is determined whether the gait is to be switched. When the result is affirmative, the program proceeds to S1124 in which the timer is reset to zero, to S1126 in which the demanded values of the directly-determined parameters are read, then to S1128 in which the gait mixing is conducted.

Figure 33:
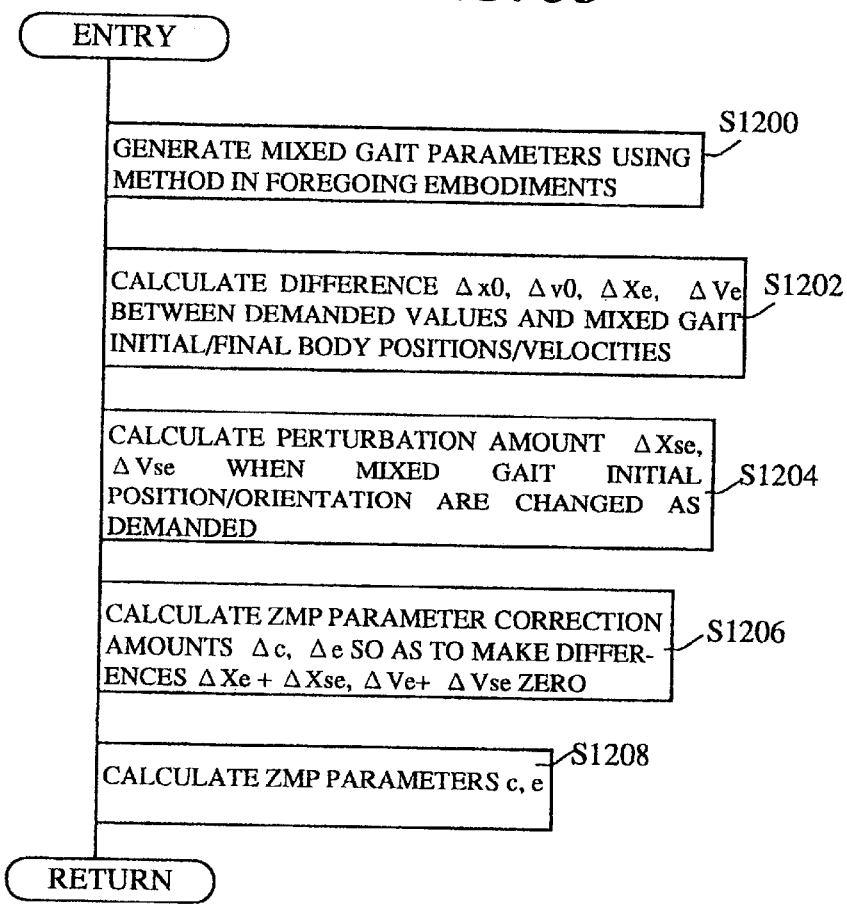
FIG. 33 is a flow chart showing the subroutine of gait mixing referred to in the flow chart of FIG. 26.

Specifically, the program proceeds to S1200 of the subroutine flow chart of FIG. 33 in which the mixed gait parameters are generated using any method in the first to third embodiments. In this mixed gait parameter generation, one from among gaits the whose initial and final body positions and velocities are close to the demanded values, is selected as the base gait.

However, once selected as the base gait, the initial and final body positions and velocities are excluded from the directly-determined parameters, and the mixed gait is generated in the same manner as the foregoing embodiments.

The program then proceeds to S1202 in which the differences between the demanded initial body position and velocity and the mixed gait initial body position and velocity are calculated. The differences are named $\Delta x0$, $\Delta v0$. Similarly, the differences between the demanded final body position and velocity and the mixed gait final body position and velocity are calculated, and are named $\Delta Xe$, $\Delta Ve$.

The program proceeds to S1204 in which only the initial body position and velocity in the mixed gate are replaced with the demanded initial body position and velocity. Then final body position and velocity perturbation amounts of the gait when the body position time-series tabulated data are perturbed in response thereto such that the dynamic equilibrium condition is satisfied (referred to as $\Delta Xse$, $\Delta Vse$), are calculated by the following equations.

$$\Delta Xse = Rmix\ (Xe, x0)^*\Delta x0 + Rmix\ (Xe, v0)^*\Delta v0$$

$$\Delta Vse = Rmix\ (Ve, x0)^*\Delta x0 + Rmix\ (Ve, v0)^*\Delta v0$$

In the gait obtained in S1204, the initial body position and velocity accord with the demanded values. However, the final body positions and velocity are not equal to the demanded final body position and velocity, and differ by $\Delta Xe + \Delta Xse$ and $\Delta Ve + \Delta Vse$. The program therefore proceeds to S1206 in which ZMP parameter correction amounts $\Delta c$ and $\Delta e$ for decreasing the differences to zero, are calculated by the following equations.

$$\Delta c = Rmix(c, Xe)^*(\Delta Xe + \Delta Xse) + Rmix(c, Ve)^*(\Delta Ve + \Delta Vse)$$

$$\Delta e = Rmix(e, Xe)^*(\Delta Xe + \Delta Xse) + Rmix(e, Ve)^*(\Delta Ve + \Delta Vse)$$

The program then proceeds to S1208 in which the ZMP parameters c, e are calculated using the following equations.

$$c = cmix + \Delta c$$

$$e = emix + \Delta e$$

Here, cmix: value of mixed gait parameter c; emix: value of mixed gait parameter e.

Returning to the explanation of the flow chart of FIG. 26, the program then proceeds to S1130 in which the mixed gait parameters are substituted for desired gait parameters. Here, the values obtained in S1208 are substituted for the parameters c, e. The program then proceeds to S1132, via S1122, in which the instantaneous values of the desired gait are calculated.

Figure 34:
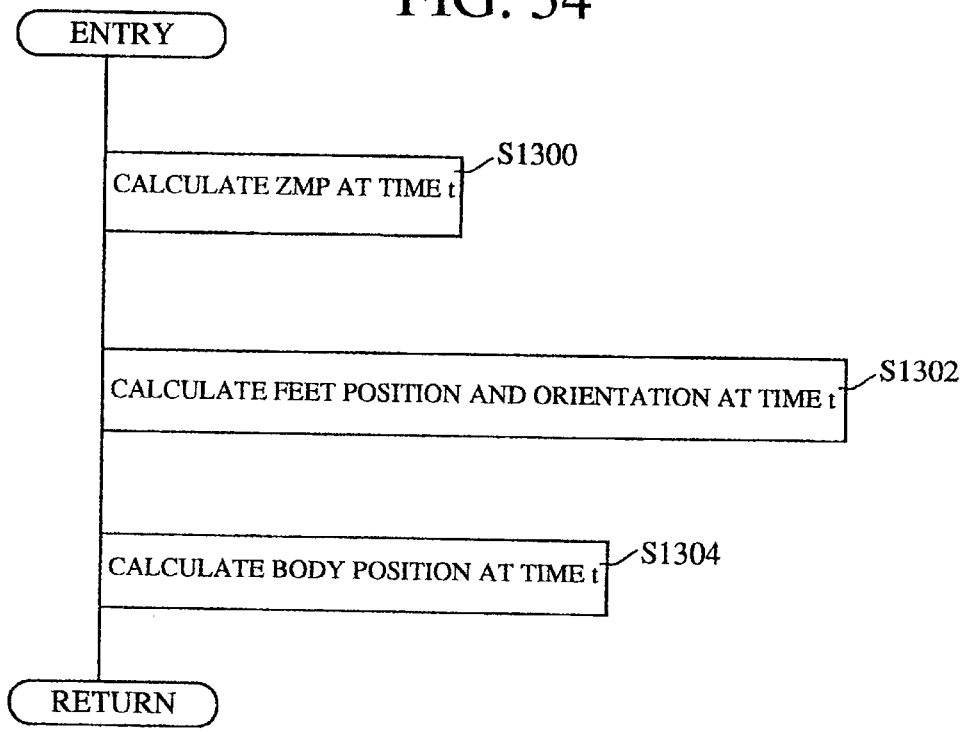
FIG. 34 is a flow chart showing the subroutine of the calculation of instantaneous values of desired gait referred to in the flow chart of FIG. 26.

Specifically, the program proceeds to S1300 in a flow chart of FIG. 34 in which the ZMP at time t is determined using any method in the foregoing embodiments, to S1302 in which the feet position and orientation at time t are determined using any method in the foregoing embodiments, to S1304 in which the body position of the desired gait is determined using the following equation.

$$x(k)=xmix(k)+Rmix(x(k), c)*\Delta c+Rmix(x(k), e)*\Delta e+Rmix(x(k), x0)*\Delta x0+Rmix(x(k), v0)*\Delta v0$$

Here, xmix(k): k-th datum in the mixed gait body trajectory time-series tabulated data. Although no explanation is made here, the body position in the Y-direction is similarly calculated. The body position in the Z-direction may be calculated in the same manner as the X, Y-direction values, or may be calculated using the technique described in the application filed at the same date as the present invention.

Figure 35:
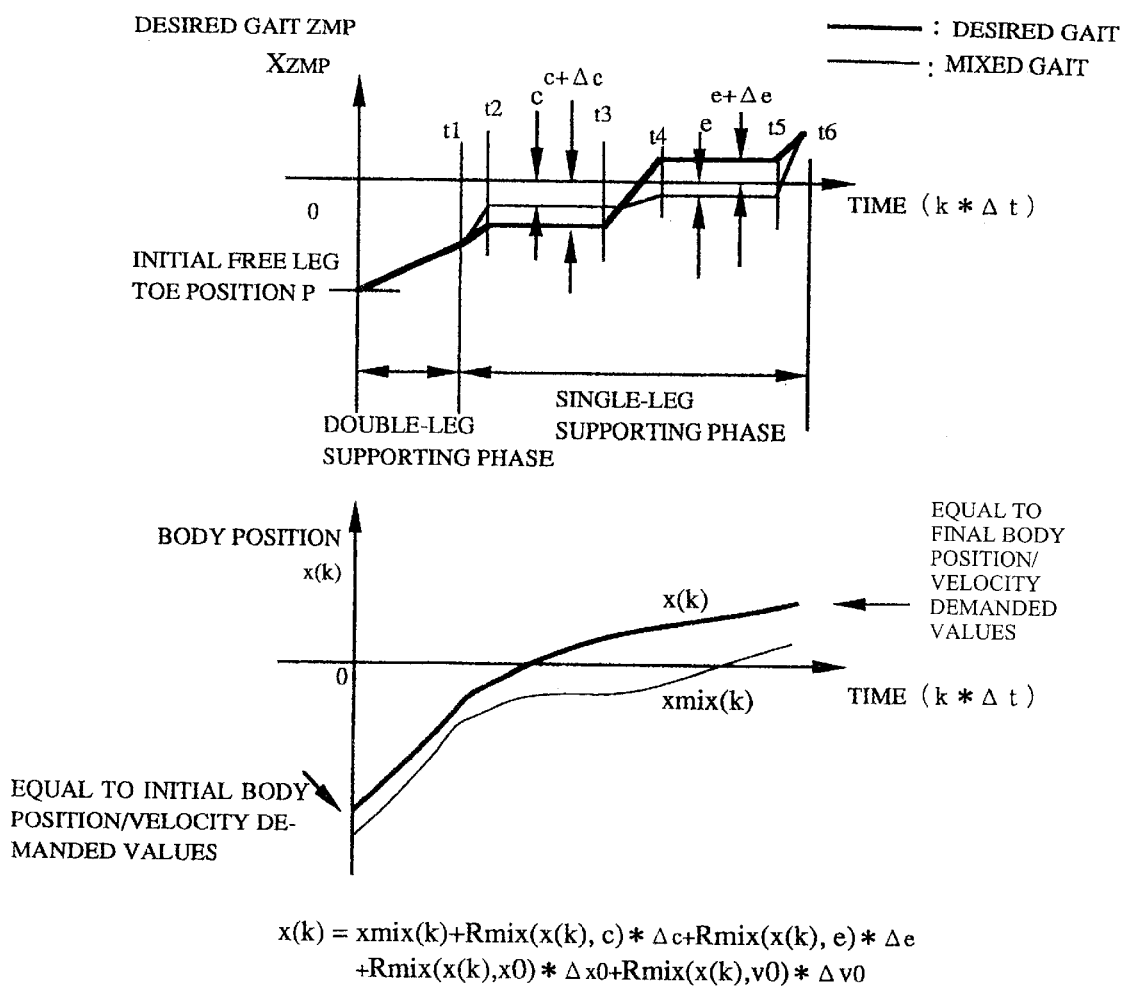
FIG. 35 is time chart showing the gait generated in the fourth embodiment illustrated in the flow chart of FIG. 26.

In the manner described above, more specifically, by superposing waveforms shown in FIGS. 27, 29 to 32, the desired gait having the boundary conditions as desired can be generated, as illustrated in FIG. 35. In FIG. 35, the situations are set as follows.

$$c<0, c+\Delta c<0, e<0, e+\Delta e>0$$

Having been configured in the foregoing manner, the system in the fourth embodiment can generate gaits freely on a real-time basis and make the displacements and velocities of robot portions continuous at the boundary of the gaits.

Figure 36:
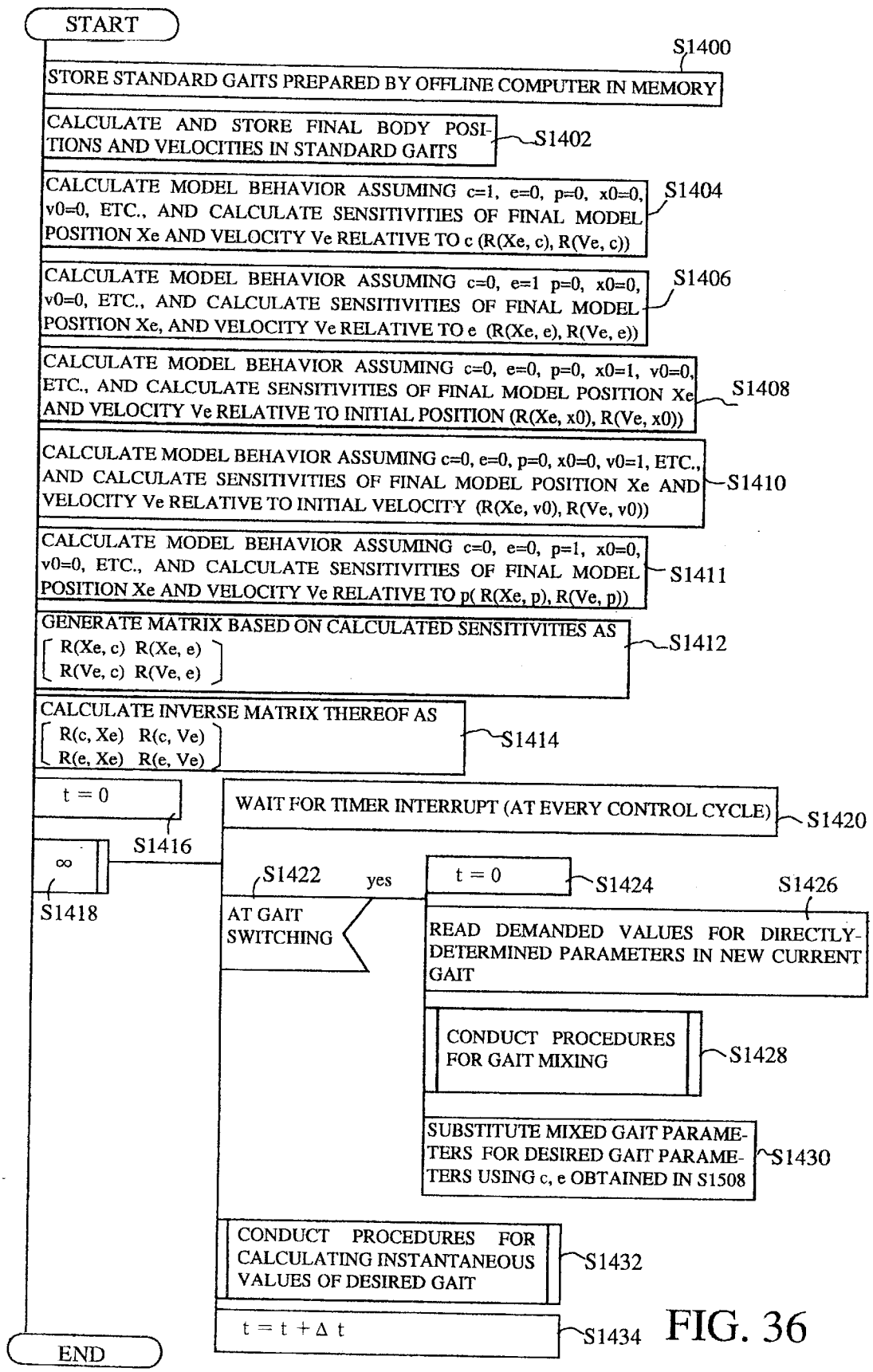
FIG. 36 is a main flow chart, similar to FIG. 4, but showing the operation of the system according to a fifth embodiment of the present invention.

FIG. 36 is a flow chart showing the operation of the system according to the fifth embodiment of the invention.

In the fourth embodiment mentioned above, the body position time-series partial differential sensitivity relative to the mixed gait ZMP parameter c (Rmix(x(k), c)), the body position time-series partial differential sensitivity relative to the mixed gait ZMP parameter e (Rmix(x(k), e)), the body position time-series partial differential sensitivity relative to the initial body position (Rmix(x(k), x0)), and the body position time-series partial differential sensitivity relative to the initial body velocity (Rmix(x(k), v0) are used. So to speak, the fourth embodiment has a model of body trajectory perturbation in time-series tabulated data relative to the ZMP perturbation.

Rather, the fifth embodiment uses a linear dynamic perturbation model (a linear model expressing the relationship of perturbations of the body position and velocity relative to a perturbation of the ZMP) described by the following expression so as to accord the boundary conditions on the body position and velocity with the demanded values.

The basic principle of this method will first be explained. Although the body behavior and the ZMP trajectory are discussed only in the to-and-fro direction (Xdirecfion), the same will also be applied to the left and right direction (Y-direction).

Figure 37:
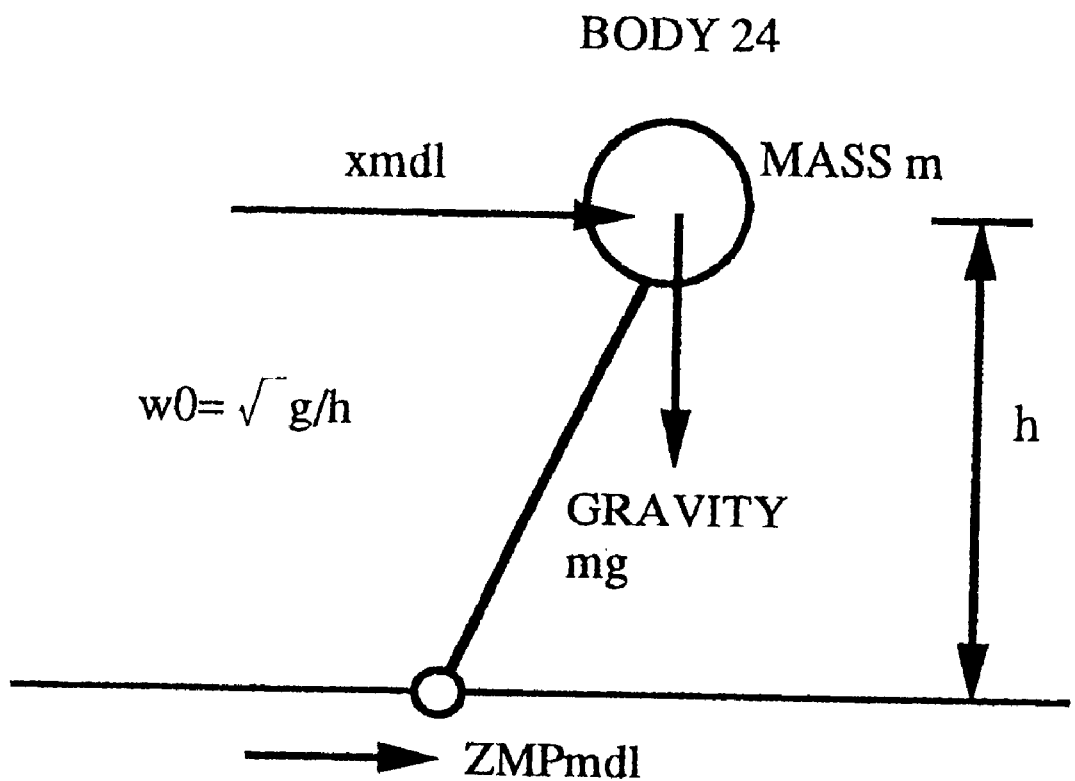
FIG. 37 is an explanatory view showing an inverted pendulum model used in the fifth embodiment.

Assume that the mass of the body 24 of the robot 1 is sufficiently larger than that of the other portions and that the vertical body acceleration is relatively small during walking. If this specific condition is met, the relationship of the body position and velocity perturbation relative to the ZMP perturbation, i.e., the dynamic perturbation model can be approximated by the following equation, i.e., a linear inverted pendulum model illustrated in FIG. 37. As illustrated in the figure, the model has a supporting point 22a which is movable.

$$dxmdl/dt=v$$

$$dvmdl/dt=\omega 0^2*(xmdl-ZMPmdl)$$

Here, xmdl: the position of the center of mass of the linear inverted pendulum; vmdl: velocity of the center of mass of the linear inverted pendulum. ω0 is a positive constant which is approximated by the relationship between the height of the center of gravity of the body h and the gravitational constant g as follows.

$$\omega 0=\sqrt{(g/h)}$$

When the specific condition is met, the linear inverted pendulum model can be used instead of the perturbation model (which is more general than the abovementioned model) expressed by Rmix(x(k), c), Rmix(x(k), e), Rmix(x(k), x0), Rmix(x(k), v0) used in the fourth embodiment. In the following explanation, if the states of the model should preferably be described with time, they will be described as xmdl(t), vmdl(t), etc.

Based on the above, the operation will be explained with reference to FIG. 36. The configuration of the ZMP pattern is the same as that in the fourth embodiment.

The program starts at S1400 in which the standard gaits have been stored in memory and proceeds to S1402 in which the final body positions and velocities in each of the standard gaits have been calculated and stored in memory. The program then proceeds to S1404 in which the behavior of the dynamic perturbation model is calculated up to the final time of the gait, and the final model position Xe and the final model velocity Ve are calculated, setting the ZMP parameters, as illustrated in FIG. 35, c=1, e=0, p (ZMP value at time 0)=0, ZMP values at the other braking points=0, while setting its initial states as x0=0 and v0=0.

More specifically, this is done by setting Δc (the ZMP pattern correction amount; shown in FIG. 29) to 1, and inputting, the ZMP patterns as illustrated in FIG. 29, to the model to obtain the behavior of the model. Then the final states of the model are obtained, and the partial differential sensitivity of the final model position Xe relative to the ZMP parameter c (referred to as R(Xe, c)), is calculated as follows.

$$R(Xe, c)=Xe$$

Similarly, the partial differential sensitivity of the final model velocity Ve relative to the ZMP parameter c, is calculated as follows.

$$R(Ve, c)=Ve$$

The behavior of the dynamic perturbation model can be calculated by discretizing the model and then by conducting sequential calculation, or can be solved by analysis.

The program then proceeds to S1406 in which the behavior of the dynamic perturbation model is calculated up to the final time of the gait and the final model position Xe and the final model velocity Ve are calculated, setting the ZMP parameters c=0, e=1, p=0, ZMP values at the other braking points=0, while setting its initial states as x0=0 and v0=0.

Then, the partial differential sensitivity of the final model position Xe relative to the ZMP parameter e, is calculated as follows.

$$R(Xe, c)=Xe$$

At the same time, the partial differential sensitivity of the final model velocity Ve relative to the ZMP parameter e, is calculated as follows.

$$R(Ve, c)=Ve$$

The program then proceeds to S1408 in which the behavior of the dynamic perturbation model is calculated up to the final time of the gait and the final model position Xe and the final model velocity Ve are calculated, setting the ZMP parameter c=0, e=0, p=0, ZMP values at the other braking points=0, while setting its initial states as x0 =1 and v0=0.

Then, the partial differential sensitivity of the final model position Xe relative to the initial model position x0, is calculated as follows.

$$R(Xe, x0)=Xe$$

At the same time, the partial differential sensitivity of the final model velocity Ve relative to the initial model position x0, is calculated as follows.

$$R(Ve, x0)=Ve$$

The program then proceeds to S1410 in which the behavior of the dynamic perturbation model is calculated up to the final time of the gait and the final model position Xe and the final model velocity Ve are calculated, setting the ZMP parameters c=0, e=0, p=0, ZMP values at the other braking points=0, while setting its initial states as x0=0 and v0=1.

Then, the partial differential sensitivity of the final model position Xe relative to the initial model velocity v0, is calculated as follows.

$$R(Xe, v0)=Xe$$

At the same time, the partial differential sensitivity of the final model velocity Ve relative to the initial model velocity v0, is calculated as follows.

$$R(Ve, v0)=Ve$$

The program then proceeds to S1411 in which the behavior of the dynamic perturbation model is calculated up to the final time of the gait and the final model position Xe and the final model velocity Ve are calculated, setting the ZMP parameters c=0, e=0, p=1, ZMP values at the other braking points=0, while setting its initial states as x0=0 and v0=0.

Then, the partial differential sensitivity of the final model position Xe relative to the initial ZMP p, is calculated as follows.

$$R(Xe, p)=Xe$$

At the same time, the partial differential sensitivity of the final model velocity Ve relative to the initial ZMP p (referred to as R(Ve, p), is calculated as follows.

$$R(Ve, p)=Ve$$

The program then proceeds to S1412 in which based on the sensitivities thus obtained, a 2*2 matrix is generated, whose 1st row 1st column element is R(Xe, c), 1st row 2nd column element is R(Xe, e), 2nd row 1st column element is R(Ve, c), and 2nd row 2nd column element is R(Ve, e).

The program then proceeds to S1414 in which the inverse matrix thereof is calculated. In the inverse matrix, the element of the 1st row 1st column is the partial differential sensitivity of the parameter c relative to the final model position Xe (referred to as R(c, Xe)), the element of the 2nd row 1st column is the partial differential sensitivity of the parameter e relative to the final model position Xe (referred to as R(e, Xe)), the element of the 1st row 2nd column is the partial differential sensitivity of the parameter c relative to the final model velocity Ve (referred to as R(c, Ve)), and the element of the 2nd row 2nd column is the partial differential sensitivity of the parameter e relative to the final model velocity e (referred to as R(e, Ve)).

The program then proceeds to S1416 in which the timer is reset to zero and is started, to S1422, via S1418, S1420, in which it is determined whether the gait is to be switched. When the result is negative, the program proceeds to S1432. When the result is affirmative, on the other hand, the program proceeds to S1428, via S1424, S1426, in which the gait mixing is conducted.

Figure 38:
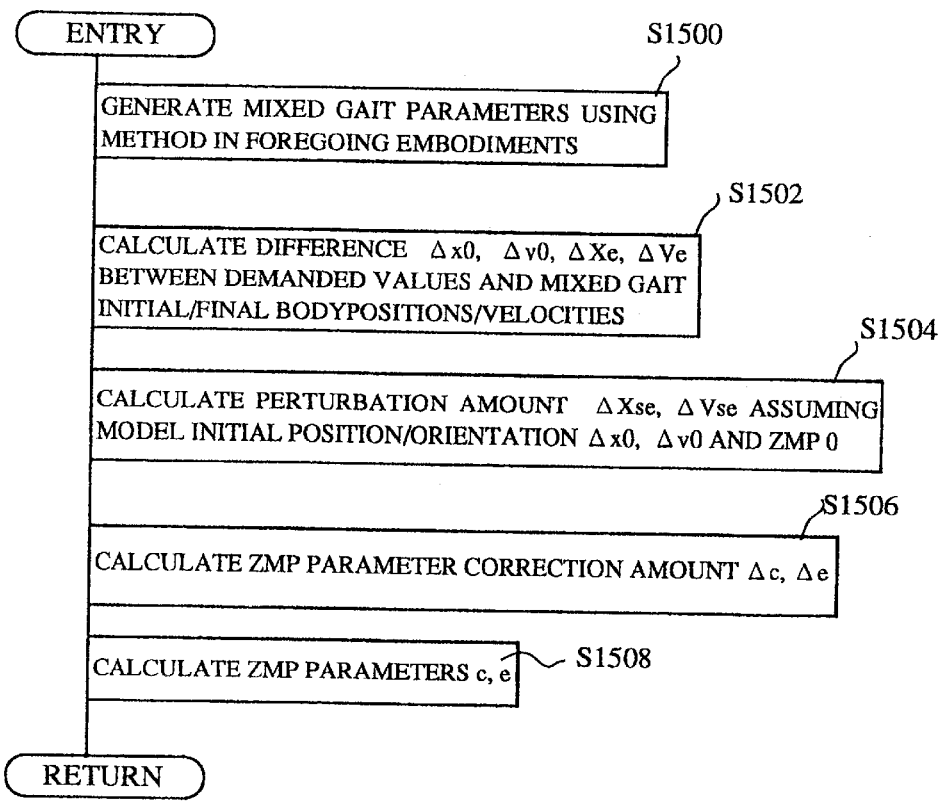
FIG. 38 is a flow chart showing the subroutine of gait mixing referred to in the flow chart of FIG. 36.

Explaining this with reference to the flow chart of FIG. 38 which shows the subroutine of the procedures, the program starts at S1500 in which the mixed gait parameters are generated using any method in the foregoing embodiments. At this time, one from among the standard gaits whose initial and final body positions and velocities are close to the demanded values, is selected as the base gait. Then, excluding the initial and final body positions and velocities from the directly-determined parameters, the mixed gait parameters are generated or calculated. The program then proceeds to S1502 in which the differences Δx0, Δv0, ΔXe, ΔVe between the initial and final body positions and velocities of the mixed gait and the demand values are calculated.

The program then proceeds to S1504 in which the final position and velocity ΔXse, ΔVse are calculated as follows, by setting the model initial position and velocity to Δx0, Δv0, while setting the ZMP to 0.

$$\Delta Xse=R(Xe, x0)*\Delta x0+R(Xe, v0)*\Delta v0$$

$$\Delta Vse=R(Ve, x0)*\Delta x0+R(Ve, v0)*\Delta v0$$

The program then proceeds to S1506 in which the ZMP parameter correction amount Δc, Δe are calculated as follows.

$$\Delta c=R(c, Xe)*(\Delta Xe+\Delta Xse)+R(c, Ve)*(\Delta Ve+\Delta Vse)$$

$$e=R(e, Xe)*(\Delta Xe+\Delta Xse)+R(e, Ve)*(\Delta Ve+\Delta Vse)$$

Figure 39:
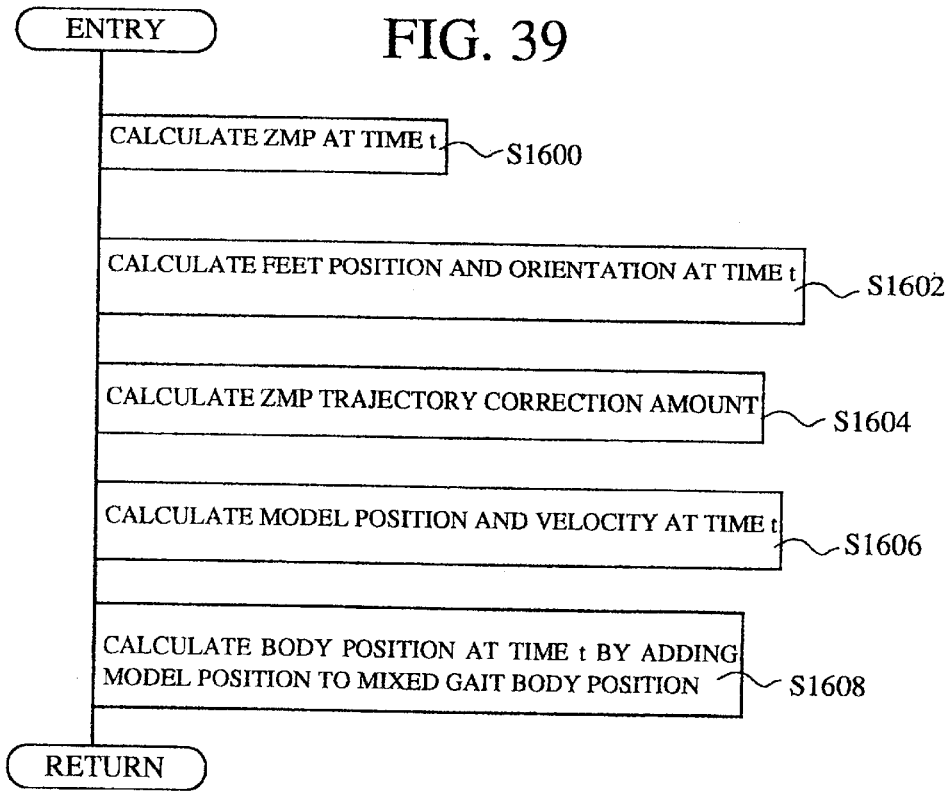
FIG. 39 is a flow chart showing the subroutine of the calculation of instantaneous values of the desired gait referred to in the flow chart of FIG. 36.

The program then proceeds to S1508 in which the ZMP parameters c, e are calculated using the same equation as was used in S1208. The program then proceeds to S1430, S1432, and to S1600 and S1602 in a flow chart of FIG. 39 in which the procedures similar to those in the fourth embodiment are conducted. The program then proceeds to S1604 in which the ZMP trajectory correction amount is calculated. This will be same as the pattern illustrated in FIG. 28 if it is changed as c=Δc, e=Δe and the ZMP values at the braking points as 0.

The program then proceeds to S1606 in which, setting the initial model position and velocity as xmdl(0)=Δx0 and vmdl(0)=Δv0 and ZMPmdl=the aforesaid ZMP trajectory correction amount and by inputting them to the model, the behavior of the model is determined by sequential calculations. In other words, the current (at time t) model position and velocity are calculated using an equation of discretized model based on the preceding (at time t−Δt) model position and velocity, and on the current (at time t) ZMP trajectory correction amount. In the first control cycle, the current model position and velocity are set to xmdl(0)=Δx0 and vmdl(0)=Δv0. As the discretized model, it is possible to use a model expressed in matrix form which is generally used in the field of modern control theory.

The program then proceeds to S1608 in which the model position is added to the mixed body position as a correction amount shown in the following equation, and the desired body position is thus determined.

x(k)=xmix(k)+xmdl(kΔt)

Here, x(k): the desired body position; xmix(k): the k-th datum in the body trajectory time-series data of the mixed gait; and xmdl(kΔt): the model position at time kΔt.

Having been configured in the foregoing manner, the system in the fifth embodiment can have the same advantages as those of the fourth embodiment.

To be more specific, since the linear inverted pendulum model is used, the required capacity of memory (ROM 84) is less, and the body trajectory perturbation can be obtained on a real-time basis by sequential calculations, etc. Moreover, it is possible to easily obtain a strict solution of the model equation and based on the strict solution, it is possible to predict future behavior without difficulty.

It should be noted that, although the sensitivities of the final body position and velocity relative to the ZMP parameters can be obtained from the strict solutions, since they include calculations of exponential functions, the sensitivities should preferably be obtained beforehand and stored in memory so as to reduce the calculation time.

Figure 40:
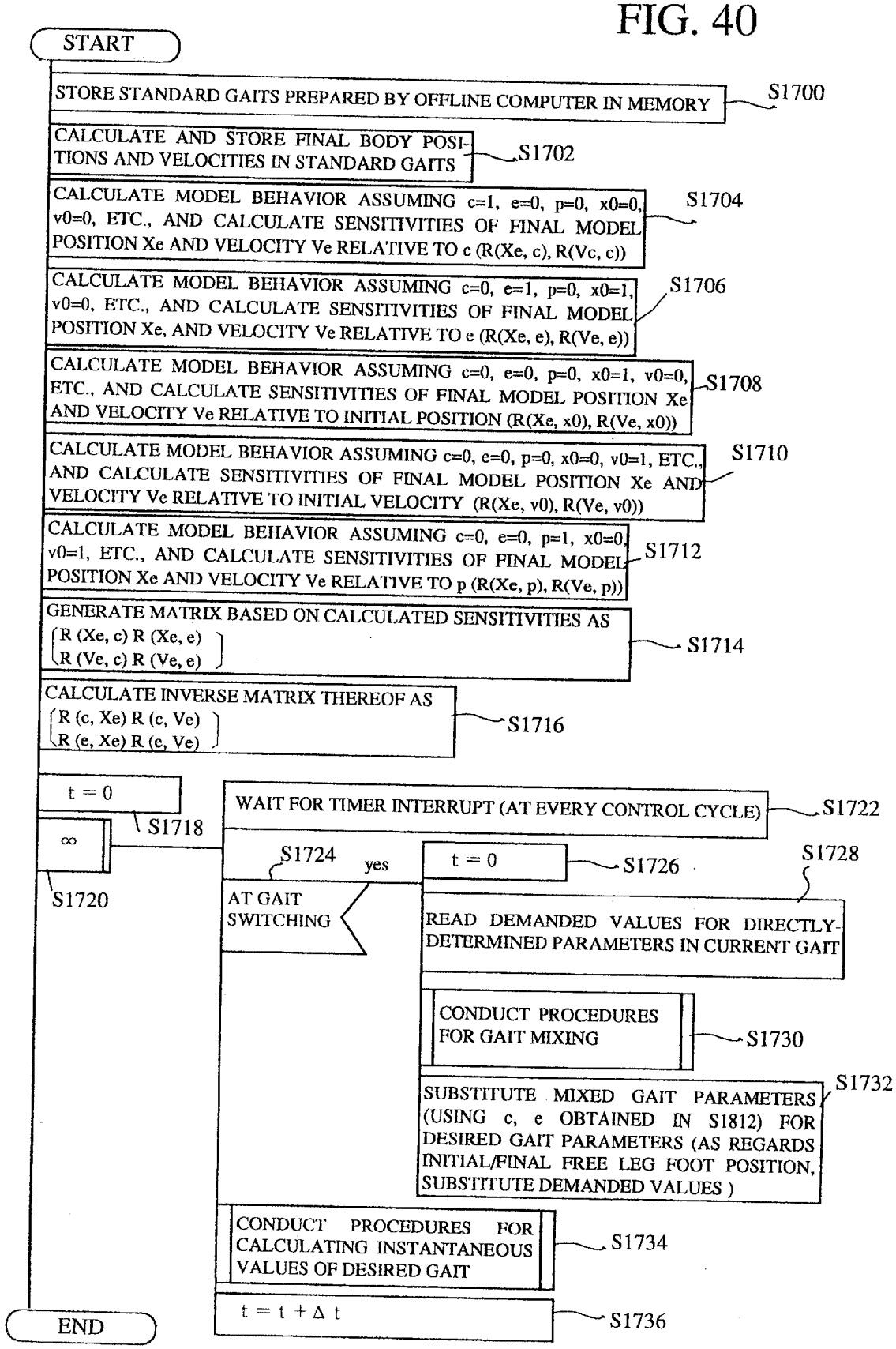
FIG. 40 is a main flow chart, similar to FIG. 4, but showing the operation of the system according to a sixth embodiment of the present invention.

FIG. 40 is a flow chart showing the operation of the system according to the sixth embodiment of the present invention.

As mentioned above, when the change of the inertial force of the free leg is negligible, in other words, the ZMP changes little, even if the initial free leg foot position or the final free leg foot position is perturbed, it is possible to simplify the gait generation. The sixth embodiment aims to achieve this.

In the gait defined in this specification, the final time of a gait is the instant at which the free leg lands. The ZMP has still been set at the floor-contact surface of the supporting leg foot. Accordingly, when the final free leg foot position is varied, the ZMP parameter need not be varied provided that the inertial force caused by the final free leg foot position change is negligible. However, since the initial position of the ZMP pattern is generally set at the toe of the initial free leg foot position and orientation, when the initial free leg foot position is changed, the ZMP pattern should therefore be varied in response thereto.

Taking the ZMP parameter change due to the initial free leg foot position change as an example, the operation is now explained focusing on the difference from that of the fifth embodiment.

The program starts in S1700 of the flow chart of FIG. 40 and proceeds to S1710 in which similar procedures to those of the fifth embodiment are conducted, and then to S1712. The following procedures are added in the sixth embodiment in response to the ZMP parameter change so as to satisfy the dynamic equilibrium condition.

Figure 41:
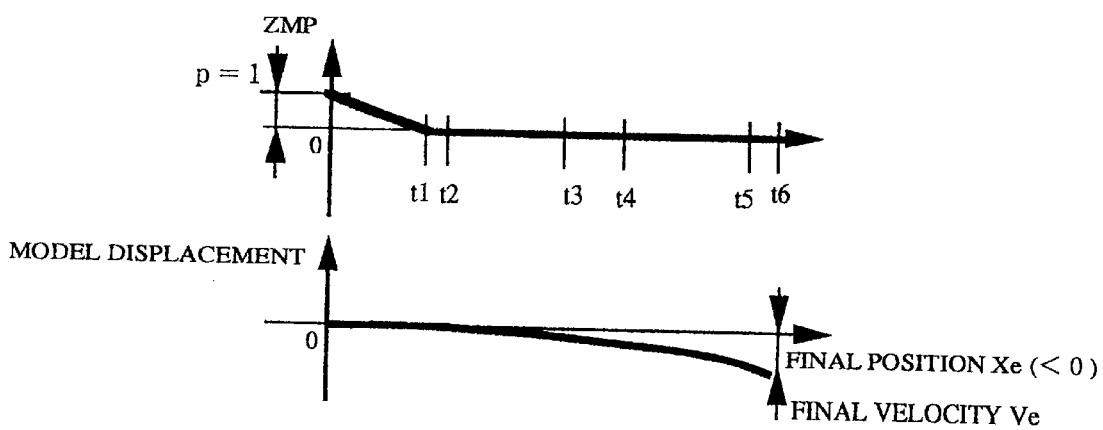
FIG. 41 is a time chart showing the operation of the sixth embodiment illustrated in FIG. 40.

Specifically, in S1712, the behavior of the dynamic perturbation model is calculated up to the final time of the gait and the final model position Xe and the final model velocity Ve are calculated, setting the ZMP parameters c=0, e=0, p=1, ZMP values at the other braking points=0, while setting its initial states as x0=0 and v0=0, as illustrated in FIG. 41.

Then, the partial differential sensitivity of the final model position Xe relative to the ZMP parameter p, is calculated as follows.

R(Xe, p)=Xe

At the same time, the partial differential sensitivity of the final model velocity Ve relative to the ZMP parameter p, is calculated as follows.

R(Ve, p)=Ve

Figure 42:
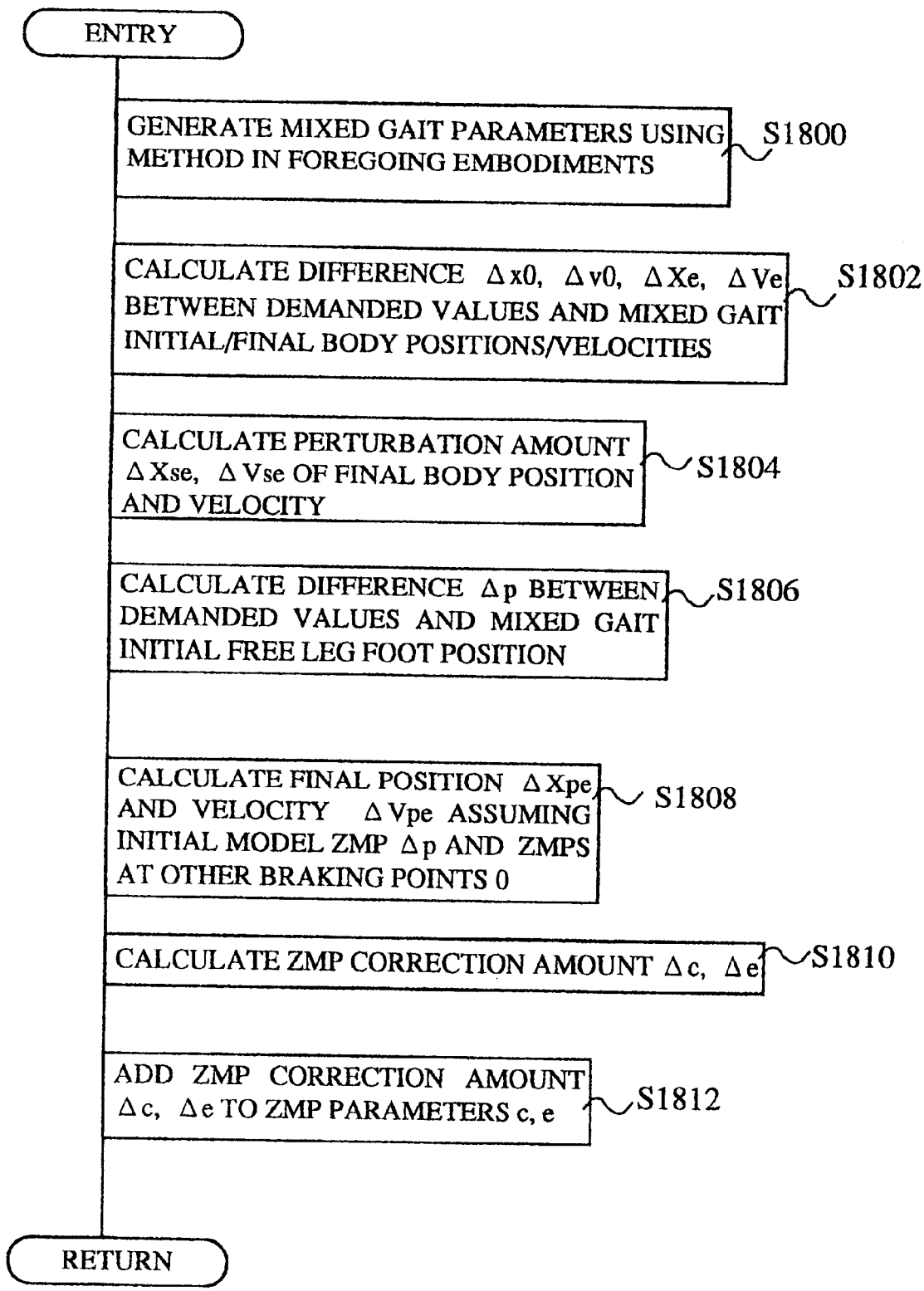
FIG. 42 is a flow chart showing the subroutine of gait mixing referred to in the flow chart of FIG. 40.
Figure 43:
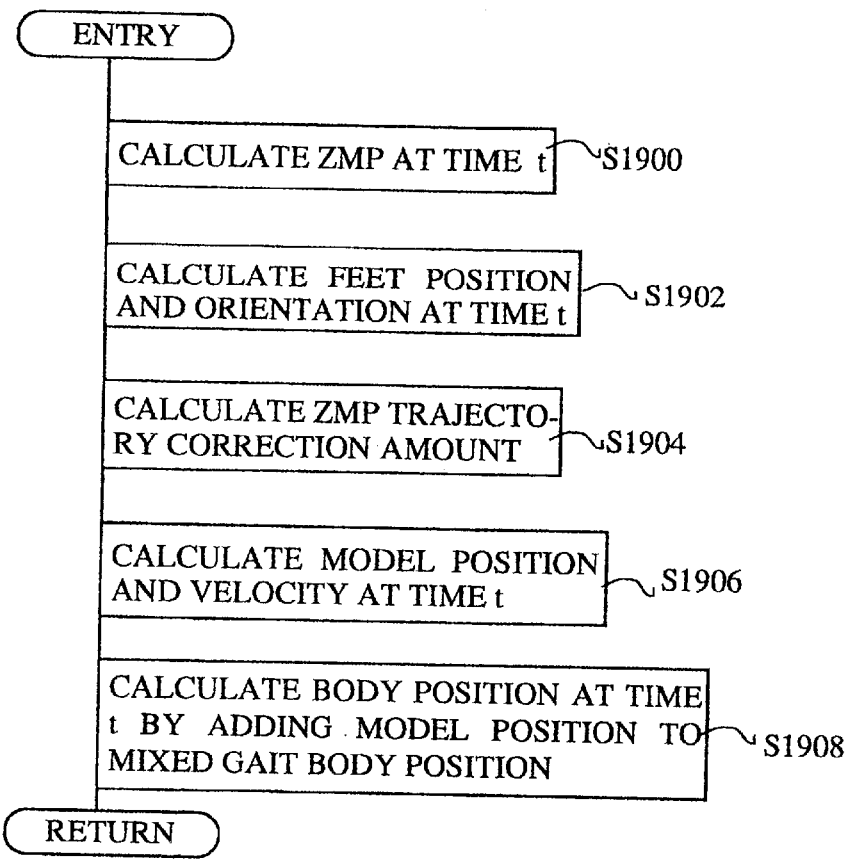
FIG. 43 is a flow chart showing the subroutine of the calculation of instantaneous values of the desired gait referred to in the flow chart of FIG. 40.

The program proceeds up to S1728 in which similar procedures to those of the fifth embodiment are taken, and to S1730 in which the gait mixing is conducted. Specifically, the program proceeds to S1800 as shown in a flow chart of FIG. 42 in which the mixed gait parameters are generated using any method from the foregoing embodiments. At this time, one from among the standard gaits which is close in the initial and final body positions and velocities and the initial and final free leg foot positions and orientations is selected as the base gait.

Once selecting the base gait, the mixed gait is generated in the same manner as the foregoing embodiments by excluding the initial and final body positions and the initial and final free leg foot positions from the directly-determined parameters. Consequently, the initial and final body positions and velocities and the initial and final free leg foot positions of the mixed gait are the same as those in the base gait.

The program proceeds to S1806, via S1802 and S1804, in which the difference between the demanded initial free leg foot position and the mixed gait initial free leg foot position is calculated and is named Δp. The program then proceeds to S1808 in which, setting the initial model ZMP to Δp and ZMP values at the other braking points to 0, the final position and velocity ΔXpe, ΔVpe are calculated using the following equations.

ΔXpe=R(Xe, p)*Δp

ΔVpe=R(Ve, p)*Δp

The program then proceeds to S1810 in which the ZMP correction amounts Δc, Δe are calculated using the following equations.

Δc=R(c, Xe)*(ΔXe+ΔXse+ΔXpe)+R(c, Ve)*(ΔVe+ΔVse+ΔVpe)

Δe=R(e, Xe)*(ΔXe+ΔXse+ΔXpe)+R(e, Ve)*(ΔVe+ΔVse+ΔVpe)

The program then proceeds to S1732 of the flow chart of FIG. 40 in which the aforesaid mixed gait parameters are substituted for the desired gait parameters. The values obtained in S1812 is substituted for the ZMP parameters c, e. The demanded values are substituted for the initial and final free leg foot position parameters.

Figure 44:
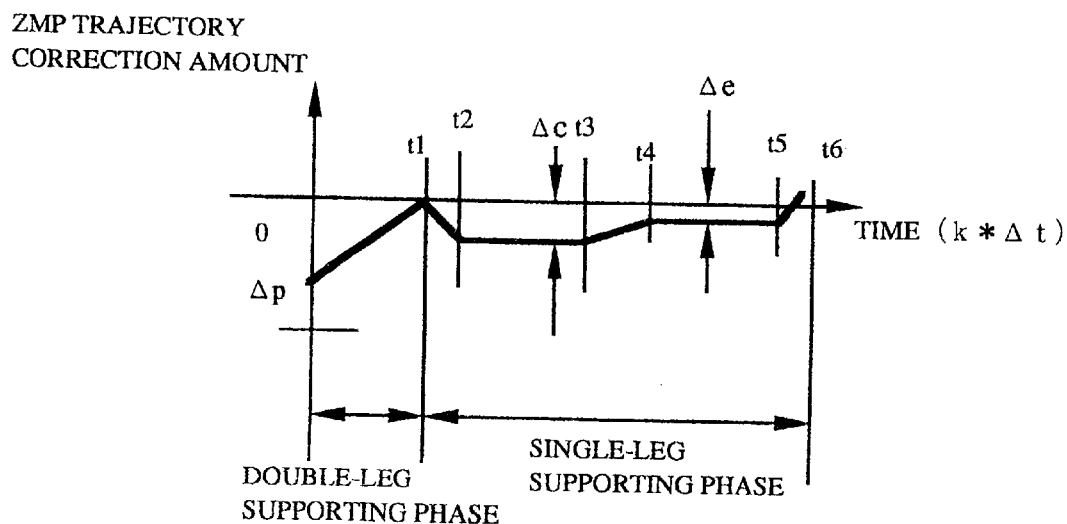
FIG. 44 is a time chart showing the operation illustrated in the flow chart of FIG. 40.

The program then proceeds to S1734, as is shown in a flow chart of FIG. 34 in which in S1900 and in S1902 the same procedures as those of the fifth embodiment are conducted. With these procedures, feet trajectories which satisfy the demands for the initial and final free leg foot positions, as well as the corrected ZMP trajectory, are obtained. The program then proceeds to S1904 in which the ZMP trajectory correction amount is calculated. This is a pattern illustrated in FIG. 44, in which its value c=Δc, e=Δe, p=Δp and the ZMP values at the other braking points are set to zero.

The rest of the sixth embodiment is the same as the fifth embodiment.

Having been configured in the foregoing manner, the system in the sixth embodiment has the same advantages as those in the fourth or fifth embodiment. Moreover, since standard gaits having different initial body position and velocity need not be stored in memory, the memory capacity can further be reduced.

Figure 45:
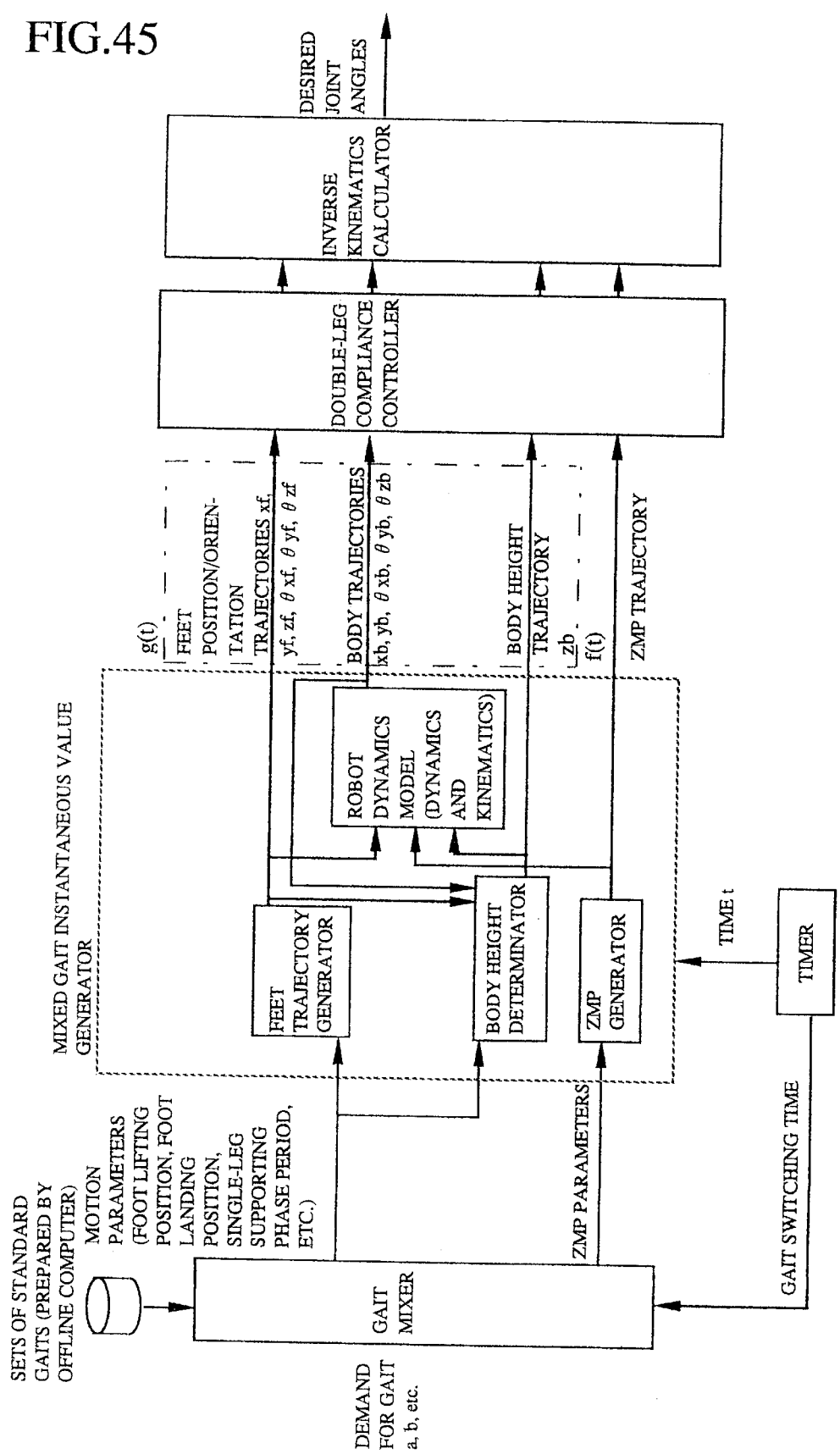
FIG. 45 is a block diagram, similar to FIG. 3, but showing the configuration and operation of the system according to a seventh embodiment of the present invention.

FIG. 45 is a block diagram, similar to FIG. 3, but showing the configuration of a system according to the seventh embodiment of the invention. The seventh embodiment differs in the calculation of the horizontal body position.

In the seventh embodiment, the feet position and orientation, the ZMP and the body height Z at the current time (time t) and the states obtained (including body position and velocity) at the preceding time (time t–Δt), are input to a robot motion model (which is comprised of dynamics, kinematics and various conditions of constraint, in order that the current value (instantaneous values) of the horizontal body position coordinate (X, Y) be calculated.

Figure 46:
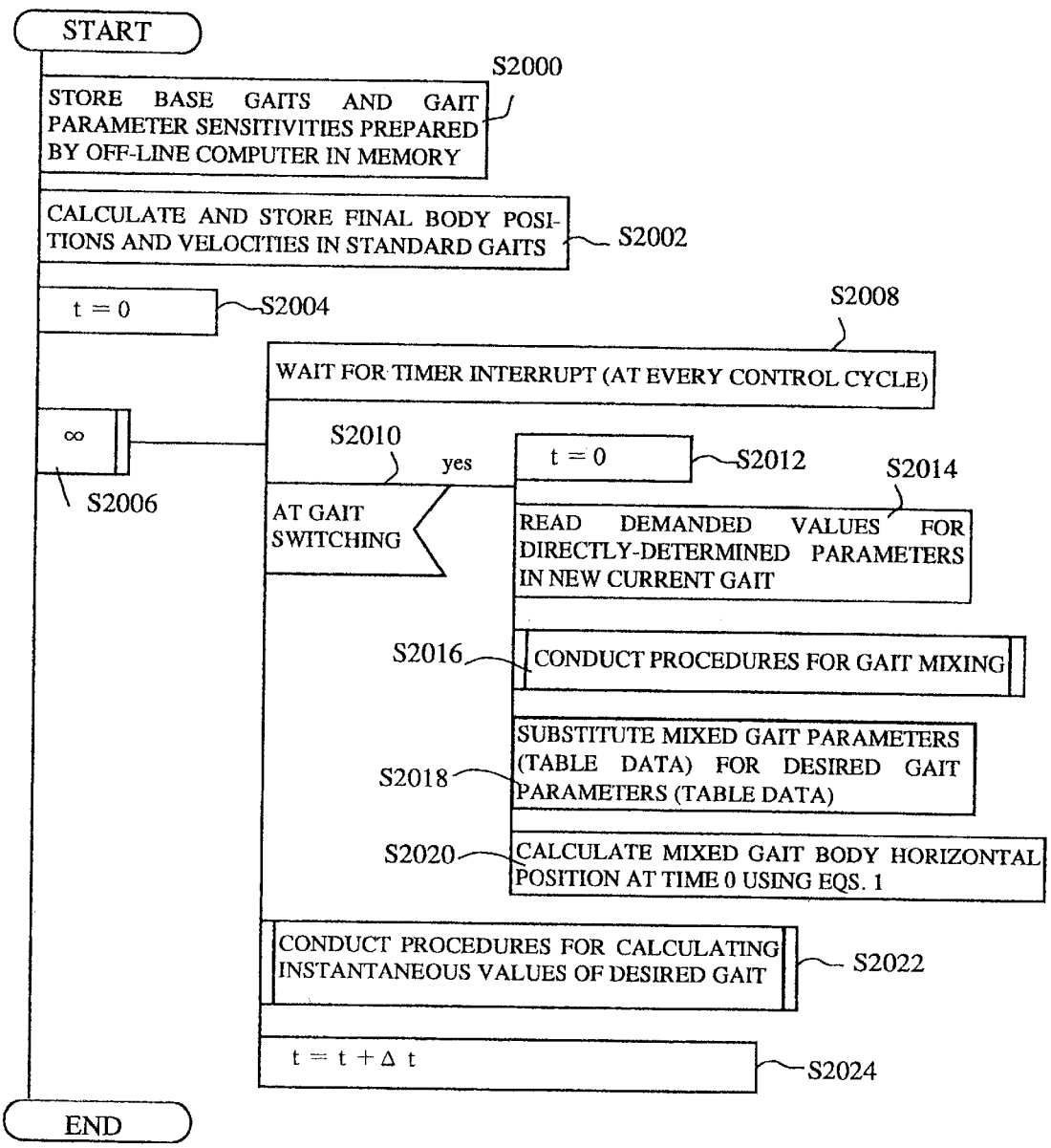
FIG. 46 is a main flow chart showing the operation of the system according to the seventh embodiment of the present invention.
Figure 47:
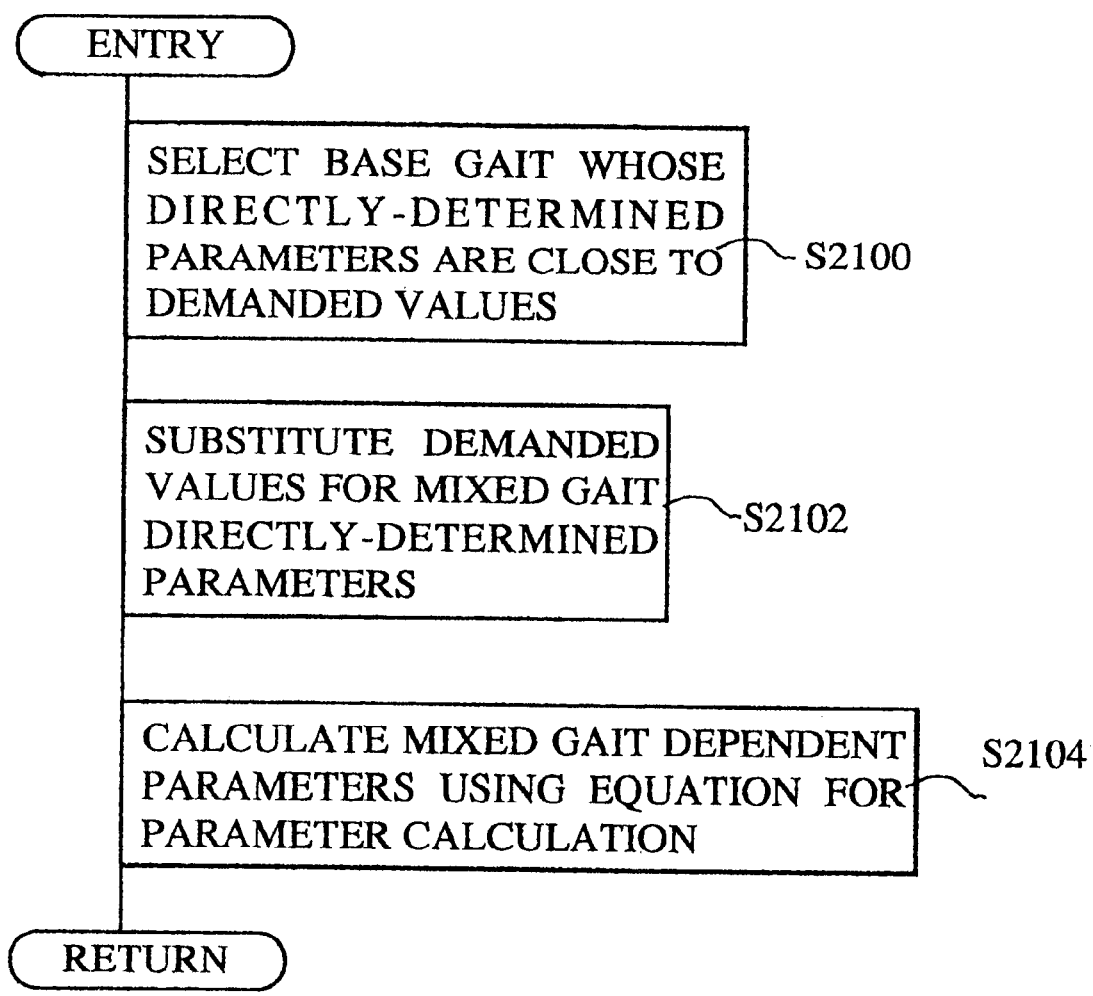
FIG. 47 is a flow chart showing the subroutine of gait mixing referred to in the flow chart of FIG. 46.
Figure 48:
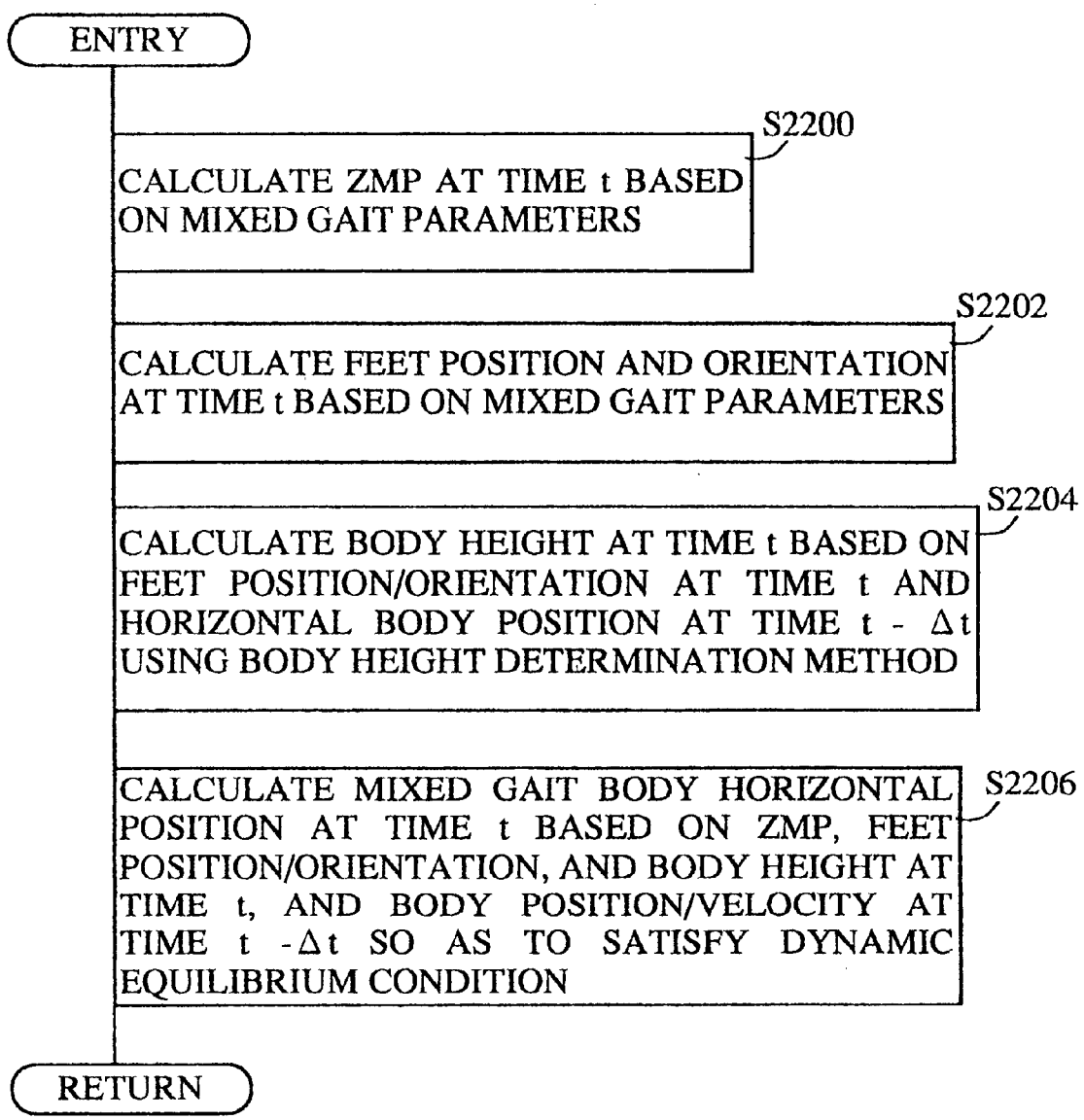
FIG. 48 is a flow chart showing the subroutine of the calculation of instantaneous values of the desired gait referred to in the flow chart of FIG. 46.

More specifically, in the seventh embodiment, S2000 to S2016 shown in a flow chart of FIG. 46 are conducted similarly to the second embodiment. The program proceeds to S2100, then to S2104 as shown in a flow chart of FIG. 47, and returns to the procedures shown in the flow chart of FIG. 46. Then, the program proceeds from S2018 to S2022 and then to S2200 and onward as shown in a flow chart of FIG. 48 and to S2206 in which the mixed gait body trajectory (desired body trajectory) is determined by sequential calculation such that the ZMP dynamically calculated from the motion of the mixed gait body (desired body) and feet accords with the determined ZMP (which is determined from the mixed gait parameters).

In the initial state of the gait, initial body position and velocity parameters, appropriately set, are used as the body position and velocity. Thus, gaits for a single waking step are generated by sequentially calculating values beginning from the initial body and velocity parameters.

This method is disadvantageous in that the volume of calculation is increased and the final body position and velocity tend to deviate slightly from the demanded values, but is advantageous in that it can satisfy the dynamic equilibrium condition in a strict sense.

In the seventh embodiment, the current body height and horizontal body position may alternatively be determined such that they satisfy the dynamic equilibrium conditions and the constraint conditions for determining body height simultaneously. In the foregoing embodiments, the body height is calculated based on the preceding horizontal body position so as to shorten the calculation, assuming that the body height would not change greatly within a short period.

The first to seventh embodiments are thus configured such that there is provided a system for generating a gait of a legged mobile robot having at least a body 24 and a plurality of leg links 2 each connected to the body through a joint 10R(L), 12R(L), 14R(L), comprising standard gait storing means (S10, etc.) for storing, in memory, a plurality of standard gaits, for at least one walking step, each comprising a set of parameters including a parameter relating to a floor reaction force, gait demanding means (S24, etc.) for making a demand for gait, and gait generating means (S26 to S30, S100 to S106, S200 to S206, etc.) for generating an approximated gait which satisfies the demand for gait by selecting one or a plurality of the standard gaits in response to the demand for gait, and by conducting approximation based on the selected standard gait or gaits.

It is configured such that said gait generating means generates the approximated gait by calculating a weighted average of the selected gaits (S100 to S106, S200 to S206, etc.).

It is configured such that said gait generating means generates the approximated gait by using a parameter sensitivity of the selected gait or gaits (S500, S600 to S604, S700 to S706).

It is configured such that said gait generating means generates the approximated gait by calculating a weighted average of the selected gaits and by using a parameter sensitivity of the selected gait or gait (S800, S900 to S906, S1000 to S1006).

It is configured such that said gait generating means includes storing means (S500, S800, etc.) for determining an amount of change in one parameter relative to a unit amount of change in another parameter in at least one of the standard gaits, as the parameter sensitivity of the selected gait and for storing the parameter sensitivity in memory, and generates the approximated gait by using the stored parameter sensitivity.

It is configured such that said gait means incudes describing means (S1104 to S1114) for describing a relationship of perturbation of one parameter relative to the parameter relating to the floor reaction force in the standard gaits, and corrects the approximated gait based on the described relationship of perturbation to generate gaits which satisfy the demand for gait in such a manner that at least displacements and velocities in the generated gaits are continuous at a boundary of the gaits (S1128, S1200 to S1208, S1130, S1132, S1300 to S1304, etc.).

It is configured such that the perturbation of the one parameter is a perturbation of a horizontal body position.

It is configured such the relationship is described by a linear model.

It is configured such that the relationship is described by an inverted pendulum model.

It is configured such that the relationship is described by time-series tabulated data.

It is configured such that said gait generating means generates the approximated gait, without considering, (i.e., irrespectively of) the parameter if the parameter is under a predetermined condition (S1730, S1800 to S1812).

It is configured such that said gait generating means includes joint angle command calculating means (S302) for calculating a joint angle command of the robot based on the generated gait, and joint controlling means (S306) for controlling the joint of the robot such that it traces the calculated joint angle command.

It is configured such that said joint angle command calculating means includes detecting means (S300, S400 to S404) for detecting a state of the robot, and correcting means (S406, S408, S304) for correcting a position and a posture of the robot in response to the detected state, and calculates the joint angle command such that the corrected position and the orientation are effected.

In the first to seventh embodiment, the approximation should not be limited to those disclosed. Rather, various modification or alteration will be possible.

In the first to seventh embodiments, the body position is represented by a coordinate of a reference point of the body 24 viewed in the coordinate system set at the supporting leg's floor-contact point. The reference point should be set at the center of the body 24 in the left and right direction. As regards the to-and-fro direction, the reference point can be set using any of the following methods.

Method 1) to set the reference point at the center of gravity of the body (used in the first to seventh embodiments).

Method 2) to set the reference point at the position which will accord with the center of mass of the robot when the robot stands upright.

Method 3) to set the reference point at an appropriate point by trial and error.

Figure 49:
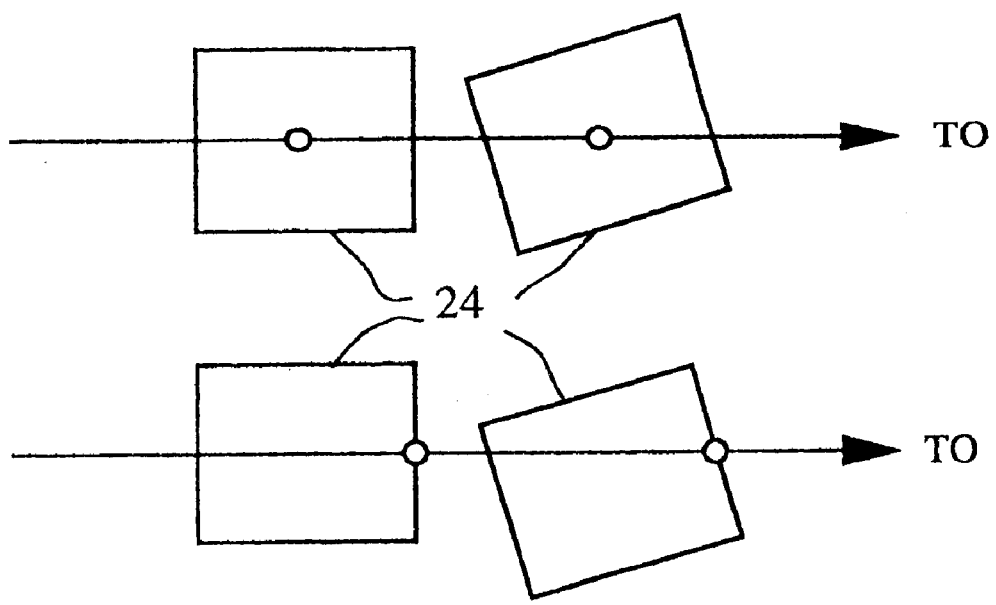
FIG. 49 is an explanatory view showing the body position in the gait generated by the gait generation system of a legged mobile robot according to the present invention.

Any of the methods would not differ if the orientation of the body is constant during walking. However, if the body orientation changes during walking such as in turning, an error (approximation error) would be different depending on the location where the reference point is set. More specifically, FIG. 49 illustrates the cases in which the reference point is set at the center of the body, and the reference point is shifted right in the sheet. Assume a situation where the body is rotated about the reference point, it will be understood that the body positions are different from each other if the reference point is at the body center, or if the reference point is close to the body front.

The generation of a mixed gait (demanded gait) has been described taking an example of mixing gaits having different turning angles. The gait mixing is thus a kind of approximation. However, the gait will vary slightly depending on the way of setting of the reference point, as mentioned above, and hence, the accuracy of approximation relative to the dynamic equilibrium condition will vary.

The reference point should accordingly be set such that the error relative to the dynamic equilibrium condition is as small as possible. Which of the setting methods is optimal or any of the setting method affects little depends upon the structure or the nature of walking of the robot.

In order to enhance the accuracy relative to the dynamic equilibrium condition, it is alternatively possible to use, instead of the time-series tabulated data of body position, time-series tabulated data of the center of mass of the robot. If doing so, since the robot posture must be determined such that the center of robot mass accords with a designated position, the volume of calculation will be increased by a significant amount.

In the foregoing embodiments, the acceleration has not been described in the gait parameters. Needless to say, generated gaits will be even smoother if the acceleration is made continuous at the boundary of gaits.

In the foregoing embodiments, although the present invention has been described with reference to a biped robot, the present invention can be applied to other legged mobile robots.

INDUSTRIAL FIELD IN WHICH THE INVENTION IS APPLICABLE

According to the present invention, it becomes possible to generate gaits including the floor reaction force freely on a real-time basis and to effect a stride or a turning angle as desired. Moreover, it becomes possible to make the displacements and velocities of various robot portions continuous at the boundary of the generated gaits. Furthermore, it becomes possible to control walking of a legged mobile robot based on the gaits generated on a real-time basis.

What is claimed is:

1. A system for generating a gait of a legged mobile robot having at least a body and a plurality of leg links each connected to the body through a joint comprising:
    a. standard gait storing means for storing, in memory, a plurality of standard gaits, including at least a gait to start walking, a gait for constant speed walking, and a gait to stop walking, each comprising a set of parameters including a parameter relating to a floor reaction force;
    b. gait demanding means for making a demand for gait; and
    c. gait generating means for generating an approximated gait which satisfies the demand for gait by selecting one or a plurality of the standard gaits in response to the demand for gait, and by conducting approximation on at least one of the parameters of the selected standard gait or gaits.

2. A system according to claim 1, wherein said gait generating means generates the approximated gait by calculating a weighted average of at least one of the parameters of the selected gaits.

3. A system according to claim 1, wherein said gait generating means generates the approximated gait by using a parameter sensitivity of one of the parameters to another of the parameters of the selected gait or gaits.

4. A system according to claim 1, wherein said gait generating means generates the approximated gait by calculating a weighted average of at least one of the parameters of the selected gaits and by using a parameter sensitivity of one of the parameters to another of the parameters of the selected gait or gaits.

5. A system according to claim 3, wherein said gait generating means includes:
    d. change amount determining means for determining an amount of change in the one parameter relative to a unit amount of change in the another parameter in at least one of the standard gaits, as the parameter sensitivity of the selected gait and for storing the parameter sensitivity in memory;
    and generates the approximated gait by using the stored parameter sensitivity.

6. A system according to claim 1, wherein said gait generating means includes:
    e. describing means for describing a relationship of perturbation of one of the parameters relative to the parameter relating to the floor reaction force in the standard gaits;
    and corrects the approximated gait based on the described relationship of perturbation to generate gaits which satisfy the demand for gait in such a manner that at least one of the displacements and velocities in the generated gaits is continuous at a boundary of the gaits.

7. A system according to claim 6, wherein the perturbation of one of the parameters is a perturbation of a horizontal body position.

8. A system according to claim 6, wherein the relationship is described by a linear model.

9. A system according to claim 8, wherein the relationship is described by an inverted pendulum model.

10. A system according to claim 6, wherein the relationship is described by time-series tabulated data.

11. A system according to claim 1, wherein said gait generating means generates the approximated gait by excluding the parameter relating to the floor reaction force if the parameter relating to the floor reaction force is under a predetermined condition.

12. A system according to claim 1, wherein said gait generating means includes;
    f. joint angle command calculating means for calculating a joint angle command of the robot based on the generated gait; and
    g. joint controlling means for controlling the joint of the robot such that it traces the calculated joint angle command.

13. A system according to claim 12, wherein said joint angle command calculating means includes;
    h. detecting means for detecting a state of the robot; and
    i. correcting means for correcting a position and an orientation of the robot in response to the detected state;

and calculates the joint angle command such that the corrected position and the orientation are effected.

14. A system according to claim 5, wherein said gait generating means includes;

describing means for describing a relationship of perturbation of one of the parameters relative to the parameter relating to the floor reaction force in the standard gaits;

and corrects the approximated gait based on the described relationship of perturbation to generate gaits which satisfy the demand for gait in such a manner that at least one of the displacements and velocities in the generated gaits are continuous at a boundary of the gaits.

15. A system according to claim 14, wherein the perturbation of one of the parameters is a perturbation of a horizontal body position.

16. A system according to claim 14, wherein the relationship is described by a linear model.

17. A system according to claim 16, wherein the relationship is described by an inverted pendulum model.

18. A system according to claim 14, wherein the relationship is described by time-series tabulated data.

19. A system according to claim 5, wherein said gait generating means generates the approximated gait by excluding the parameter relating to the floor reaction force if the parameter relating to the floor reaction force is under a predetermined condition.

20. A system according to claim 6, wherein said gait generating means generates the approximated gait by excluding the parameter relating to the floor reaction force if the parameter relating to the floor reaction force is under a predetermined condition.

21. A system according to claim 5, wherein said gait generating means includes;

joint angle command calculating means for calculating a joint angle command of the robot based on the generated gait; and joint controlling means for controlling the joint of the robot such that it traces the calculated joint angle command.

22. A system according to claim 6, wherein said gait generating means includes;

joint angle command calculating means for calculating a joint angle command of the robot based on the generated gait; and joint controlling means for controlling the joint of the robot such that it traces the calculated joint angle command.

23. A system according to claim 21, wherein said joint angle command calculating means includes;

detecting means for detecting a state of the robot; and correcting means for correcting a position and an orientation of the robot in response to the detected state; and calculates the joint angle command such that the corrected position and the orientation are effected.

24. A system according to claim 22, wherein said joint angle command calculating means includes;

detecting means for detecting a state of the robot;

correcting means for correcting a position and an orientation of the robot in response to the detected state; and calculates the joint angle command such that the corrected position and the orientation are effected.

25. A system for generating a gait of a legged mobile robot having at least a body and a plurality of leg links each connected to the body through a joint, comprising:

standard gait storing means for storing, in memory, a plurality of standard gaits, including at least a gait to start walking, a gait for constant speed walking, and a gait to stop walking, each comprising a set of parameters including a parameter relating to motion of the robot:

gait demanding means for making a demand for gait; and gait generating means for generating an approximated gait which satisfies the demand for gait by selecting one or a plurality of the standard gaits in response to the demand for gait, and by conducting approximation on at least one of the parameters of the selected standard gait or gaits.

26. A system according to claim 25, wherein said gait generating means generates the approximated gait by calculating a weighted average of at least one of the parameters of the selected gaits.

27. A system according to claim 25, wherein said gait generating means generates the approximated gait by using a parameter sensitivity of one of the parameters to another of the parameters of the selected gait or gaits.

28. A system according to claim 25, wherein said gait generating means generates the approximated gait by calculating a weighted average of at least one of the parameters of the selected gaits and by using a parameter sensitivity of one of the parameters to another of the parameters of the selected gait or gaits.

29. A system according to claim 27, wherein said gait generating means includes:

change amount determining means for determining an amount of change in the one parameter relative to a unit amount of change in the other parameter in at least one of the standard gaits, as the parameter sensitivity of the selected gait and for storing the parameter sensitivity in memory;

and generates the approximated gait by using the stored parameter sensitivity.

30. A system according to claim 25, wherein said gait generating means includes:

joint angle command calculating means for calculating a joint angle command of the robot based on the generated gait; and joint controlling means for controlling the joint of the robot such that it traces the calculated joint angle command.

31. A system according to claim 30, wherein said joint angle command calculating means includes:

detecting means for detecting a state of the robot; and correcting means for correcting a position and an orientation of the robot in response to the detected state;

and calculates the joint angle command such that the corrected position and the orientation are effected.

* * * * *